United States Patent [19]

Kimura et al.

[11] Patent Number: 5,739,650
[45] Date of Patent: Apr. 14, 1998

[54] MOTOR SYSTEM CAPABLE OF OBTAINING HIGH EFFICIENCY AND METHOD FOR CONTROLLING A MOTOR

[75] Inventors: Taizou Kimura; Kiyotaka Nishijima; Hiroyuki Yamai; Akio Yamagiwa; Kazunobu Ooyama; Nobuki Kitano, all of Kusatsu, Japan

[73] Assignee: Daiken Industries, Ltd., Osaka, Japan

[21] Appl. No.: 619,460

[22] PCT Filed: Jul. 24, 1995

[86] PCT No.: PCT/JP95/01468

§ 371 Date: Mar. 25, 1996

§ 102(e) Date: Mar. 25, 1996

[87] PCT Pub. No.: WO96/03797

PCT Pub. Date: Feb. 8, 1996

[30] Foreign Application Priority Data

| Jul. 25, 1994 | [JP] | Japan | 6-172910 |
| Sep. 12, 1994 | [JP] | Japan | 6-217688 |
| Nov. 8, 1994 | [JP] | Japan | 6-273420 |

[51] Int. Cl.[6] ............................................. H02P 6/08
[52] U.S. Cl. .............................. 318/254; 318/437; 318/438; 318/721; 318/722
[58] Field of Search .......................... 318/138, 254, 318/439, 700, 720–724, 798–803, 809, 437, 438, 459, 500, 504

[56] References Cited

U.S. PATENT DOCUMENTS

| 4,495,450 | 1/1985 | Tokizaki et al. | 318/138 |
| 4,641,066 | 2/1987 | Nagata et al. | 318/254 |
| 4,912,378 | 3/1990 | Vukosavic | 318/254 |
| 4,922,169 | 5/1990 | Freeman | 318/254 |
| 5,144,564 | 9/1992 | Naidu et al. | 364/494 |
| 5,204,593 | 4/1993 | Ueki | 318/254 |
| 5,272,429 | 12/1993 | Lipo et al. | 318/808 |
| 5,399,953 | 3/1995 | Yoshino | 318/799 |
| 5,469,033 | 11/1995 | Huang | 318/439 |
| 5,473,725 | 12/1995 | Chen et al. | 318/254 |
| 5,481,166 | 1/1996 | Moreira | 318/254 |

FOREIGN PATENT DOCUMENTS

427571A2   11/1990   European Pat. Off. .

Primary Examiner—Bentsu Ro

[57] ABSTRACT

In a brushless DC motor system, an RMS value of an input current of a voltage-fed inverter (702) is detected by a current transformer (705) and an RMS value detector circuit (706). A rotation speed of a brushless DC motor (703) is detected based on a cycle of a position signal outputted by a position sensor circuit (704). Then, in response to the RMS value of the input current and the rotation speed, the phase of the inverter output voltage relative to the phase of the motor counter-electromotive voltage is set to a phase at which the motor efficiency comes generally to a peak, and a switching command to the voltage-fed inverter (702) is generated. With this constitution, when the applied voltage waveform is controlled only by the voltage-fed inverter in response to the rotor-position detection signal, the motor attains high-efficiency operation without involving any increase in cost and yet regardless of load conditions.

36 Claims, 52 Drawing Sheets (A) INVERTER OUTPUT OF EACH PHASE
(B)
(C)
(D) INDUCED VOLTAGE OF EACH PHSE
(E)
(F)
(G) NEUTRAL-POSITION VOLTAGE OF MOTOR
(H) NEUTRAL-POSITION VOLTAGE OF Y-CONNECTION LOAD
(I) MAGNETIC-POLE POSITION SIGNAL

MOTOR SYSTEM CAPABLE OF OBTAINING HIGH EFFICIENCY AND METHOD FOR CONTROLLING A MOTOR

TECHNICAL FIELD

The present invention relates to a motor system capable of high efficiency operation as well as a control method for a motor.

BACKGROUND ART

Brushless DC motors have conventionally been researched and developed for their application to various fields, and also put into practical use, taking advantage of their capability that no secondary copper loss is involved so that enhancement in efficiency is theoretically possible.

The method for controlling brushless DC motors to high efficiency can be classified roughly into the following two:

(i) A method in which the motor current is controlled so that the torque-to-current ratio is increased, by detecting the instantaneous value of the motor current; and (ii) A method in which a rotation speed of the motor is detected and the voltage-fed inverter is controlled in response to the detected rotation speed so that the inverter output voltage relative to the phase of the motor counter-electromotive voltage is brought to a phase that allows the brushless DC motor to be driven at around the maximum output.

In the above (i) method, when a brushless DC motor in which a permanent magnet is mounted on the surface of the rotor (hereinafter, referred to as surface-magnet DC motor) is adopted, the motor current is controlled so that the d-axis current (a current in the same direction as that of the gap magnetic flux) that is irrelevant to torque generation is reduced to zero (see "Theory and Practical Design of AC servo systems," Sugimoto et al., published by Sogodenshi Shuppansha K. K., p. 74). Also, when a brushless DC motor in which a permanent magnet is mounted so as to be buried inside the rotor (hereinafter, referred to as buried-magnet DC motor) is adopted, the motor current is controlled based on the fact that the generated torque is the sum of magnet torque (a torque proportional to the q-axis current, which is a current in a direction perpendicular to that of gap magnetic flux) and reluctance torque (a torque proportional to the product of d- and q-axis currents), in such a way that optimum values for the d- and q-axis currents are obtained through the steps of detecting the load status (torque) and sequentially performing arithmetic operations to calculate the optimum values of the d- and q-axis currents (see "High Efficiency Control of Brushless DC Motors for Energy Saving," Morimoto et al., T.IEE Japan, Vol. 112-D, No. 3, '92, in particular, Equations (14) and (15)).

The method (i) allows easy application to such fields as would demand high-speed torque response, for example, brushless DC motor drive systems used in machine tools, industrial robots, and the like, where a voltage-fed inverter is previously provided with an instantaneous current detector to implement a high-speed current control system so that there is no need of providing a special device for high efficiency. It is because the current response becomes generally equal to the torque response in brushless DC motors that the high-speed current control system is implemented. This allows a high-speed torque response to be realized.

Meanwhile, the brushless DC motor drive system in household electrical appliances such as air conditioners, washers, and cleaners is based on a simple control system in which the voltage waveform is controlled by only a voltage-fed inverter in response to a position signal derived from detecting the position of the rotor of the brushless DC motor. Therefore, the above (i) method, if applied, would make it necessary not only to newly provide an instantaneous current detector but also to enhance the control operation function, particularly when a buried-magnet DC motor is adopted. As a result, a high-performance microcomputer needs to be substituted for or be added to an existing microcomputer, which incurs a great increase in cost.

In view of these and other problems, it has been proposed to adopt such a constitution for brushless DC motor drive systems in household electrical appliances such as air conditioners, washers, and cleaners that the voltage-fed inverter is controlled so that the phase of the inverter output voltage relative to the phase of the motor counter-electromotive voltage will be set to a specified phase in response to a rotation speed of the brushless DC motor, in addition to the simple control system in which the voltage waveform is controlled by only a voltage-fed inverter in response to a position signal resulting from detecting the rotor position of the brushless DC motor. Adopting this constitution involves neither an instantaneous current detector nor a high-performance microcomputer, so that the aforementioned increase in cost can be largely reduced.

As described above, with the constitution that the voltage-fed inverter is controlled so that the phase of the inverter output voltage relative to the phase of the motor counter-electromotive voltage will be set to a specified phase in response to a rotation speed of the brushless DC motor, the motor is enabled to attain high-efficiency operation as far as the operation is limited to around the rated point. However, the motor generally runs quite away from the rated point considerably longer than it does around the rated point. In the operation during the former period, the current value would not lower even if the voltage amplitude is reduced with a less load, so that a current more than necessary would be passed. As a result, the motor can be operated only at efficiencies lower than its best possible efficiency (peak efficiency at different load conditions) to a disadvantage.

In more detail, if a buried-magnet DC motor with a d-axis inductance Ld of 65 mH and a q-axis inductance Lq of 15.0 mH and a counter-electromotive voltage coefficient Ke of 0.105 Vs/rad is driven at a rotation speed 90 rps., and if the phase of the motor counter-electromotive voltage and the phase of the inverter output voltage are set to 50° and 80°, respectively, then it can be understood from FIG. 1, which charts the motor output characteristic and motor current characteristic relative to the line voltage amplitude of the voltage-fed inverter, that although a brushless DC motor can be operated at larger output with larger settings of phase δ, the current value would show almost no decrease even if the line voltage amplitude of the voltage-fed inverter (amplitude of fundamental wave components) is reduced with lighter loads.

Also, when the peak motor efficiency at different rotation speeds was measured with the load set to 10 kgf.cm and the phase δ adjusted by manual operation, a characteristic as marked by white circles in FIG. 2 was obtained. In contrast, when the motor efficiency with a low load at different rotation speeds was measured with a phase δ that is optimum for a high load (20 kgf.cm), a characteristic as marked by white triangles in FIG. 2 was obtained. Therefore, it can be understood that the motor efficiency lowers to a large extent when the motor is operated with a light load. Further, the larger the winding resistance is, the more noticeably the motor efficiency lowers.

FIG. 3 is a block diagram schematically showing the arrangement of a conventional brushless DC motor system.

and FIG. 4 is a block diagram showing the main part of the control circuit in FIG. 3. As shown in FIG. 3, the conventional brushless DC motor system is so arranged that an AC voltage 91 is converted into a DC voltage by a converter 92a of a voltage-fed inverter 92 and thereafter converted into an AC voltage by an inverter main part 92b and, as such, supplied to a brushless DC motor 93, where the magnetic-pole position of the rotor of the brushless DC motor 93 is detected by a position sensor circuit 94 and a switching command is generated by a control circuit 96 in response to a magnetic-pole position detection signal and then fed to the voltage-fed inverter 92.

Also, as shown in FIG. 4, the control circuit 96 comprises an amplitude command output section 96a for receiving inputs of, for example, an actual rotation speed and a rotation speed command, which are obtained based on the time interval of magnetic-pole position detection signals outputted by the position sensor circuit 94, and a phase table 96b for outputting a phase command corresponding to the actual rotation speed by taking the actual rotation speed as a read address, whereby an amplitude command and a phase command are fed to an unshown PWM circuit so that a switching command is generated.

The amplitude command output section 96a calculates, for example, a difference $\Delta Y$ between a rotation speed command $Y^*$ and an actual rotation speed Y, and performs a PI operation of $V^*=Kp \cdot \Delta Y+KI \cdot \sigma(\Delta Y)$ by using the resulting difference $\Delta Y$, thereby determining and outputting an amplitude command $V^*$, where Kp and KI are each a constant and given by, for example, values obtained experientially.

Therefore, a switching command is generated by feeding the amplitude command $V^*$ calculated from the difference between rotation speed command $Y^*$ and actual rotation speed Y as well as a phase command read from the phase table 96b to the PWM circuit, whereby the actual rotation speed Y can be approached and equalized to the rotation speed command $Y^*$.

However, when the above-described brushless DC motor control circuit is adopted, the motor efficiency with light loads would deteriorate to a large extent. Also, over the high-speed region in which the induced voltage of the brushless DC motor with no loads becomes larger than the inverter output voltage amplitude (a region in which the motor induced voltage is suppressed from increasing by utilizing the stator-to-armature reaction, that is, magnetic-flux weakening control is effected), the motor could not be controlled in such a way that the motor current is minimized by fixing the inverter voltage at a maximum.

These points are now described in more detail.

FIG. 5 shows an equivalent circuit of one phase portion of the brushless DC motor. As shown in the figure, this equivalent circuit has a motor winding resistance R, a reactance Xq on the q-axis, and an induced voltage (more precisely, a voltage resulting from adding the product of a difference between q-axis reactance Xq and d-axis reactance Xd and a d-axis component Id of motor current to the counter-electromotive voltage E) connected in series with the inverter fundamental-wave voltage V in this order. It is noted that j in FIG. 5 represents an imaginary number.

In this arrangement, assuming that the frequency of inverter fundamental wave is $\omega$ (where the number of revolutions is $\omega/n$ in the case of a brushless DC motor with n pairs of magnetic poles), the inductances on the d- and q-axes are Ld and Lq, respectively, the counter-electromotive voltage coefficient is Ke, the motor current is I, the d-axis component and q-axis component of the motor current I are Id and Iq, respectively, the output torque is T, the d-axis component and q-axis component of the inverter fundamental-wave voltage V are Vd and Vq, respectively, and that the motor winding resistance R is substantially smaller than the magnitude |X| of the reactance, then the following relational equations are obtained:

$$|I|=(Id^2+Iq^2)^{1/2}=[\{(Vd/\omega)/Xq\}^2+\{(Vq/\omega-Ke)/Xd\}^2]^{1/2}$$

$$T=\eta\{E+(Xq-Xd) \cdot Id\} \cdot Iq/\omega=\eta\{Ke \cdot Iq+(Lq-Ld) \cdot Id \cdot Iq\}$$

Then, on a brushless DC motor with motor constants Ld=6.5 mH, Lq=15.0 mH, Ke=0.15 V.s/rad, when the output torque and the amplitude of motor current were calculated while the inverter fundamental-wave voltage amplitude $|V|\{=(Vd^2+Vq^2)^{1/2}\}$ was varied, results as shown in FIGS. 6A and 6B were obtained, where the number n of motor pole pairs was 2 and the rotation speed was set to 90 rps.

As apparent from FIGS. 6A and 6B, such a reciprocal relationship is shown that the motor current amplitude increases even if the output torque T is decreased. That is, the joule loss of motor windings becomes greater with a light load (i.e., with a small output torque) than it is with a heavy load, so that the efficiency would lower considerably. Also, since the motor current amplitude becomes quite large with a light load, switching devices and the like with greater current capacities must be adopted as those constituting the voltage-fed inverter.

Further, since the rotation speed of the brushless DC motor is controlled by adjusting the voltage amplitude of the voltage-fed inverter (PWM duty factor), the phase is fixed so that the voltage amplitude command will not be saturated at the time of acceleration in order to stably operate the speed control system. As a result, it is impossible to set such a phase that the voltage amplitude of the inverter is maximized at a constant speed. In other words, it is necessary to ensure margins for voltage amplitude adjustment at all times. Accordingly, it is impossible to perform such control that the motor current is minimized with the steady-state voltage amplitude of the voltage-fed inverter fixed at a maximum.

The above-described disadvantages would be involved similarly in both cases of brushless DC motors in which a permanent magnet is disposed inside the rotor (buried-magnet motors), and brushless DC motors in which a permanent magnet is disposed on the surface of the rotor (surface-magnet motors).

DISCLOSURE OF INVENTION

The present invention has been achieved in view of the aforementioned problems. A first object of the present invention is, therefore, in a brushless DC motor system in which the brushless DC motor is controlled by controlling the voltage waveform only with a voltage-fed inverter in response to a position signal, to attain high-efficiency operation regardless of load variations and to implement an extended range of operation and high-efficiency operation without additionally providing any special device, and yet to reduce the current capacity of switching devices or the like of the voltage-fed inverter.

A further object of the present invention is to provide a DC motor system and an AC motor system which can be operated at peak efficiency while each motor can be prevented from stepping out.

In order to achieve the above first object, the present invention provides a method for controlling a brushless DC motor including steps of detecting a rotation speed and a rotor position of a brushless DC motor driven by a voltage-fed inverter, and setting in response to the detected rotation speed such a switching command to the voltage-fed inverter that a phase of an inverter output voltage relative to a phase of a motor counter-electromotive voltage is set to a specified phase, the method being characterized by further comprising steps of: detecting an input current of the voltage-fed inverter, and setting such a switching command to the voltage-fed inverter that the phase of the inverter output voltage relative to the phase of the motor counter-electromotive voltage is set to a phase at which motor efficiency comes generally to a peak, in response to the detected rotation speed and the detected input current.

Also, a brushless DC motor system for embodying this control method comprises a detection means for detecting an input current of a voltage-fed inverter, and an inverter control means for setting such a switching command to the voltage-fed inverter that a phase of an inverter output voltage relative to a phase of the motor counter-electromotive voltage is set to a phase at which motor efficiency comes generally to a peak, in response to the detected rotation speed of the brushless DC motor and the detected input current.

With this arrangement, since the phase of the inverter output voltage is set by taking into account not only the rotation speed of the brushless DC motor but also the load condition, the brushless DC motor system can be operated at high efficiency regardless of rotation speed and load condition. In more detail, since the voltage-fed inverter is high in conversion efficiency and yet the household electrical appliance to which the conventional method (ii) is applied is set to a large power factor, the effective output of the brushless DC motor can be estimated based on the input current of the voltage-fed inverter. Therefore, by setting such a switching command to the voltage-fed inverter that the phase of the inverter output voltage is set to a phase at which motor efficiency comes generally to a peak in response to the input current of the voltage-fed inverter, the brushless DC motor system can be operated at high efficiency regardless of load condition. Furthermore, no instantaneous current detector is required, and moreover, because there is no need of performing current control in response to an instantaneous current, no device therefor is required, either. Accordingly, increase in cost can be suppressed considerably.

In a brushless DC motor system according to one embodiment, the inverter control means further comprises a phase holding means for holding a phase at which a peak motor efficiency can be obtained with the rotation speed and the input current, the phase having been obtained by previously performing actual measurements, and the inverter control means sets a switching command to the voltage-fed inverter by reading a corresponding phase from the phase holding means as the phase at which motor efficiency comes generally to a peak, in response to the detected rotation speed and the detected input current.

In another embodiment, the inverter control means further comprises a value holding means for holding values that prescribe a variation characteristic of a phase at which a peak motor efficiency can be obtained with the rotation speed and the input current, the values having been obtained by previously performing actual measurements, and a linear approximation means for linearly approximating a phase based on a value held in the value holding means, and the inverter control means reads a corresponding value from the value holding means in response to a detected rotation speed and a detected input current, obtains a phase through a linear approximation with the linear approximation means, and sets a switching command to the voltage-fed inverter with the obtained phase taken as the phase at which the motor efficiency comes to a peak. Accordingly, the number of phases that need to be previously obtained through actual measurements can be reduced.

In a control method according to one embodiment, the phase at which motor efficiency comes generally to a peak leads, by a specified value, a phase at which the brushless DC motor is driven at peak efficiency. In a control system for embodying this method, the inverter control means further comprises a phase correction means for setting a switching command to the voltage-fed inverter by advancing by a specified value the phase at which the motor efficiency comes to a peak.

With this arrangement, the upper limit of output can be enhanced while almost no deterioration in efficiency is involved. Furthermore, for example, even if the brushless DC motor may stall due to slow response of input current detection, fast variation in load, and incapability of appropriately controlling the phase, the brushless DC motor can be made to continuously run without stalling due to the upper limit value of output enhanced as described above. That is, the motor reliability can be enhanced with the efficiency kept almost no deteriorated.

Also, the present invention provides a method for controlling a brushless DC motor including steps of detecting a rotation speed and a rotor position of a brushless DC motor driven by a voltage-fed inverter, and setting in response to the detected rotation speed such a switching command to the voltage-fed inverter that a phase of an inverter output voltage relative to a phase of a motor counter-electromotive voltage is set to a specified phase, the method being characterized by further comprising steps of: setting an output voltage amplitude of the voltage-fed inverter to a specified amplitude that is determined based on the detected rotation speed, and setting in response to a difference between a rotation speed command to the brushless DC motor and the detected rotation speed such a switching command to the voltage-fed inverter that the phase relative to the motor counter-electromotive voltage is set to a specified phase and that a terminal voltage conduction width of the voltage-fed inverter is set to 180° in electrical angle.

In order to embody this control method, a brushless DC motor system of the present invention has an inverter control means for setting a switching command to the voltage-fed inverter in the way as described above.

Therefore, according to the present invention, there is no need of margins for output voltage amplitude adjustment, such as in a case where the rotation speed is controlled by adjusting the output voltage amplitude of the voltage-fed inverter, so that the motor can be operated over a wider range by controlling the rotation speed with the output voltage amplitude of the voltage-fed inverter fixed to a maximum. Also, since the motor current amplitude can be reduced by reducing the output torque, the motor efficiency can be improved to a large extent at light loads. Further, since the motor current amplitude can be reduced, switching devices or the like of the voltage-fed inverter can be reduced in current capacity. Furthermore, since the conduction width of the voltage-fed inverter is 180° in electrical angle, the out-of-control period can be reduced to 0° in electrical angle. As a result, the motor terminal voltages can be increased, so that the motor can be operated over a wider range. Moreover, based on the fact that the motor terminal voltages can be increased, the amount of increase in motor current can be suppressed to small, so that the efficiency of the brushless DC motor can be enhanced by suppressing the increase in joule losses due to the motor windings, that the current can be passed in a desired direction over a range of 180° in electrical angle of the permanent magnet mounted on the rotor of the brushless DC motor, and further that the ratio of use of magnetic flux can be suppressed from lowering. Thus, the efficiency of the brushless DC motor can be enhanced.

In one embodiment, the rotor of the brushless DC motor is a rotor having a permanent magnet disposed inside. In this case, not only a torque due to the magnet but also a torque due to the reluctance are generated, so that the generated torque on the whole can be increased without increasing the motor current. Also, the inductance of the motor windings can be increased (i.e., the magnetic-flux weakening effect can be increased) as compared with the surface-magnet motors, the motor can be operated with higher speeds than the surface-magnet motors. Further, based on the increased inductance of the motor windings, current ripples due to inverter lower-order harmonic-components can be reduced, so that torque ripples can also be reduced.

According to one embodiment, a method for controlling a brushless DC motor comprises steps of obtaining a first neutral-point voltage by connecting resistors, which are connected at one end, respectively, to output terminals of individual phases of the voltage-fed inverter, to one another at the other end, obtaining a second neutral-point voltage by connecting stator windings of individual phases of the brushless DC motor to one another at one end, and detecting a magnetic-pole position of the rotor of the brushless DC motor based on a difference between the first neutral-point voltage and the second neutral-point voltage.

A brushless DC motor system for embodying this method further comprises resistors which are connected to at one end, respectively, to output terminals of individual phases of the voltage-fed inverter and connected at the other end to one another, a difference-voltage output means for receiving, as inputs, a first neutral-point voltage obtained at the other ends of the resistors, and a second neutral-point voltage obtained at one end of stator windings of individual phases of the brushless DC motor at which the stator windings are connected to one another, and for delivering, as an output, a difference voltage between the two neutral-point voltages, and a rotor-position sensor means for detecting a magnetic-pole position of the rotor of the brushless DC motor based on the difference voltage.

With this arrangement, the magnetic-pole position of the rotor can be detected regardless of rotation speed (except for at rest), conduction width, and current amplitude, and yet without providing any special sensor for detecting the magnetic-pole position of the rotor.

When the brushless DC motor system according to any one of the aforementioned embodiments is adopted as a drive source in an electrical appliance, the motor can be operated over an expanded operational range without involving increase in size of the drive source due to the expansion of the operational range of the brushless DC motor as a drive source. Moreover, the power consumption can be reduced because of the enhanced efficiency of the brushless DC motor as a drive source.

Further, the present invention provides a motor system including a rotor, a stator having armature coils, an inverter for switching a voltage pattern to be applied to the armature coils, the motor system being characterized by further comprising a control means for controlling an output of the inverter so that a specified efficiency (desirably, peak efficiency) is obtained, based on a neutral-point voltage of the armature coils.

With this arrangement, for example, there is a correlation between the neutral-point voltage of the armature coils and the motor efficiency. That is, if the motor comes to a specified efficiency when the neutral-point voltage is at a specified level or if the motor efficiency comes to a peak when the neutral-point voltage is at a minimum, then the control means operates the motor at a desired efficiency by performing phase control or voltage control of an output of the inverter based on a neutral-point voltage of the armature coils.

Therefore, the motor can be operated at an arbitrary efficiency by controlling the output of the inverter based on the neutral-point voltage with the use of the characteristic of the neutral-point voltage of the armature coils with respect to the motor efficiency. Also, when the motor steps out with the level of the neutral-point voltage of the armature coils less than a certain value, the motor can be prevented from stepping out by controlling the output of the inverter so that the level of the neutral-point voltage will not become less than a certain value.

In one embodiment, the armature coils are connected in a three-phase star configuration and comprise a resistor circuit connected in three-phase star configuration in parallel to the armature coils and a rotor-position sensor means for detecting a relative rotor position between the rotor and the stator, and thereby outputting a position signal. The control means comprises a level decision means for deciding a relationship how a level of a voltage difference signal representing a voltage difference between the neutral point of the armature coils and a neutral point of the resistor circuit is related to a target value (desirably, a target value at which a peak efficiency is obtained), and a phase correction means for adjusting a time interval from the position signal to a switching of the voltage pattern so that the level of the voltage difference signal becomes the target value, based on a decision result of the level decision means. The inverter switches over the voltage pattern to be applied to the armature coils, based on a signal representing the phase-corrected voltage pattern derived from the phase correction means.

Therefore, the motor can be operated at an arbitrary efficiency by setting the target value with which the level of the voltage difference signal is decided, to a level at which a desired efficiency is obtained. Also, the motor can be prevented from stepping out, based on the ground that the phase of voltage pattern is not adjusted to the step-out area pattern on the phase lag side of the peak efficiency point when the motor is operated at a desired efficiency with the voltage pattern gradually adjusted from leading to lagging phase.

According to another embodiment, the control means comprises a level decision means for deciding a relationship how a level of an integral signal derived from integrating a voltage difference signal representing a voltage difference between the neutral point of the armature coils and a neutral point of the resistor circuit is related to a target value (desirably, a target value at which a peak efficiency is obtained), and a phase correction means for adjusting a time interval from the position signal to a switching of the voltage pattern so that the level of the integral signal becomes the target value, based on a decision result of the level decision means. The inverter switches over the voltage pattern to be applied to the armature coils based on a signal representing the phase-corrected voltage pattern derived from the phase correction means.

Therefore, the motor can be operated at an arbitrary efficiency by setting the target value with which the level of the integral signal is decided, to a level at which a desired efficiency is obtained. Also, the motor can be operated at a specified efficiency more easily than it is by deciding the level of a voltage difference signal, if the level of the integral signal with the desired efficiency is generally constant even with varying running frequency, on the ground that the integral signal is obtained by integrating a voltage difference signal. Further, the motor can be prevented from stepping out, based on the ground that the phase of voltage pattern is not adjusted to the step-out area pattern on the phase lag side of the peak efficiency point when the motor is operated at a desired efficiency with the voltage pattern gradually adjusted from leading to lagging phase.

In a motor system according to one embodiment, the armature coils are connected in a three-phase star configuration and comprise a resistor circuit connected in a three-phase star configuration in parallel to the armature coils, and the control means comprises a level decision means for deciding a relationship how a level of a voltage difference signal representing a voltage difference between the neutral point of the armature coils and a neutral point of the resistor circuit is related to a target value (desirably, a target value at which a peak efficiency is obtained), and a voltage correction means for correcting an output voltage of the inverter so that the level of the voltage difference signal becomes the target value, based on a decision result of the level decision means.

Therefore, the motor can be operated at an arbitrary efficiency by setting the target value with which the level of the voltage difference signal is decided, to a level at which a desired efficiency is obtained. Also, the motor can be prevented from stepping out, based on the ground that the output voltage is not adjusted to the step-out area on a side where the output voltage is higher than the peak efficiency point when the motor is operated at a desired efficiency by adjusting the output voltage of the inverter so that it becomes gradually higher from a voltage lower than the output voltage at the peak efficiency point.

In one embodiment, the control means comprises a level decision means for deciding a relationship how a level of an integral signal derived from integrating a voltage difference signal representing a voltage difference between the neutral point of the armature coils and a neutral point of the resistor circuit is related to a target value (desirably, a target value at which a peak efficiency is obtained), and a voltage correction means for correcting an output voltage of the inverter so that the level of the integral signal becomes the target value, based on a decision result of the level decision means.

With this arrangement, the motor can be operated at an arbitrary efficiency by setting the target value with which the level of the integral signal is decided, to a level at which a desired efficiency is obtained. Also, since the integral signal is obtained by integrating a voltage difference signal, the motor can be operated at a specified efficiency more easily than it is by deciding the level of the voltage difference signal, when the level of the integral signal at the desired efficiency becomes generally constant even with varying running frequency. Further, the motor can be prevented from stepping out, based on the ground that the output voltage is not adjusted to the step-out area on a side where the output voltage is higher than the peak efficiency point when the motor is operated at a desired efficiency by adjusting the output voltage of the inverter so that it becomes gradually higher from a voltage lower than the output voltage at the peak efficiency point.

Still further, the present invention provides a motor system comprising a rotor having a magnet with a plurality of poles, a stator having armature coils connected in a three-phase star configuration, a resistor circuit connected in a three-phase star configuration in parallel to the armature coils, a rotational-position sensor means for detecting a voltage difference signal representing a voltage difference between a neutral point of the armature coils and a neutral point of the resistor circuit, detecting a relative rotational position between the rotor and the stator based on the voltage difference signal, and thereby outputting a position signal, and an inverter for switching over a voltage pattern to be applied to the armature coils based on the position signal of the rotational-position sensor means, the motor system being characterized by further comprising: an integration means for integrating the voltage difference signal detected by the rotational-position sensor means and outputting an integral signal; a level decision means for, upon receiving the integral signal from the integration means, deciding a relationship how a level of the integral signal is related to a target value (desirably, a level of the integral signal at which a peak efficiency is obtained); and a phase correction means for adjusting a time interval from the position signal to a switching of the voltage pattern so that the level of the integral signal derived from the integration means becomes the target value, based on a decision result of the level decision means.

In this motor system, the inverter switches over the voltage pattern to be applied to the armature coils based on a signal representing the phase-corrected voltage pattern derived from the phase correction means. Therefore, the motor can be operated at an arbitrary efficiency by setting the target value with which the level of the integral signal is decided, to a level at which a desired efficiency is obtained. Also, the motor can be prevented from stepping out, based on the ground that the phase of the voltage pattern is not adjusted to the step-out area pattern on the phase lag side of the peak efficiency point when the motor is operated at a desired efficiency with the voltage pattern gradually adjusted from leading to lagging phase.

Yet further, the present invention provides a motor system comprising a rotor having a magnet with a plurality of poles, a stator having armature coils connected in a three-phase star configuration, a resistor circuit connected in a three-phase star configuration in parallel to the armature coils, and an inverter for outputting a voltage to be applied to the armature coils, the motor system being characterized by further comprising: an integration means for integrating a voltage difference signal representing a voltage difference between a neutral point of the armature coils and a neutral point of the resistor circuit and outputting an integral signal; a level decision means for, upon receiving the integral signal from the integration means, deciding a relationship how a level of the integral signal is related to a target value (desirably, a level of the integral signal at which a peak efficiency is obtained), and a voltage correction means for correcting an output voltage of the inverter so that the level of the integral signal derived from the integration means becomes the target value, based on a decision result of the level decision means.

With this arrangement, the motor can be operated at an arbitrary efficiency by setting the target value with which the level of the integral signal is decided, to a level at which a desired efficiency is obtained. Also, the motor can be prevented from stepping out, based on the ground that the output voltage is not adjusted to the step-out area on a side where the output voltage is higher than the peak efficiency point when the motor is operated at a desired efficiency by adjusting the output voltage of the inverter so that it becomes gradually higher from a voltage lower than the output voltage at the peak efficiency point.

When the target value of the level decision means is set to a level of the integral signal at which a peak efficiency is obtained, the phase correction means adjusts the output of the inverter so that the level of the integral signal derived from the integration means becomes the target value, or that the motor is operated at peak efficiency. Therefore, the motor can be operated at peak efficiency.

Still further, the present invention provides a motor system comprising a rotor having a magnet with a plurality of poles, a stator having armature coils connected in a three-phase star configuration, a resistor circuit connected in a three-phase star configuration in parallel to the armature coils, a rotational-position sensor means for detecting a voltage difference signal representing a voltage difference between a neutral point of the armature coils and a neutral point of the resistor circuit, detecting a relative rotational position between the rotor and the stator based on the voltage difference signal, and outputting a position signal, and an inverter for switching over a voltage pattern to be applied to the armature coils, the motor system being characterized by further comprising a level decision means for, upon receiving the voltage difference signal detected by the rotational-position sensor means, deciding a relationship how a level of the voltage difference signal is related to a target value (desirably, a level of the voltage difference signal at which a peak efficiency is obtained); and a phase correction means for adjusting a time interval from the position signal to a switching of the voltage pattern so that the level of the voltage difference signal becomes the target value, based on a decision result of the level decision means.

With this arrangement, the motor can be operated at an arbitrary efficiency by setting the target value with which the level of the voltage difference signal is decided, to a level of the voltage difference signal at which a desired efficiency is obtained. Also, the motor can be prevented from stepping out, based on the ground that the phase of the voltage pattern is not adjusted to the step-out area pattern on the phase lag side of the peak efficiency point when the motor is operated at a desired efficiency with the voltage pattern gradually adjusted from leading to lagging phase.

Still further, the present invention provides a motor system comprising a rotor having a magnet with a plurality of poles, a stator having armature coils connected in a three-phase star configuration, a resistor circuit connected in a three-phase star configuration in parallel to the armature coils, and an inverter for outputting a voltage to be applied to the armature coils, the motor system being characterized by further comprising: a level decision means for deciding a relationship how a level of a voltage difference signal representing a voltage difference between a neutral point of the armature coils and a neutral point of the resistor circuit is related to a target value (desirably, a level of the voltage difference signal at which a peak efficiency is obtained); and a voltage correction means for correcting an output voltage of the inverter so that the level of the voltage difference signal becomes the target value, based on a decision result of the level decision means.

With this arrangement, the motor can be operated at an arbitrary efficiency by setting the target value with which the level of the voltage difference signal is decided, to a level of the voltage difference signal at which a desired efficiency is obtained. Also, the motor can be prevented from stepping out, based on the ground that the output voltage is not adjusted to the step-out area on a side where the output voltage is higher than the peak efficiency point when the motor is operated at a desired efficiency by adjusting the output voltage of the inverter so that it becomes gradually higher from a voltage lower than the output voltage at the peak efficiency point.

When the target value of the level decision means is set to a level of the voltage difference signal at which a peak efficiency is obtained, the phase correction means adjusts the output of the inverter so that the level of the voltage difference signal becomes the target value, or that the motor is operated at peak efficiency. Therefore, the motor can be operated at peak efficiency.

BEST MODE FOR CARRYING OUT THE INVENTION

Embodiments of the present invention will now be described in detail with reference to the accompanying drawings.

(First Embodiment)

Figure 7:
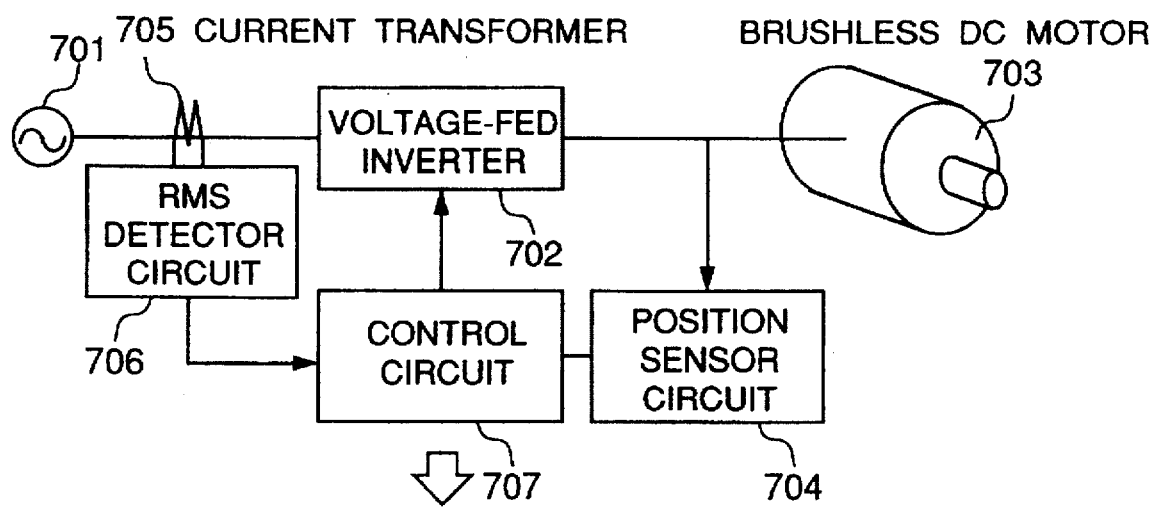
FIG. 7 is a block diagram schematically showing a first embodiment of the brushless DC motor system of the present invention.

FIG. 7 is a block diagram schematically showing a first embodiment of the brushless DC motor system of the present invention. In the present brushless DC motor system, an output voltage from an AC power supply 701 is applied to a voltage-fed inverter 702, and an output voltage from the voltage-fed inverter 702 is applied to a brushless DC motor 703. The motor system has a position sensor circuit 704 which detects a rotor position of the brushless DC motor (hereinafter, referred to simply as a motor) 703 upon receiving an input of a voltage across terminals of the motor 703, a current transformer 705 which detects an input current of the voltage-fed inverter 702, an RMS detector circuit 706 which detects an RMS value of the input current upon receiving a current detection signal outputted from the current transformer 705, and a control circuit 707 which generates a switching command upon receiving a position detection signal outputted from the position sensor circuit 704 and an RMS value detection signal outputted from the RMS detector circuit 706 and supplies the switching command to the voltage-fed inverter 702.

Figure 8:
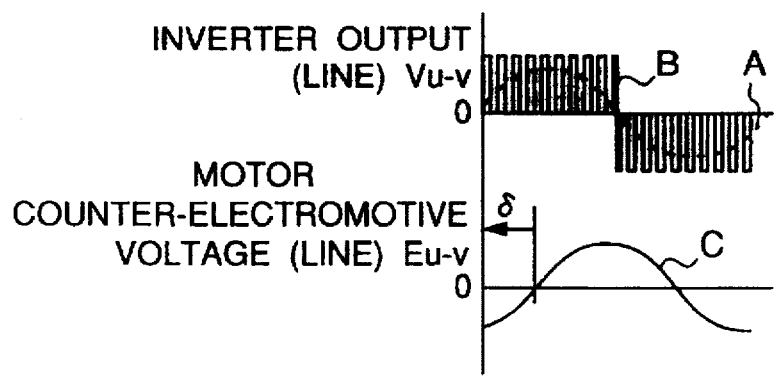
FIG. 8 is a chart showing the line output voltage of the voltage-fed inverter, which is controlled by a switching command, and its corresponding line counter-electromotive voltage of the motor.

The control circuit 707 receives the position detection signal outputted from the position sensor circuit 704 so as to calculate a phase of a motor counter-electromotive voltage, and calculates a cycle of the position detection signal so as to calculate a rotation speed of the motor 703 in response to the cycle. In response to the calculated cycle and rotation speed, the control circuit 707 sets a phase of an inverter output voltage relative to the phase of the motor counter-electromotive voltage to a specified phase at which the motor can be operated at a peak efficiency under corresponding conditions, generates a switching command capable of achieving the phase, and outputs the switching command to the voltage-fed inverter 702. Also, the switching command is generated so that it can achieve, for example, even a line voltage corresponding to a voltage amplitude command obtained by subjecting a difference between a speed command value and an actual speed to a PI control (proportional integral control). FIG. 8 shows a fundamental wave of a line output voltage (see A in FIG. 8) of the voltage-fed inverter 702 controlled by the switching command and a motor counter-electromotive voltage (see C in FIG. 8) on the corresponding line, where δ shown in connection with C in FIG. 8 represents the above-mentioned specified phase. It is to be noted that B in FIG. 8 shows a switching waveform of the voltage-fed inverter 702.

In the case of the present embodiment, while the motor 703 is running, the RMS value of the input current of the voltage-fed inverter 702 is detected by the RMS detector circuit 706 and the rotor position of the motor 703 is detected by the position sensor circuit 704 and supplied to the control circuit 707. Then, a cycle of the position detection signal is calculated in the control circuit 707, and a rotation speed is calculated in response to the calculation of the cycle. In the control circuit 707, there is set a phase δ of an inverter output voltage relative to the phase of the motor counter-electromotive voltage for operating the brushless DC motor at a peak efficiency under the corresponding conditions in response to the calculated rotation speed and the RMS value of the input current, while a switching command for achieving the phase δ of the inverter output voltage is generated and outputted to the voltage-fed inverter 702. Consequently, the motor 703 can be operated with the phase of the output voltage of the voltage-fed inverter 702 relative to the phase of the motor counter-electromotive voltage being set at the phase δ, so that the motor can be operated at the peak efficiency under the corresponding load conditions.

Also, neither instantaneous current detector nor control apparatus for executing a current control in response to an instantaneous current is necessary, and since the current transformer 705 and the RMS detector circuit 706 are preparatorily assembled as protection devices into the brushless DC motor system, cost increase can be prevented.

It is preferable that a value of the phase δ of the inverter output voltage is preparatorily measured as an optimum phase in correspondence with, for example, a number of revolutions fm of the motor 703 and an RMS value I of the input current of the voltage-fed inverter 702, and that the control circuit 707 holds the measurement result as, for example, a table as shown in Table 1. It is to be noted that, in such a case, the optimum phase δ corresponding to the rotation speed and the RMS value of the input current are read from the table.

TABLE 1

| Number of revolutions fm = 15 [rps] | | | | | | |
|---|---|---|---|---|---|---|
| Input current | Phase | ... | | fm = 50 [rps] | | ... |
| I [A] | δ° | I [A] | δ° | I [A] | δ° | ... |
| 1.0 | 23 | . | . | 2.6 | 36 | |
| 1.8 | 36 | . | . | 4.7 | 47 | . |
| 2.7 | 45 | . | . | 6.7 | 57 | . |
| 3.7 | 52 | . | . | . | . | . |
| . | . | . | . | . | . | . |
| . | . | . | . | . | . | . |

Figure 1:
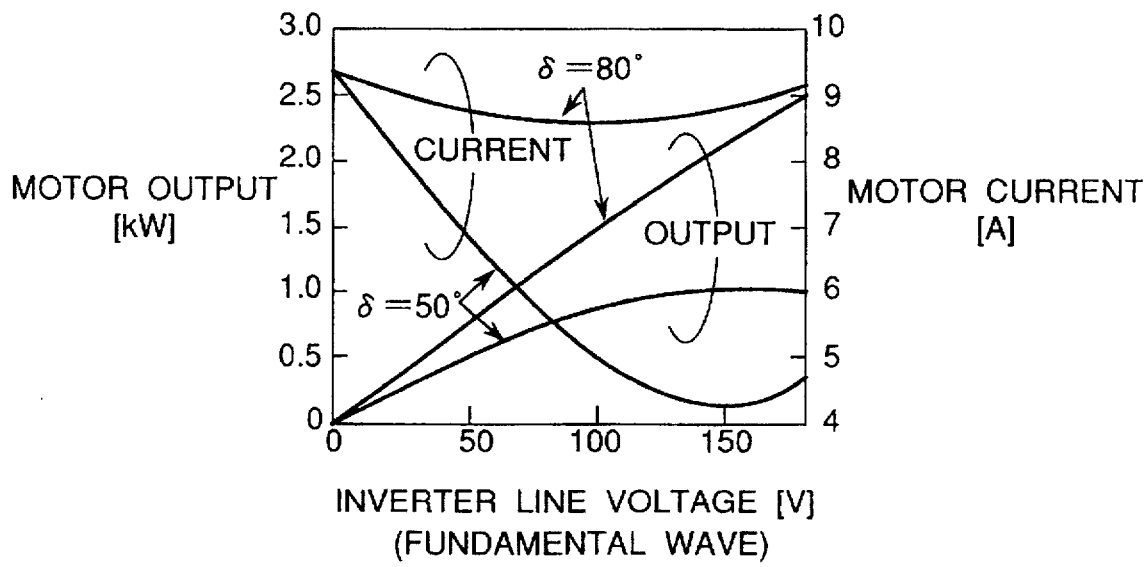
FIG. 1 is a chart showing the motor output and motor current characteristic versus the line voltage amplitude of the voltage-fed inverter.
Figure 2:
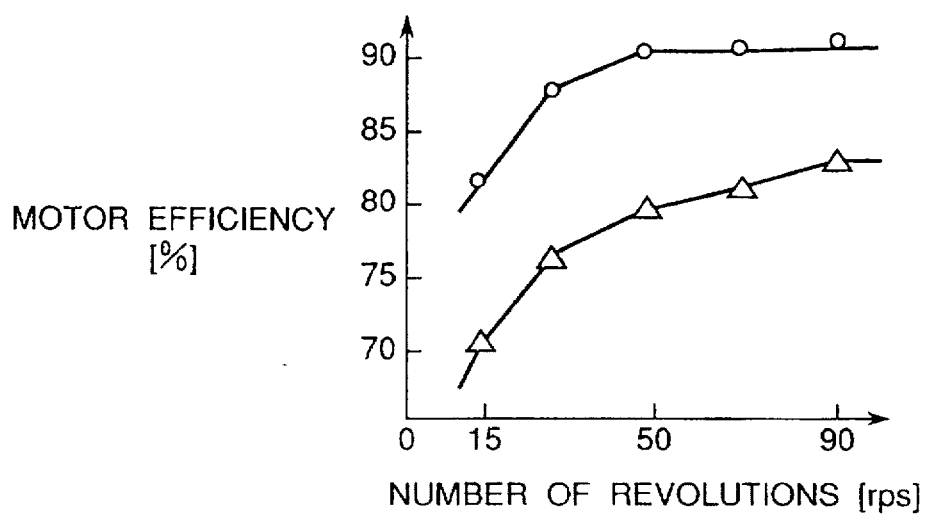
FIG. 2 is a chart showing results of measuring peak motor efficiencies at individual rotation speeds by manually adjusting the phase, and results of measuring the motor efficiency for low loads at individual rotation speeds at a phase optimum for high loads.
Figure 3:
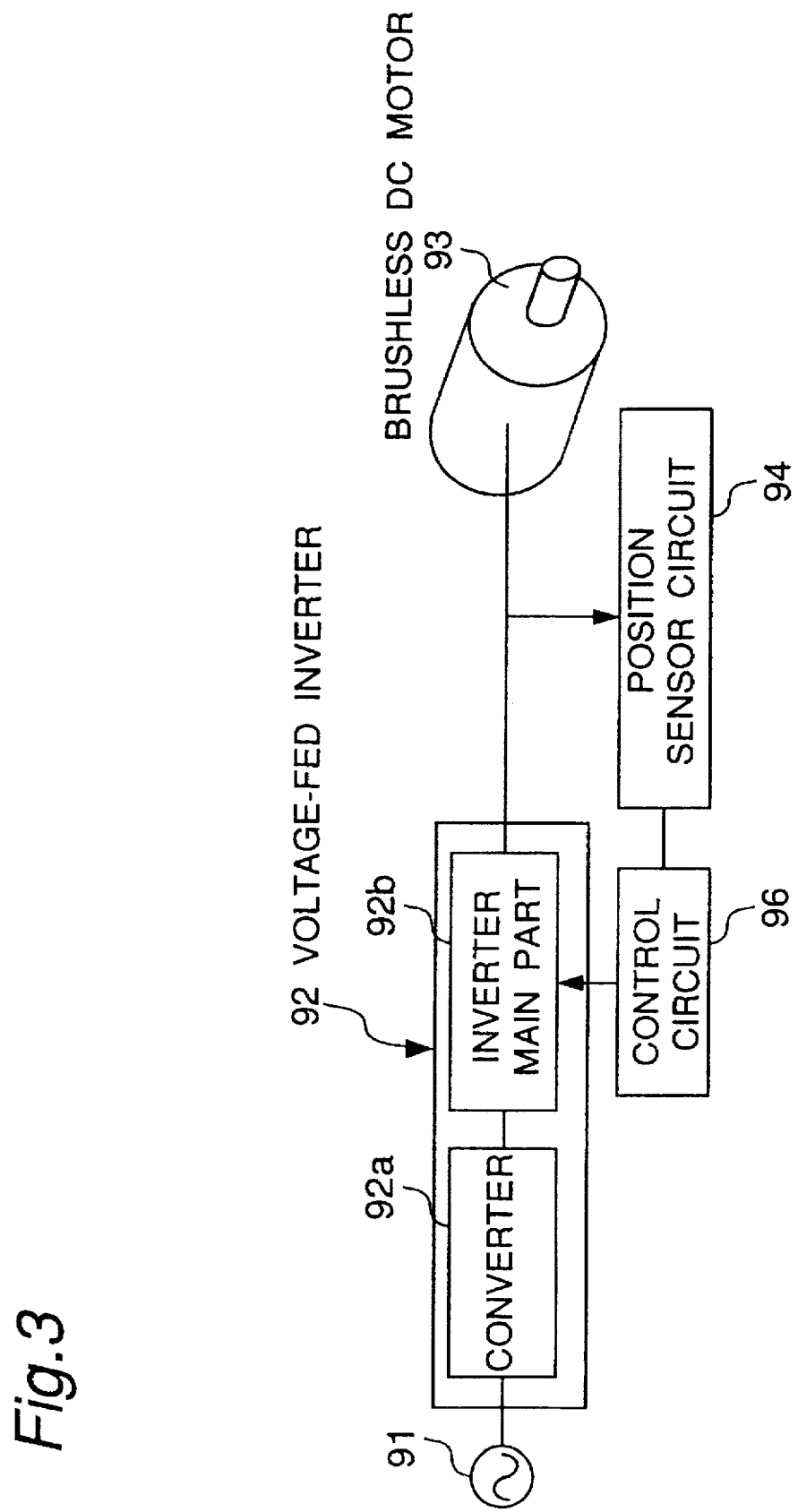
FIG. 3 is a block diagram schematically showing the arrangement of a conventional brushless DC motor system.

By adopting the control circuit 707 having the above-mentioned construction, the motor efficiency indicated by white circles in FIG. 2 can be achieved regardless of a variation of load.

Figure 9:
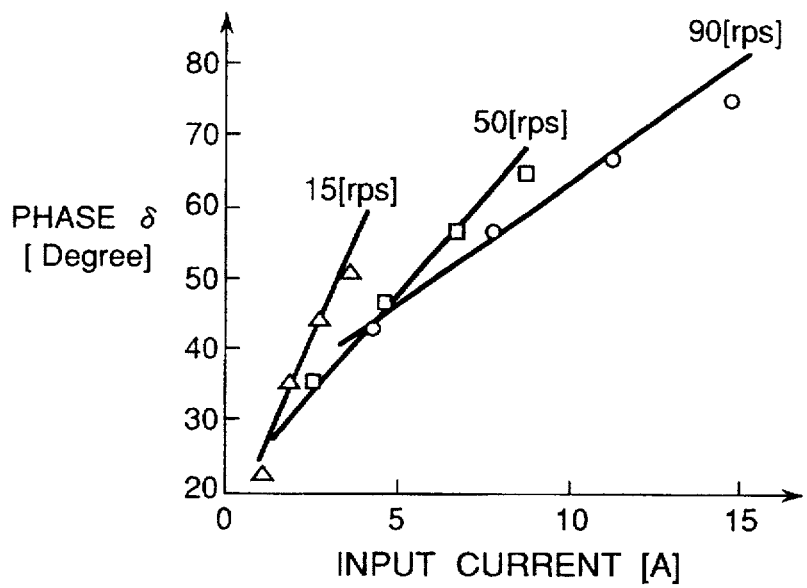
FIG. 9 is a diagram showing relationships between RMS (Root-Mean-Square) value of input current and optimum phase (for obtaining the maximum efficiency of a brushless DC motor) at different rotation speeds.
Figure 10:
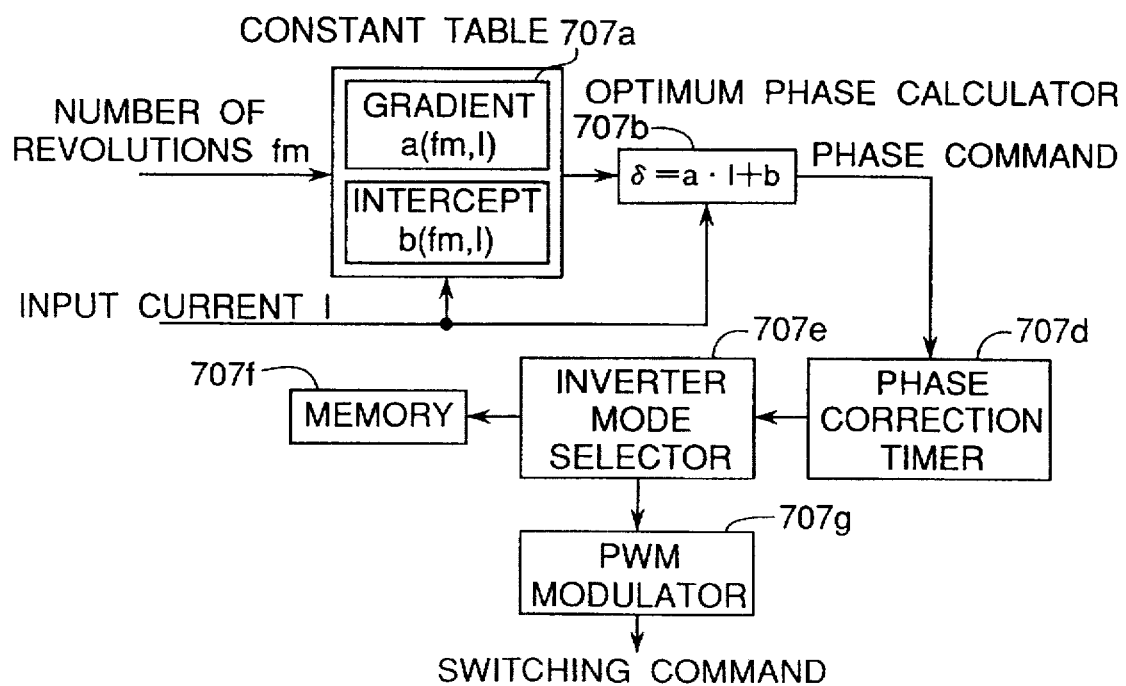
FIG. 10 is a block diagram showing a main part of a modification of the control circuit of the brushless DC motor system of FIG. 7.

Further, a relation between the RMS value I of the input current and the optimum phase δ at each rotation speed is as shown in FIG. 9, where it is found that the optimum phase δ is approximately proportional to the RMS value of the input current. Therefore, by subjecting the relation between the RMS value I of the input current and the optimum phase δ to linear approximation (or polynomial approximation) and performing an approximating calculation, the optimum phase δ corresponding to the RMS value I of an arbitrary input current can be calculated. In practice, as shown in FIG. 10, a gradient "a" (fm, I) and an intercept "b" (fm, I) corresponding to the number of revolutions fm and the RMS value I of the input current are stored as a constant table 707a for the approximating calculation in the control circuit 707. Meanwhile, an optimum phase calculator 707b for calculating the optimum phase δ by performing a calculation of δ=a·I+b based on the gradient "a" and the intercept "b" read from the constant table 707a is provided in the control circuit 707. The number of revolutions fm and the RMS value I of the input current are supplied to the constant table 707a which supplies the corresponding constants "a" and "b" to the optimum phase calculator 707b. To the optimum phase calculator 707b are supplied the constants "a" and "b" and the RMS value I of the input current. The optimum phase δ calculated in the optimum phase calculator 707b is supplied as a timer value to a phase correction timer 707d, and a count expiration signal outputted from the phase correction timer 707d is supplied to an inverter mode selector 707e. Then, the inverter mode selector 707e reads a corresponding voltage pattern from a memory 707f, and gives a switching command to the voltage-fed inverter 702 via a PWM modulator 707g.

As a result of comparing the motor efficiency in a case where the motor 703 is operated based on Table 1 with the motor efficiency in a case where the motor 703 is operated with the construction shown in FIG. 10, an approximately identical motor efficiency is achieved in both the cases.

It is to be noted that, according to the control in the present embodiment, a high efficiency is not always assured during the acceleration or deceleration operation stage of the motor 703 due to influence of a time constant in the RMS detector circuit 706. However, in a steady-state operation stage having a longer operation time than the acceleration or deceleration operation stage, a high-efficiency operation can be achieved as described above, and therefore a remarkably high-efficiency operation can be achieved, as compared with a case in which the conventional method (ii) is adopted.

Figure 11:
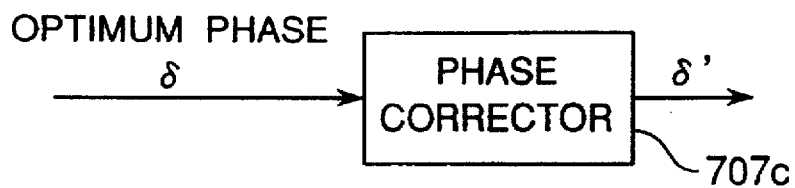
FIG. 11 is a block diagram showing a main part of a modification of the control circuit of the brushless DC motor system of FIG. 7.

FIG. 11 is a block diagram showing an essential part of a modification example of the control circuit in the brushless DC motor system of the first embodiment, in which is included a phase corrector 707c for obtaining a renewed phase δ' by adding a specified constant to the optimum phase δ so as to advance the optimum phase δ obtained from the optimum phase calculator 707b by a specified phase (for example, about several degrees). Then, a switching command is generated corresponding to the renewed phase δ'. It is to be noted that the other portions have the same constructions as those of the first embodiment, and therefore no figure is provided therefor.

In the case of the present modification example, the current controllable by a voltage amplitude is increased by advancing the optimum phase by a specified phase amount, so that the maximum output of the motor 703 is increased. Therefore, even when the RMS detector circuit 706 has a slow response (0.1 to several seconds) and the load varies faster than this to a magnitude greater than the maximum output corresponding to the optimum phase δ, possible stall of the motor 703 is prevented so long as the motor output does not exceed the above-mentioned increased maximum output. As a result, the reliability in control of the brushless DC motor is increased.

Figure 12:
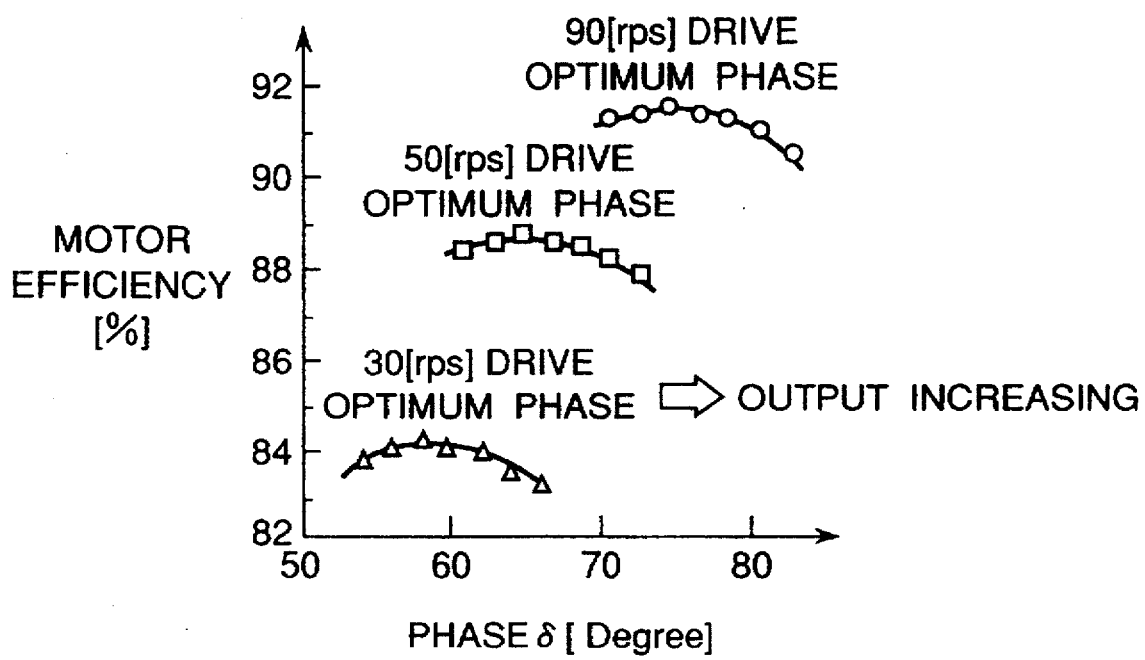
FIG. 12 is a chart showing the motor efficiency characteristic in the vicinity of optimum phases.

It may be feared that the motor efficiency reduces since a phase δ' different from the optimum phase δ is set. However, the motor efficiency characteristic around the optimum phase δ is as shown in FIG. 12, which shows that the reduction of the motor efficiency is remarkably small (not greater than 1%) if the phase is made to advance by several degrees. Therefore, an improved reliability can be achieved while scarcely reducing the motor efficiency.

(Second Embodiment)

Figure 13:
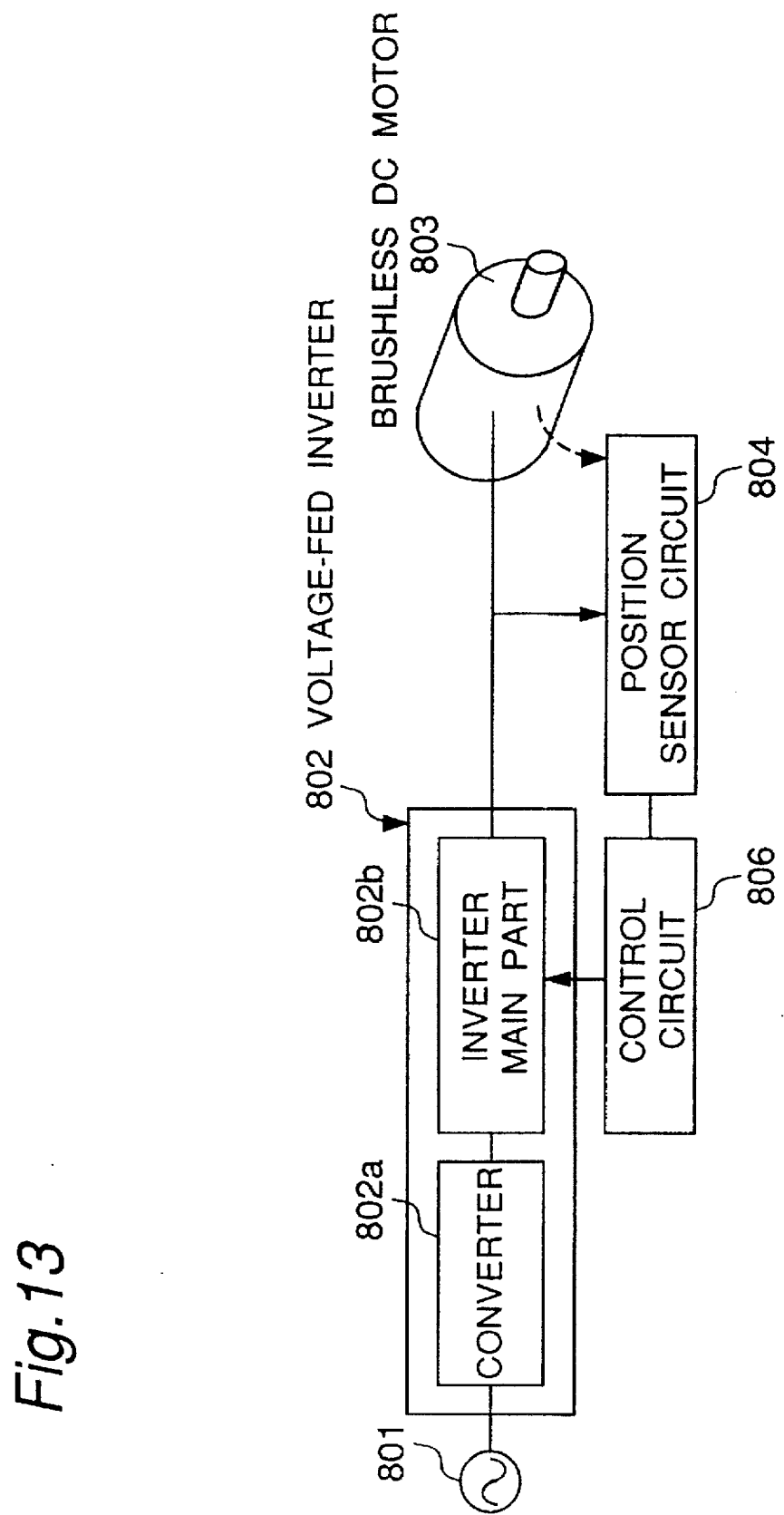
FIG. 13 is a block diagram schematically showing a second embodiment of the brushless DC motor system of the present invention.

FIG. 13 is a schematic block diagram of a brushless DC motor system of a second embodiment of the present invention. After an output voltage from an AC power supply 801 is converted into a DC voltage by a converter 802a in a voltage-fed inverter 802, the converted voltage is applied to an inverter main part 802b of the voltage-fed inverter 802, and an output voltage from the inverter main unit 802b is applied to a brushless DC motor (hereinafter, referred to simply as a motor) 803. The apparatus includes a position sensor circuit 804 which detects a rotor position of the motor 803 upon receiving an input of a voltage across terminals of the motor 803, and a control circuit 806 which generates a switching command upon receiving inputs of a position detection signal outputted from the position sensor circuit 804 and a rotation speed command value given externally and supplies the switching command to the inverter main unit 802b of the voltage-fed inverter 802.

The control circuit 806 receives an input of a position detection signal outputted from the position sensor circuit 804 so as to calculate a phase of a motor counter-electromotive voltage, and calculates a cycle of the position detection signal so as to calculate a rotation speed of the motor 803 in response to the cycle. In response to the calculated cycle, rotation speed and rotation speed command value, a phase relative to the motor counter-electromotive voltage is set to a specified phase at which the motor 803 is operated at a peak efficiency under corresponding conditions, so that the phase can be achieved. In order to set a conduction period to 180° and achieve a specified output voltage amplitude determined uniquely with respect to the calculated rotation speed, the control circuit generates a switching command in response to the calculated rotation speed and outputs the switching command to the voltage-fed inverter 802.

Figure 14:
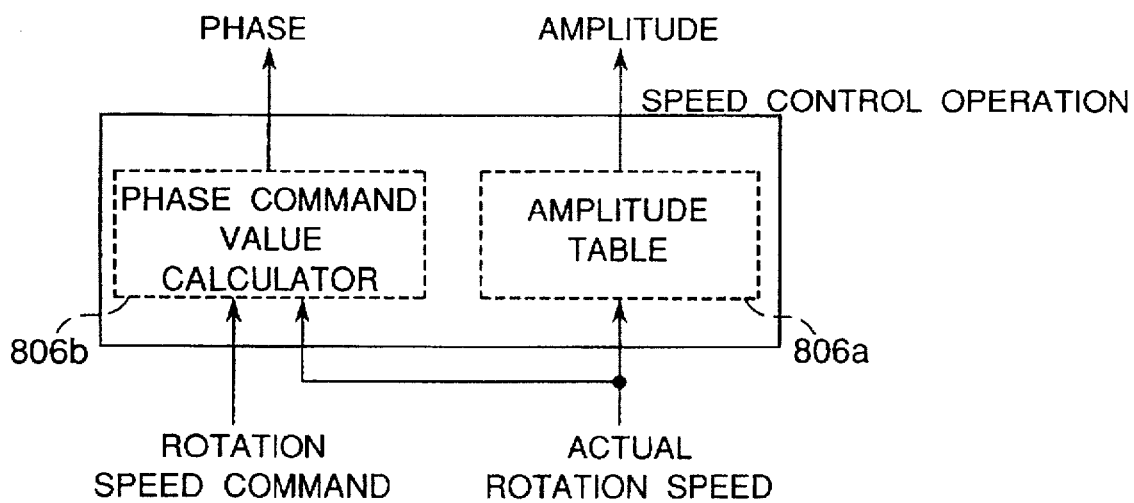
FIG. 14 is a block diagram showing part of the control circuit of the brushless DC motor system of FIG. 13.

FIG. 14 is a block diagram of a part of the control circuit 806. The control circuit 806 includes an amplitude table 806a which receives an input (read address) of a rotation speed of the motor 803 and outputs a specified output voltage amplitude, and a phase command value calculator 806b which receives inputs of the rotation speed and the rotation speed command and performs a PI calculation of ΔY=Y*−Y and φ*=Kp·ΔY+KI·E(ΔY) so as to calculate a phase command φ* and output the resultant. It is to be noted that the output voltage amplitude and the phase command value are supplied to a PWM circuit (not shown). Further, in the above-mentioned equations, Y* is the rotation speed command, Y is a rotation speed, ΔY is a difference between the rotation speed command and the rotation speed, and Kp and KI are constants. Further, the rotation speed Y is an inverse number of a cycle X of the position detection signal.

In the present case, look-up of the amplitude table 806a is effected every cycle in which the phase command is calculated by the phase command value calculator 806b. However, the look-up of the amplitude table 806a can be effected, for example, in accordance with a timing at which the rotation speed of the DC motor 803 varies.

In the present embodiment, while the motor 803 is operated, a rotor position of the motor 803 is detected by the position sensor circuit 804 and then supplied to the control circuit 806. Then, a cycle of the position detection signal is calculated in the control circuit 806, and in response to the calculation of the cycle, the rotation speed is calculated. In the control circuit 806, a phase of the voltage-fed inverter relative to the phase of the motor counter-electromotive voltage is set for the purpose of operating the motor at a peak efficiency under corresponding conditions, so that the phase is achieved. Also, a conduction period is set to 180°, and a switching command for achieving a specified output voltage amplitude determined uniquely with respect to the rotation speed is generated and supplied to the voltage-fed inverter 802. Consequently, the motor 803 can be operated in a state in which the phase of the output voltage of the voltage-fed inverter 802 relative to the motor counter-electromotive voltage is set to the above-mentioned phase and in which the output voltage amplitude is set to the specified output voltage amplitude determined uniquely with respect to the rotation speed, thereby allowing the motor efficiency to be the peak efficiency under the corresponding load conditions. Furthermore, the motor can be operated while fixing the output voltage amplitude of the inverter at maximum in a high-speed region in which the counter-electromotive voltage of the motor in the time of no load is greater than the output voltage amplitude of the voltage-fed inverter, thereby allowing the range of operation to be expanded. Also, a control for minimizing a motor current (increasing the efficiency) in the above-mentioned state can be performed.

Figure 15A:
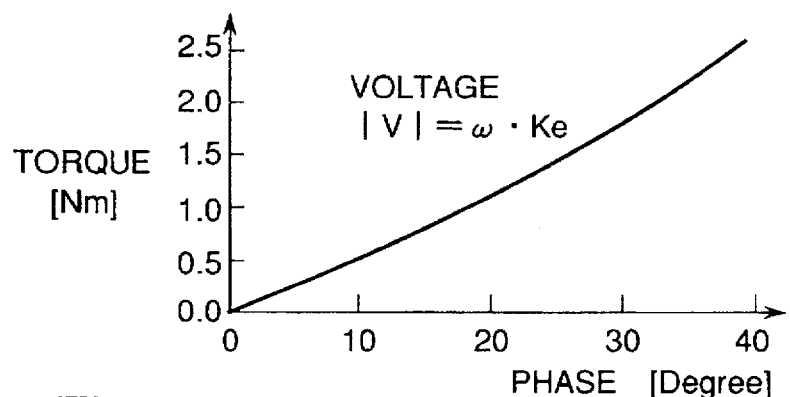
FIGS. 15A and 15B are charts representing the torque-phase characteristic and the current amplitude-phase characteristic, respectively.
Figure 15B:
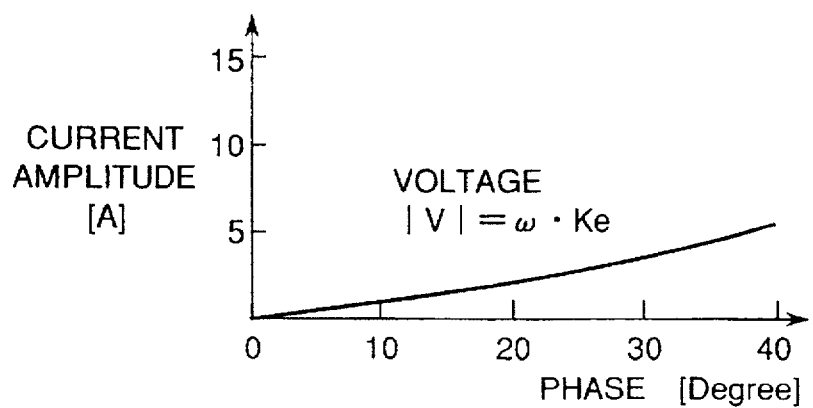

FIG. 15A is a graph of a torque to phase characteristic in a state in which an amplitude |V| of a fundamental wave of an output voltage of the voltage-fed inverter 802 that drives a buried-magnet motor of which d-axis inductance Ld and q-axis inductance Lq are respectively 6.5 mH and 15.0 mH, counter-electromotive voltage coefficient Ke is 0.15 V.s/rad and pole pair number n is 2 is set equal to a product of a rotation speed ω and the counter-electromotive voltage coefficient Ke. FIG. 15B is a graph of a current amplitude to phase characteristic in a state in which the output voltage fundamental wave amplitude |V| of the voltage-fed inverter 802 is set equal to the product of the rotation speed ω and the counter-electromotive voltage coefficient Ke. It can be understood that the torque and the current amplitude are increased by increasing the phase, and conversely the torque and the current amplitude are decreased by decreasing the phase. It is to be herein noted that the phase is given by $\tan^{-1}(Vd/Vq)$, while the torque T and the motor current amplitude are both given by the aforementioned equation.

Figure 4:
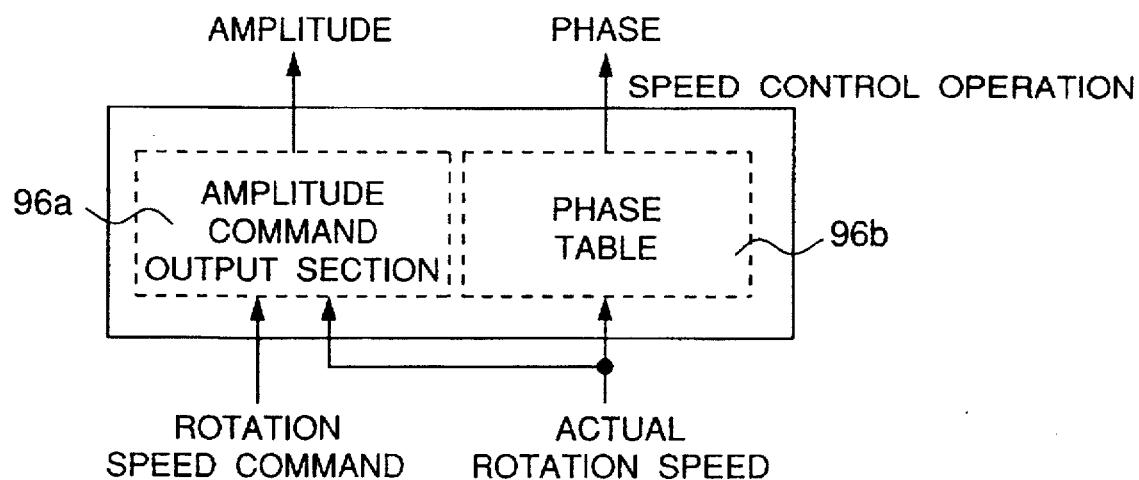
FIG. 4 is a block diagram showing part of the control circuit of the brushless DC motor system of FIG. 3.
Figure 5:
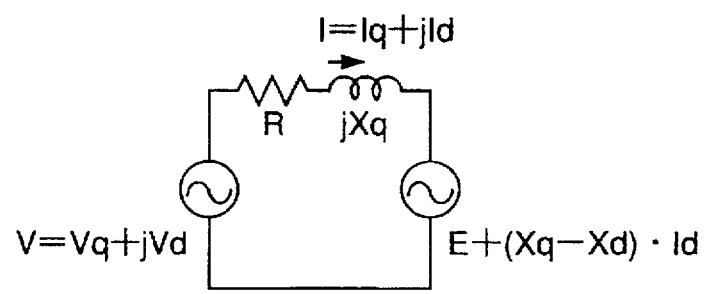
FIG. 5 is a diagram showing the equivalent circuit in a one-phase portion of a brushless DC motor.
Figure 6A:
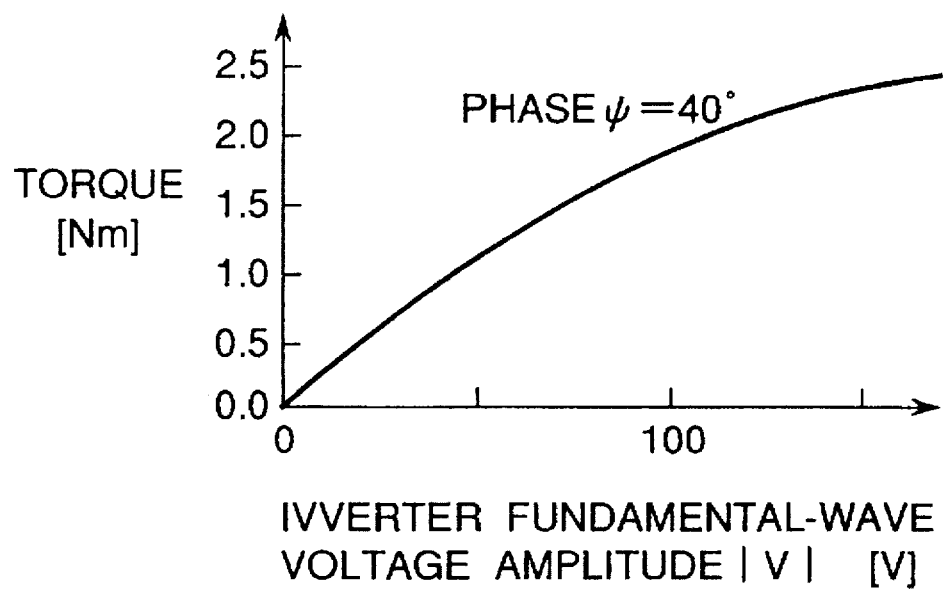
FIGS. 6A and 6B are charts showing the torque-phase characteristic and the current amplitude-phase characteristic, respectively.
Figure 6B:
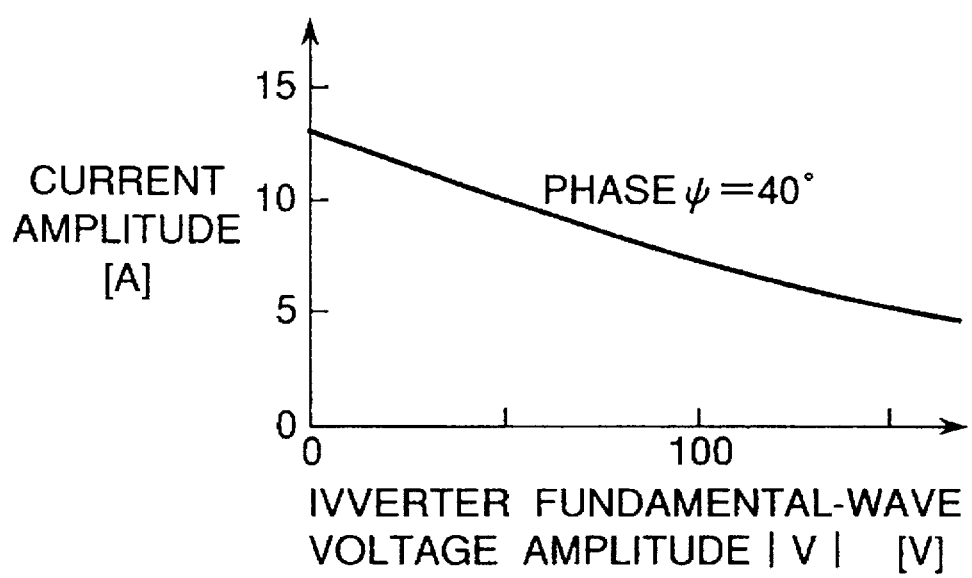
Figure 16:
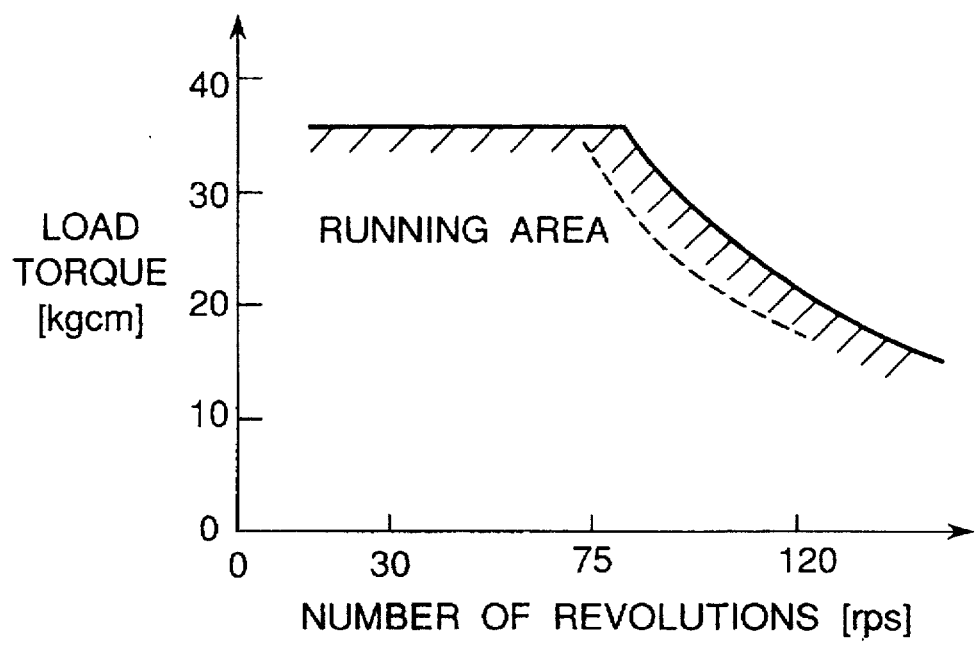
FIG. 16 is a chart showing running areas when the buried-magnet motor is driven by the control circuit of the second embodiment and driven by the conventional control circuit.

A case where a buried-magnet motor of which d-axis inductance Ld and q-axis inductance Lq are respectively 6.5 mH and 15.0 mH, counter-electromotive voltage coefficient Ke is 0.15 V.s/rad and pole pair number n is 2 is driven by the control apparatus of the present embodiment was compared with a case where the motor is driven by the prior art control apparatus in regard to their operation (i.e., running) areas, the comparison result being as shown in FIG. 16 (wherein a solid line indicates the case where the motor is driven by the control apparatus of the present embodiment, while a dotted line indicates the case where the motor is driven by the prior art control apparatus shown in FIG. 4). It can be understood that the operation area has been expanded to the high-speed side by driving the brushless DC motor by means of the control apparatus of the present embodiment. It is to be noted that, in the prior art control apparatus, a control system is designed so that the inverter maximum voltage in the steady-state stage (high-speed stage) is reduced by about 10% as compared with the control apparatus of the present embodiment, taking a control margin into account.

Figure 17:
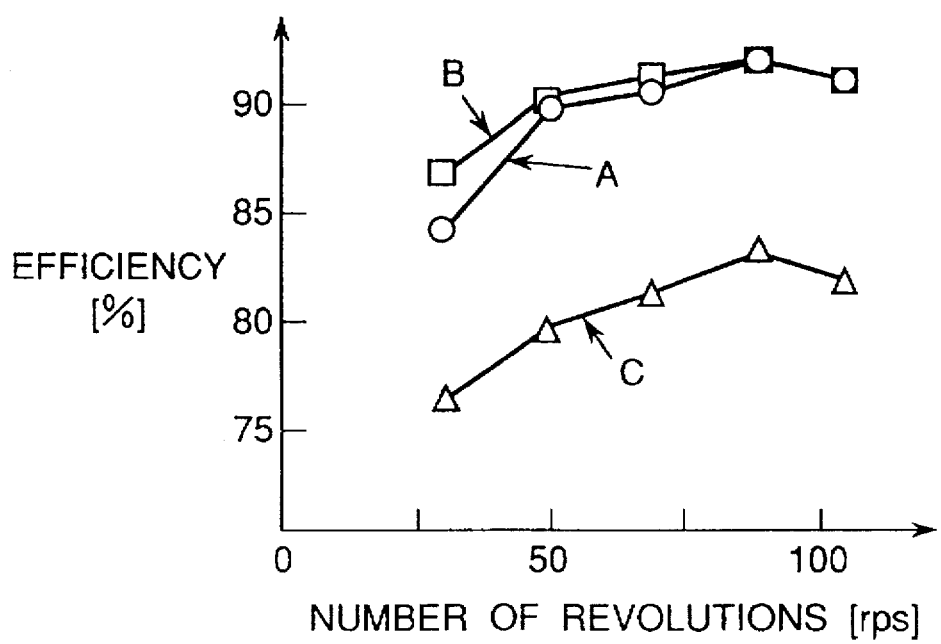
FIG. 17 is a chart showing the efficiency-rotation speed characteristics when the buried-magnet motor is driven by the control circuit of the second embodiment and driven by the conventional control circuit.

Further, FIG. 17 is a graph showing an efficiency to rotation speed characteristic in a case where a buried-magnet motor of which d-axis inductance Ld and q-axis inductance Lq are respectively 6.5 mH and 15.0 mH, counter-electromotive voltage coefficient Ke is 0.15 V.s/rad and pole pair number n is 2 is driven by the control apparatus of the present embodiment and in a case where the motor is driven by the prior art control apparatus shown in FIG. 4. In FIG. 17, a reference character A indicates a case where the motor is driven by the control apparatus of the present embodiment and a case where the motor is driven by the prior art control apparatus, a load torque being set to 20 kgf.cm in both cases (where the voltage amplitude is fixed in the control apparatus of the present embodiment, while the phase is fixed in the prior art control apparatus, so that an identical efficiency is achieved at the load torque of 20 kgf.cm). In FIG. 17, a reference character B indicates a case where the motor is driven by the control apparatus of the present embodiment when the load torque is set to 10 kgf.cm. In FIG. 17, a reference character C indicates a case where the motor is driven by the prior art control apparatus when the load torque is set to 10 kgf.cm. As apparent from FIG. 17, when the load torque is reduced, the efficiency is significantly reduced in the case where the motor is driven by the prior art control apparatus. However, in the case where the motor is driven by the control apparatus of the present embodiment, the necessary motor current is reduced together with the load torque, with which a Joule loss at the winding is reduced, resulting in slightly increasing the efficiency.

Furthermore, in a magnetic-flux-weakened control area, a high-efficiency operation in which the output voltage amplitude of the voltage-fed inverter is maximized can be achieved, and the motor current is reduced by a degree corresponding to the increase of the efficiency. Therefore, a margin is produced in a current capacity of a switching element of the voltage-fed inverter 802 and so forth, consequently allowing the range of operation to be expanded. Conversely, when the range of operation is not expanded taking advantage of the margin of the current capacity, a switching element having a current capacity reduced by the margin can be employed, consequently achieving cost reduction.

Also, no special device for performing the above-mentioned control is required to be incorporated, and therefore cost increase is prevented.

(Third Embodiment)

Figure 18:
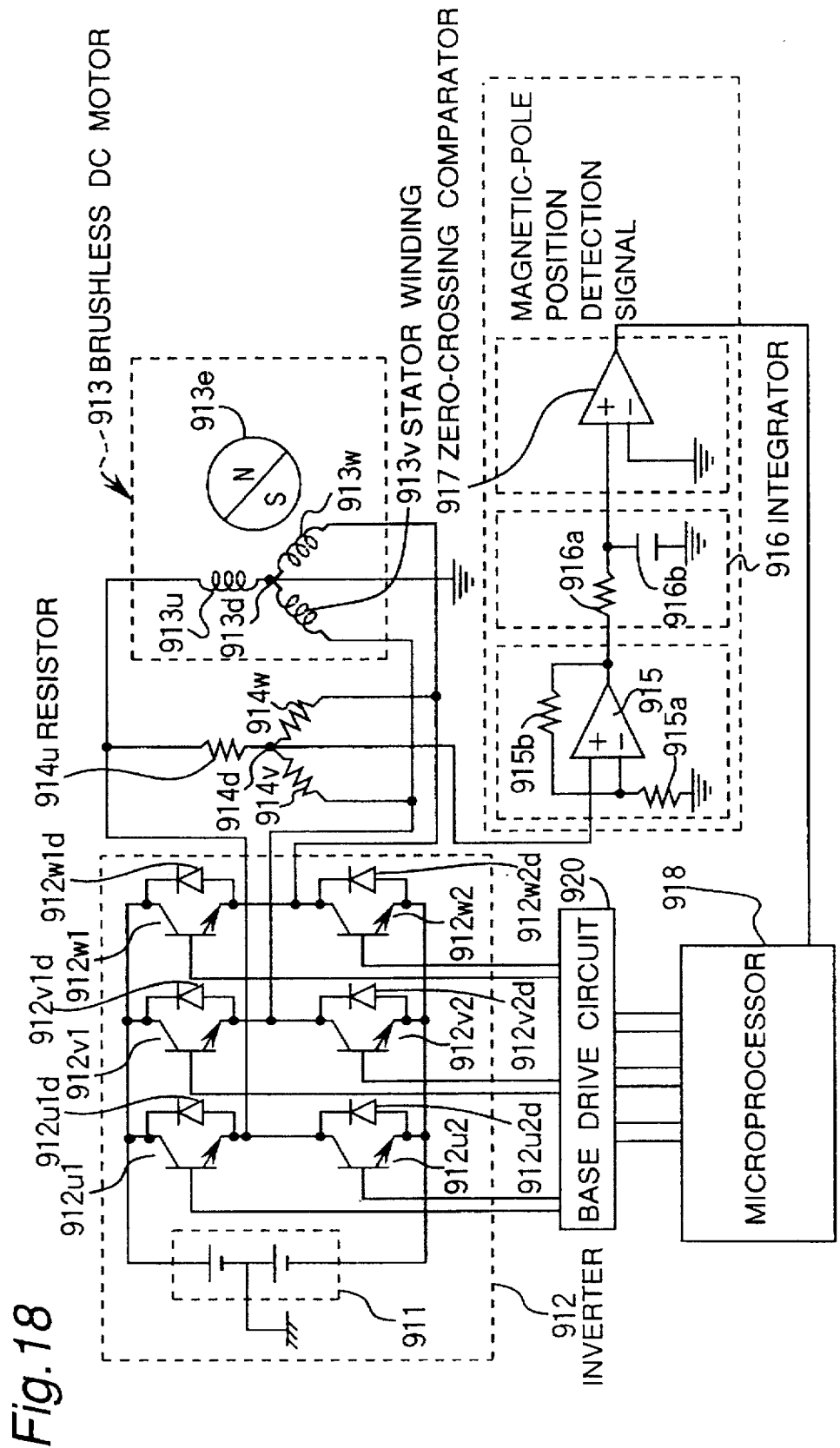
FIG. 18 is a block diagram schematically showing a third embodiment of the brushless DC motor system of the present invention.
Figure 19:
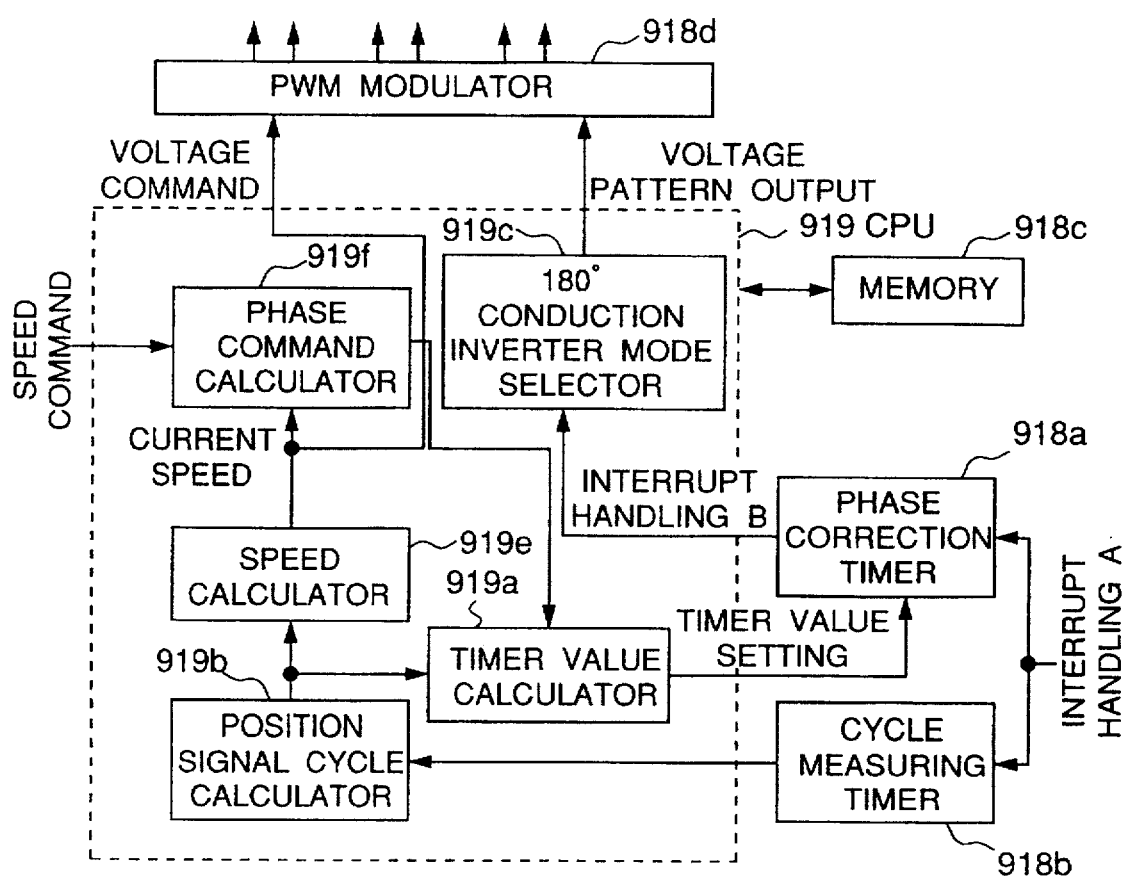
FIG. 19 is a block diagram showing the internal architecture of the microprocessor of FIG. 18.

FIG. 18 is a block diagram schematically showing a third embodiment of the brushless DC motor system of the present invention, while FIG. 19 is a diagram showing an internal structure of a microprocessor 918 shown in FIG. 18.

In the present brushless DC motor system, three pairs of switching transistors 912$u$1, 912$u$2, 912$v$1, 912$v$2, 912$w$1 and 912$w$2 are serially connected in respective pairs to a DC power supply 911 (formed by serially connecting DC power supplies having mutually equal electromotive voltages and grounding a connection point of the sources) to form an inverter 912, and voltages at connection points of respective pairs of the switching transistors are applied respectively to star-connected stator windings 913$u$, 913$v$ and 913$w$ at respective phases of the brushless DC motor (hereinafter, referred to simply as a motor) 913. The voltages at the connection points of the respective pairs of the switching transistors are also applied respectively to star-connected resistors 914u, 914v and 914w. Across the collector and emitter terminals of the switching transistors 912u1, 912u2, 912v1, 912v2, 912w1 and 912w2 are connected current feedback diodes 912u1d, 912u2d, 912v1d, 912v2d, 912w1d and 912w2d. A reference numeral 913e denotes a rotor of the motor 913. Suffix characters u, v, and w correspond respectively to the u-phase, v-phase and w-phase of the motor 913.

A voltage at a neutral point 913d of the star-connected stator windings 913u, 913v and 913w is supplied to an inverted input terminal of an amplifier 915 via a resistor 915a, while a voltage at a neutral point 914d of the star-connected resistors 914u, 914v and 914w are supplied to a non-inverted input terminal of the amplifier 915. Further, a resistor 915b is connected between an output terminal and the inverted input terminal of the amplifier 915, so that the amplifier 915 is made to operate as a differential amplifier.

An output signal outputted from the output terminal of the amplifier 915 is supplied to an integrator 916 formed by serially connecting a resistor 916a and a capacitor 916b.

An output signal from the integrator 916 (a voltage at a connection point of the resistor 916a and the capacitor 916b) is supplied to a non-inverted input terminal of a zero-crossing comparator 917 which receives at its inverted input terminal the voltage at the neutral point 913d.

Therefore, a magnetic-pole position detection signal is outputted from an output terminal of the zero-crossing comparator 917. In other words, the aforementioned differential amplifier, integrator 916, and zero-crossing comparator 917 constitute a position sensor for detecting the magnetic-pole position of the rotor 913e of the motor 913. It is to be noted that a position sensor comprised of a rotary encoder and so forth can be adtopted instead of the position sensor having the above-mentioned construction.

The magnetic-pole position detection signal outputted from the position sensor is supplied to an external interrupt terminal of the microprocessor 918. In the microprocessor 918, an interrupt handling (interrupt handling A, see FIG. 20) is effected on a phase correction timer 918a and a cycle measuring timer 918b in response to the magnetic-pole position detection signal supplied to the external interrupt terminal. A timer value of the phase correction timer 918a is set by a timer value calculator 919a described later. The cycle measuring timer 918b supplies the timer value to a position signal cycle calculator 919b included in a CPU 919. The position signal cycle calculator 919b calculates a timer value per electrical angle of 1° based on a timer value corresponding to, for example, an electrical angle of 60°. The phase correction timer 918a supplies a count expiration signal to a 180° conduction inverter mode selector 919c included in the CPU 919 so as to execute an interrupt handling (interrupt handling B, see FIG. 21). The 180° conduction inverter mode selector 919c reads a corresponding voltage pattern from a memory 918c and outputs the same. In the CPU 919, a calculation based on the timer value is executed by the position signal cycle calculator 919b to output a position signal cycle signal to the timer value calculator 919a and a speed calculator 919e. The timer value calculator 919a calculates a timer value to be set in the phase correction timer 918a based on a position signal cycle signal from the position signal cycle calculator 919b and a differential speed from a phase command calculator 919f described hereinafter. The speed calculator 919e calculates the current-time speed based on the position signal cycle signal from the position signal cycle calculator 919b, and outputs a voltage command (output voltage amplitude command) based on the present speed while supplying the present speed to the phase command calculator 919f. The phase command calculator 919f, to which is also supplied a speed command, calculates a phase command by, for example, the aforementioned PI calculation based on the speed command and the present speed from the speed calculator 919e, and supplies the phase command to the timer value calculator 919a. Then, a voltage pattern outputted from the 180° conduction inverter mode selector 919c and a voltage command outputted from the speed calculator 919e are supplied to a PWM (Pulse Width Modulation) modulator 918d which outputs PWM modulation signals for the three phases. The PWM modulation signals are supplied to a base drive circuit 920, and the base drive circuit 920 outputs control signals to be supplied to the base terminals of the switching transistors 912u1, 912u2, 912v1, 912v2, 912w1 and 912w2. In the above description, as the components included in the CPU 919, only functional portions for achieving the corresponding functions are shown, and therefore the components are not existing inside the CPU 919 in a state in which the components can be clearly recognized.

Here are shown voltage patterns corresponding to the inverter modes in Table 2. It is to be noted that the voltage patterns are represented by ON/OFF states of the switching transistors 912u1, 912u2, 912v1, 912v2, 912w1 and 912w2, where "1" corresponds to the ON-state, while "0" corresponds to the OFF-state.

TABLE 2

| Inverter Mode | Voltage pattern | | | | | |
|---|---|---|---|---|---|---|
| | 912u1 | 912u2 | 912v1 | 912v2 | 912w1 | 912w2 |
| 0 | 1 | 0 | 0 | 1 | 1 | 0 |
| 1 | 1 | 0 | 0 | 1 | 0 | 1 |
| 2 | 1 | 0 | 1 | 0 | 0 | 1 |
| 3 | 0 | 1 | 1 | 0 | 0 | 1 |
| 4 | 0 | 1 | 1 | 0 | 1 | 0 |
| 5 | 0 | 1 | 0 | 1 | 1 | 0 |

Next, the operation of the brushless DC motor drive and control system of FIG. 18 will be described with reference to a waveform diagram shown in FIG. 22.

Figure 22:
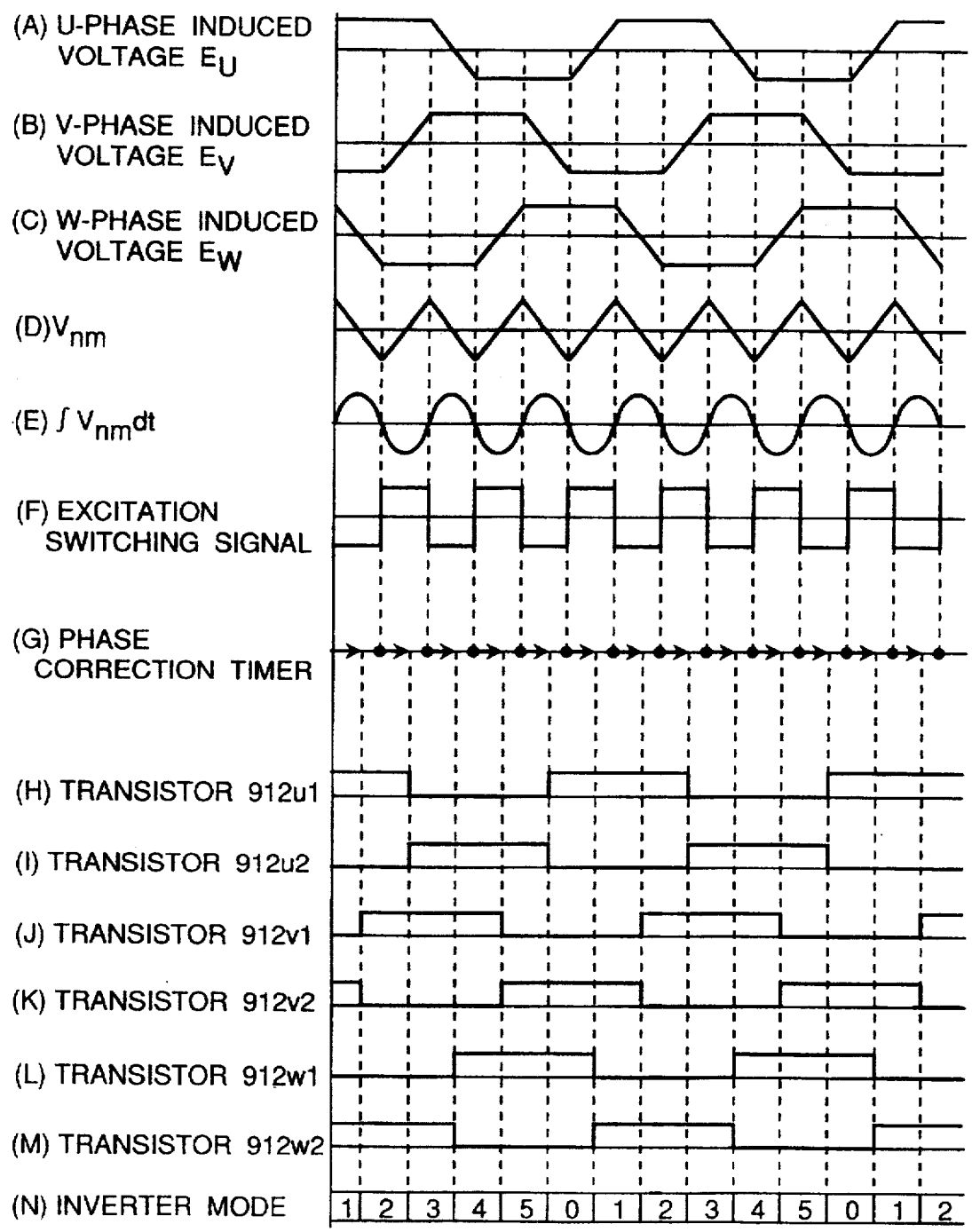
FIG. 22 is a diagram showing signal waveforms and processing contents of the individual components of the brushless DC motor system of FIG. 18.

In FIG. 22, as indicated in (A), (B) and (C), u-phase, v-phase and w-phase induced voltages Eu, Ev and Ew of the brushless DC motor vary as shifted in phase at intervals of 120°, and therefore a signal Vnm outputted from the amplifier 915 varies in a manner as shown in FIG. 22 (D), and an integral waveform ∫Vnmdt of the signal integrated by the integrator 916 varies in a manner as shown in FIG. 22 (E).

When the integral waveform is supplied to the zero-crossing comparator 917, an excitation switching signal that rises or falls at a zero-crossing point of the integral waveform is outputted in a manner as shown in FIG. 22 (F). The interrupt handling process A is executed with the rise and fall of the excitation switching signal, and the phase correction timer 918a starts (see start points (black dots) of arrows in FIG. 22 (G)). The timer value of the phase correction timer 918a is set by the time value calculator 919a, and the timer expires, or finishes counting after a time counting operation corresponding to a set timer value is completed (see end points of the arrows in FIG. 22 (G)). Then, every time the phase correction timer 918a expires, the interrupt handling process B is effected, and the 180° conduction inverter mode selector 919c increments the inverter mode by one step. That is, as shown in FIG. 22 (N), the inverter mode is selected in order of "1" "2" "3" "4" "5" "0" "1" "2" . . . Then, by incrementing the inverter mode by one step with the expiration of the phase correction timer 918a, the ON/OFF states of the switching transistors 912u1, 912u2, 912v1, 912v2, 912w1 and 912w2 are controlled in a manner as shown in FIGS. 22 (H) through (M) in correspondence with each inverter mode. Consequently, the brushless DC motor 913 can be driven with the conduction period set at 180°, and the voltage-fed inverter voltage can be put in a state in which its phase precedes the phase of the motor induced voltage. In the present case, the amount of the precedence in phase of the voltage-fed inverter can be controlled by the phase correction timer 918a.

Figure 20:
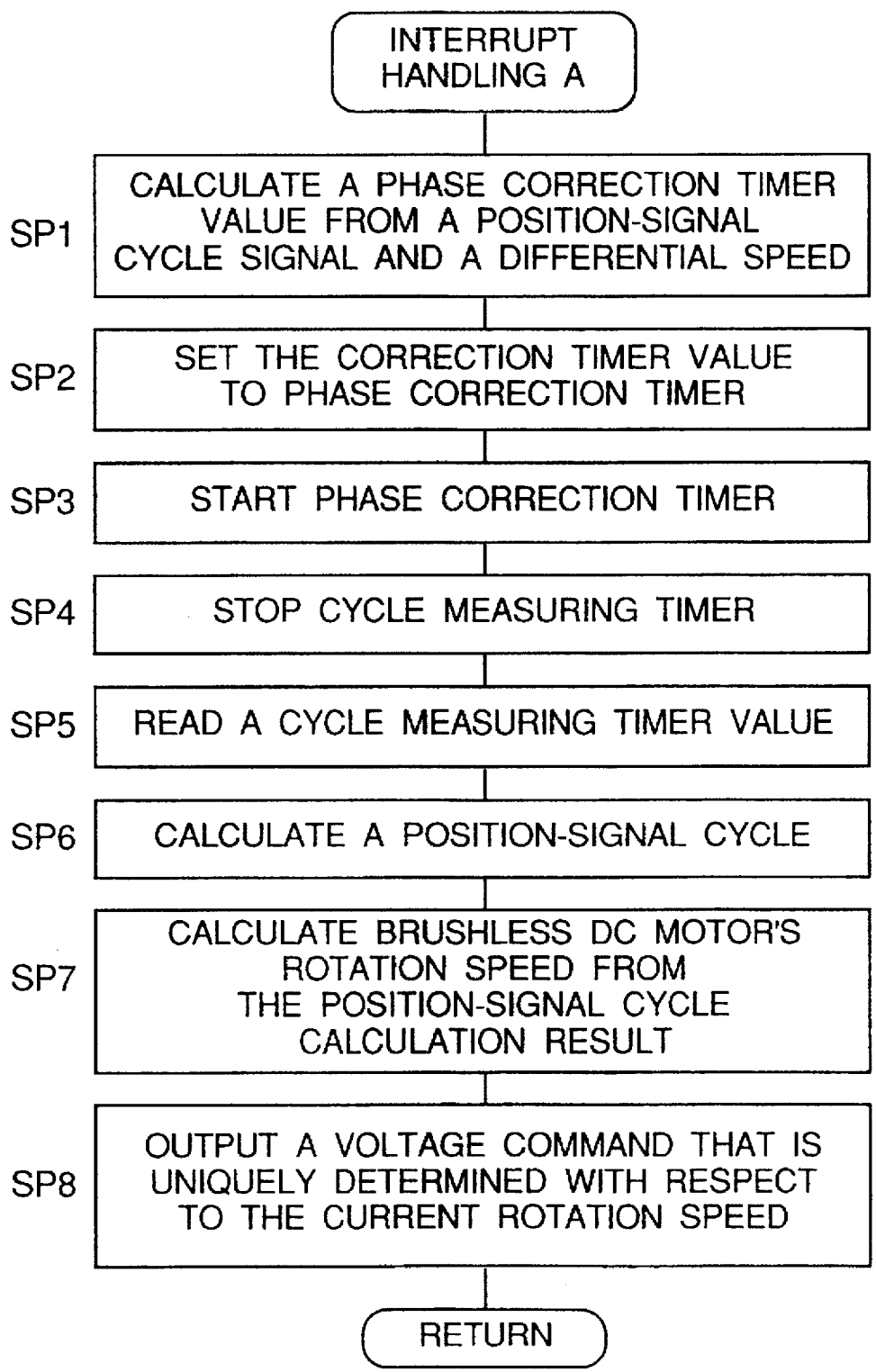
FIG. 20 is a flow chart for explaining in detail the processing contents of interrupt handling A shown in FIG. 19.

FIG. 20 is a flow chart for explaining in detail the contents of the interrupt handling process A, where an external interrupt request is received at each of the leading edge and the trailing edge of the magnetic-pole position detection signal of the position sensor. Then, a value of the phase correction timer 918a is calculated at step SP1 based on a position signal cycle signal obtained by the position signal cycle calculator 919b and the differential speed obtained by the phase command calculator 919f, a correction timer value is set to the phase correction timer 918a at step SP2, and the phase correction timer is started at step SP3. Then, a cycle measuring timer started in the preceding interrupt handling process A is stopped at step SP4, and the cycle measuring timer value is read (stored) at step SP5. It is to be noted that the processes at step SP4 and step SP5 are processes for detecting the cycle of the edges of the magnetic-pole switching signal. Therefore, the cycle measuring timer is immediately reset for the next cycle measurement after reading a cycle measuring timer value, and then started. Then, a calculation of stored position signal cycle (e.g., calculation of the number of counts per electrical angle of 1°) is executed at step SP6, a current-time rotation speed of the motor 913 is calculated based on a result of the position signal cycle calculation at step SP7, a voltage command determined uniquely with respect to the current-time rotation speed is output at step SP8, and then the program flow returns to the original processing stage.

Practically, when a count value corresponding to the interval of the magnetic-pole position detection signals is, for example, 360 as a result of actual measurement by means of the cycle measuring timer 918a, a count value per cycle of the inverter output voltage is 360×6=2160 since the number of the inverter modes is six. Then, since the value of 2160 corresponds to 360°, a count value per 1° is 2160/360=6. When a phase amount command calculated based on the differential speed is 40°, the count value (timer value) corresponding to the phase amount command is 6×(90−40) =300. Therefore, the value of 300 is set in the phase correction timer 918a, and the phase correction timer 918a is started.

Figure 21:
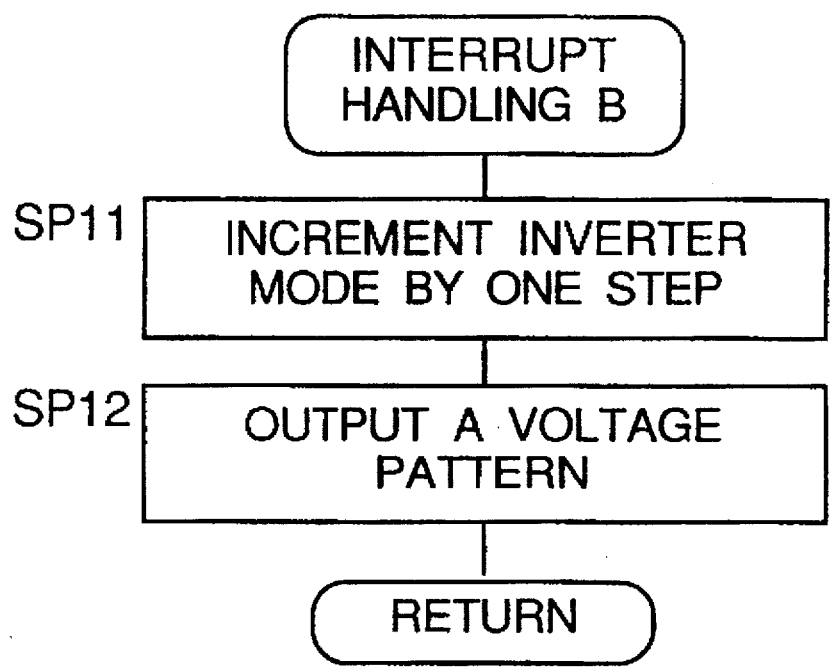
FIG. 21 is a flow chart for explaining in detail the processing contents of interrupt handling B shown in FIG. 19.

FIG. 21 is a flow chart for explaining in detail the contents of the interrupt handling process B. When the phase correction timer 918a which has started during the interrupt handling process A expires, or finishes counting, the interrupt handling process B is effected. The inverter mode preparatorily set in the memory 918c is incremented by one step at step SP11, a voltage pattern corresponding to the incremented inverter mode is outputted at step SP12, and then the program flow returns to the original processing stage.

A magnetic-pole position sensing operation executed by the amplifier 915, the integrator 916 and the zero-crossing comparator 917 shown in FIG. 18 will be described in more detail.

In regard to the magnetic-pole position sensing effected by detecting the motor voltage, according to a magnetic-pole detection method using an induced voltage appearing in upper and lower arm-off intervals in a 120° conduction mode adopted in an electrical equipment such as an air conditioner, it is made impossible to detect an induced voltage when an electric current increases with a high load, and it is further made impossible to perform the magnetic-pole position sensing process.

Assuming that a time to the cut-off of the current flowing through the stator winding is t, that an inverter electrical angle in the 180° interval is α[rad], and that an output frequency is f, a conditional expression for determining whether or not the detection of the induced voltage is enabled is:

$$t < (\pi - \alpha)/(4\pi f)$$

As apparent from the above-mentioned conditions, it can be found that detection of the induced voltage is theoretically impossible when the 180° conduction is adopted. Further, when a greater torque is required, it is necessary to increase the current amplitude. However, when the current amplitude is increased, a great residual current due to a motor inductance results, and in a worst case, the current flowing through the stator winding in the 180° interval cannot be cut off. Therefore, in order to surely cut off the current flowing through the stator winding in the 180° interval, the current amplitude is required to be limited. Therefore, when the rotation speed is high or when the conduction time is prolonged, the current amplitude cannot be increased.

Figure 23:
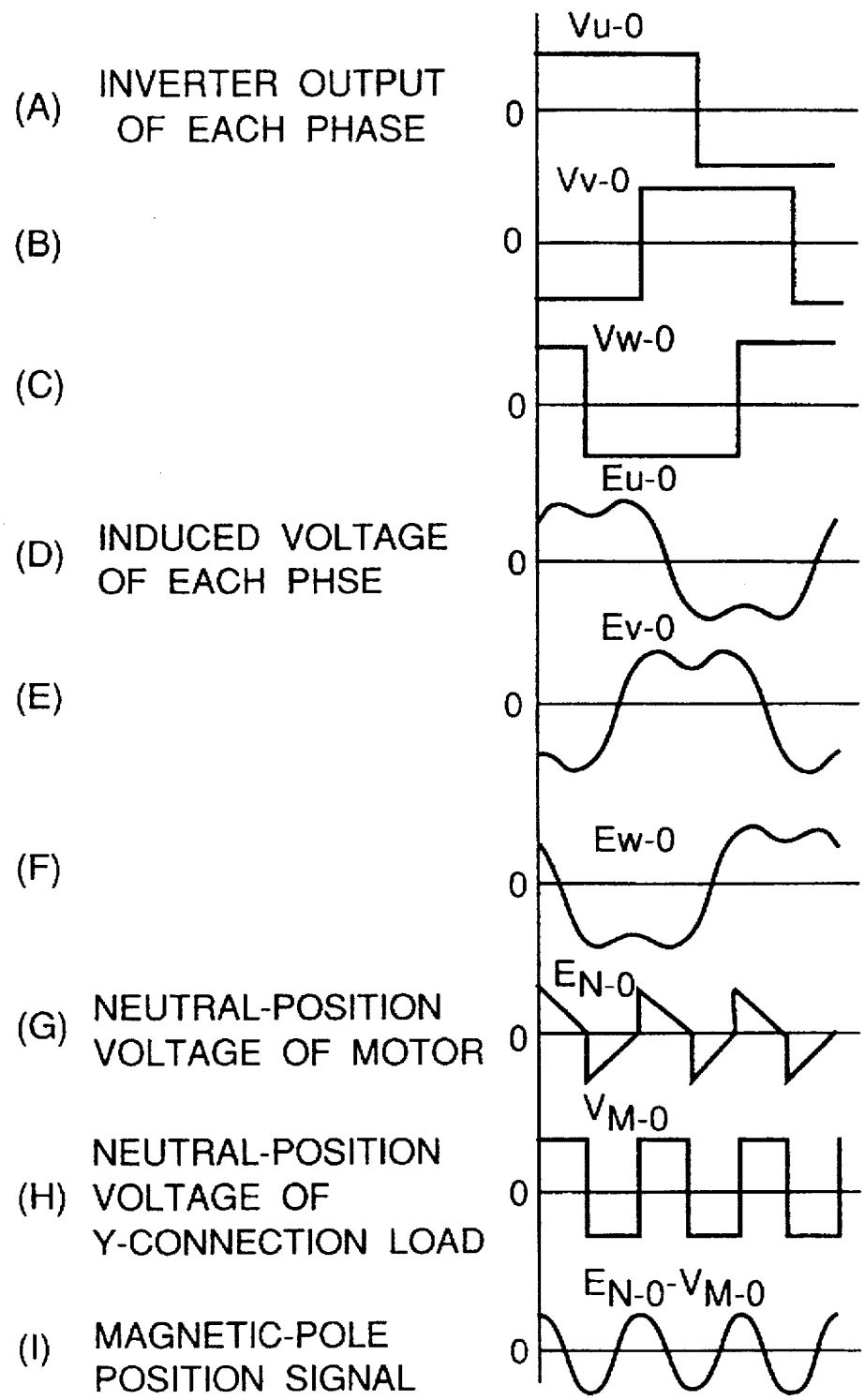
FIG. 23 is a diagram showing signal waveforms of the individual components for explaining the position sensing operation by the amplifier, integrator, and zero-crossing comparator in the brushless DC motor system of FIG. 18.

However, when the construction shown in FIG. 18 is adopted, a voltage $E_{N-0}$ at a neutral point 913d of the star-connected stator windings 913u, 913v and 913w is expressed by:

$$E_{N-0} = (\tfrac{1}{3})\{(V_{u-0} - E_{u-0}) + (V_{v-0} - E_{v-0}) + (V_{w-0} - E_{w-0})\}$$

which represents a sum of 3n'th harmonic components (n: integer) (see FIG. 23 (G)) contained in the inverter output waveforms (see FIG. 23 (A), (B) and (C)) and the motor induced voltage waveforms (see FIG. 23 (D), (E) and (F)).

Further, a voltage $V_{M-0}$ at a neutral point 914d of the star-connected resistors 914u, 914v and 914w is expressed by:

$$V_{M-0} = (\tfrac{1}{3})(V_{u-0} + V_{v-0} + V_{w-0})$$

(see FIG. 23 (H)).

Therefore, by obtaining a difference $E_{N-0} - V_{M-0}$ (see FIG. 23 (I)) of the voltages $E_{N-0}$ and $V_{M-0}$, the 3n'th harmonic components contained in the motor induced voltage waveforms can be extracted. Furthermore, since each of the above-mentioned expressions does not depend on the current, there is no restriction on the conditional expressions, and therefore they can be applied to an arbitrary conduction period. That is, when the conduction period is set long at the high-speed rotation stage, the magnetic-pole position detection can be achieved without using a magnetic-pole position sensor even when the current amplitude is made great. In a case where the 180° conduction is adopted, also, the magnetic-pole position detection can be achieved without using a magnetic-pole position sensor.

The above has described only the brushless DC motor drive control in a state in which the brushless DC motor is running in the steady state. However, when the brushless DC motor is stopped, the aforementioned drive control cannot be effected because no induced voltage is generated then. Therefore, in starting the brushless DC motor operation, a voltage-fed inverter is compulsorily operated externally and a three-phase AC voltage is applied, so that the rotor is rotated by a synchronous operation. Then, an induced voltage is generated when the rotor starts to rotate. Therefore the brushless DC motor can be subjected to the above drive control.

Electrical appliances such as air conditioners, vacuum cleaners and electric washers are required to reduce the power consumption, and in recent years, brushless DC motors and inverters which have attracted public attention are being increasingly adopted. By applying the brushless DC motor drive system of the present invention to such electrical appliances, a power consumption is reduced further than in the conventional electrical appliances merely employing a brushless DC motor or an inverter.

The above has described the case where a voltage-fed inverter is controlled by PWM. The present invention can also be applied similarly to a case where a voltage-fed inverter is controlled by PAM (a case where a switching element is provided in the converter 902a and the switching element is controlled to modulate a pulse amplitude).

Furthermore, because a product of the rotation speed and the torque is the motor output, a torque control system can be constituted with incorporation of a torque sensor and so forth.

(Fourth Embodiment)

Figure 24:
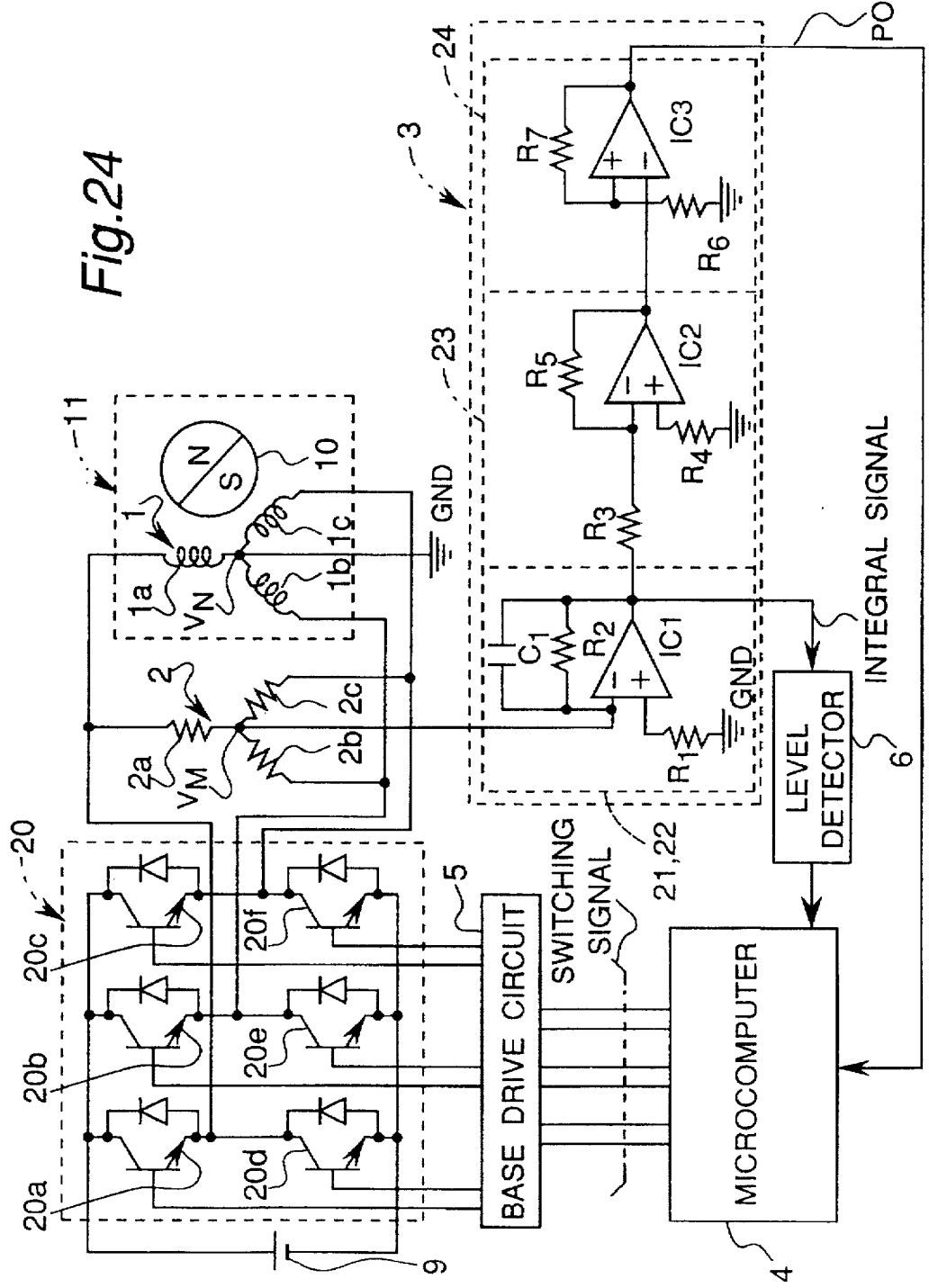
FIG. 24 is an arrangement diagram of the brushless DC motor system according to a fourth embodiment of the present invention.

FIG. 24 shows a construction of a brushless DC motor system of a fourth embodiment of the present invention, in which reference numeral 1 denotes a stator which has star-connected armature coils 1a, 1b and 1c and rotates a rotor 10 having a plurality of permanent magnets by a rotating magnetic field, reference numeral 2 denotes a resistor circuit having star-connected resistors 2a, 2b and 2c connected in parallel with the armature coils 1a, 1b and 1c, reference numeral 3 denotes a rotational-position sensor which serves as rotational-position sensor means that detects a voltage difference signal $V_{MN}$ representing a voltage difference between a voltage $V_M$ at a neutral point of the resistor circuit 2 and a voltage $V_N$ at a neutral point of the armature coils 1a, 1b and 1c, detects a relative position of the rotor 10 based on the voltage difference signal $V_{MN}$, and outputs a position signal representing the relative position of the rotor 10, reference numeral 4 denotes a microcomputer which receives the position signal from the rotational-position sensor 3 and outputs a switching signal, and reference numeral 5 denotes a base drive circuit which receives the switching signal from the microcomputer 4 and outputs a commutation control signal. The commutation control signal from the base drive circuit 5 is inputted to an inverter section 20. The stator 1 and the rotor 10 constitute a brushless DC motor 11.

The rotational-position sensor 3 includes an amplifier IC1 where the voltage $V_M$ at the neutral point of the resistor circuit 2 is inputted to an inverted input terminal thereof, a ground GND is connected to a non-inverted input terminal thereof via a resistor $R_1$, and a resistor $R_2$ and a capacitor $C_1$ are connected in parallel with each other between an output terminal thereof and the inverted input terminal; an amplifier IC2 where an inverted input terminal thereof is connected to the output terminal of the amplifier IC1 via a resistor $R_3$, a ground GND is connected to a non-inverted input terminal thereof via a resistor $R_4$, and a resistor $R_5$ is connected between an output terminal thereof and the inverted input terminal; and an amplifier IC3 where an inverted input terminal thereof is connected to the output terminal of the amplifier IC2, a ground GND is connected to a non-inverted input terminal thereof via a resistor $R_6$, and a resistor $R_7$ is connected between an output terminal thereof and the non-inverted input terminal. The amplifier IC1, resistor $R_1$, resistor $R_2$, and capacitor $C_1$ constitute concurrently a differential amplifier 21 and an integrator 22 which serves as integration means. The amplifier IC2 and the resistors $R_3$, $R_4$ and $R_5$ constitute an inverting amplifier 23, while the amplifier IC3 and the resistors $R_6$ and $R_7$ constitute a zero-crossing comparator 24. The neutral point of the armature coils 1a, 1b and 1c is connected to the non-inverted input terminal of the amplifier IC1 via the ground GND and the resistor $R_1$. Therefore the differential amplifier 21 (integrator 22) detects the voltage difference signal $V_{MN}$ representing the voltage difference between the voltage $V_M$ at the neutral point of the resistor circuit 2 and the voltage $V_N$ at the neutral point of the armature coils 1a, 1b and 1c, integrates the voltage difference signal $V_{MN}$, and outputs an integral signal $\int V_{MN} dt$.

Figure 25:
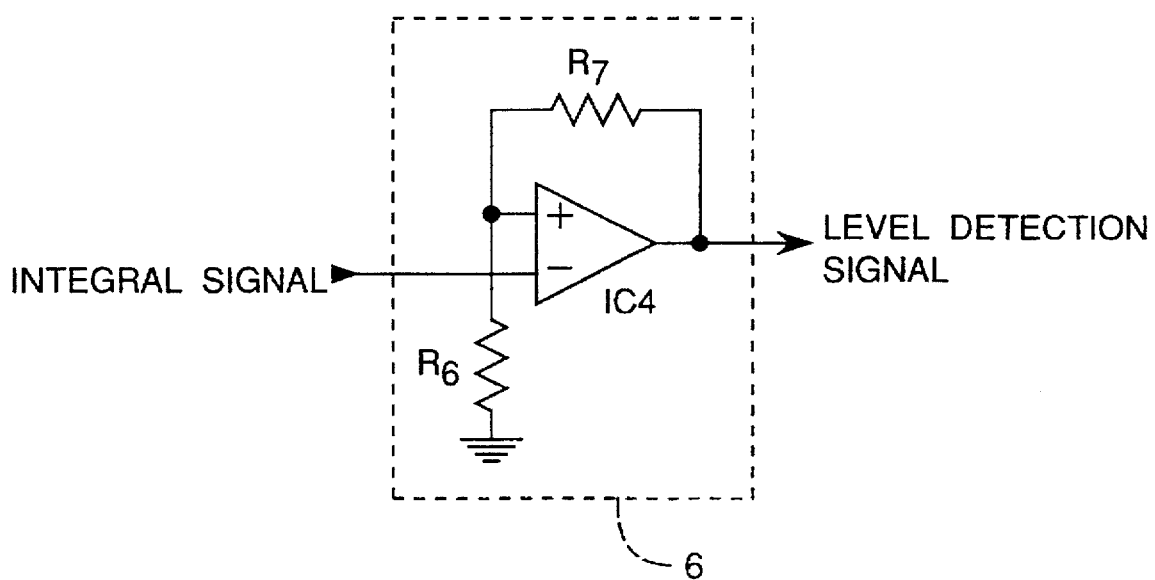
FIG. 25 is a circuit diagram of the level detector of the brushless DC motor system of FIG. 24.
Figure 27:
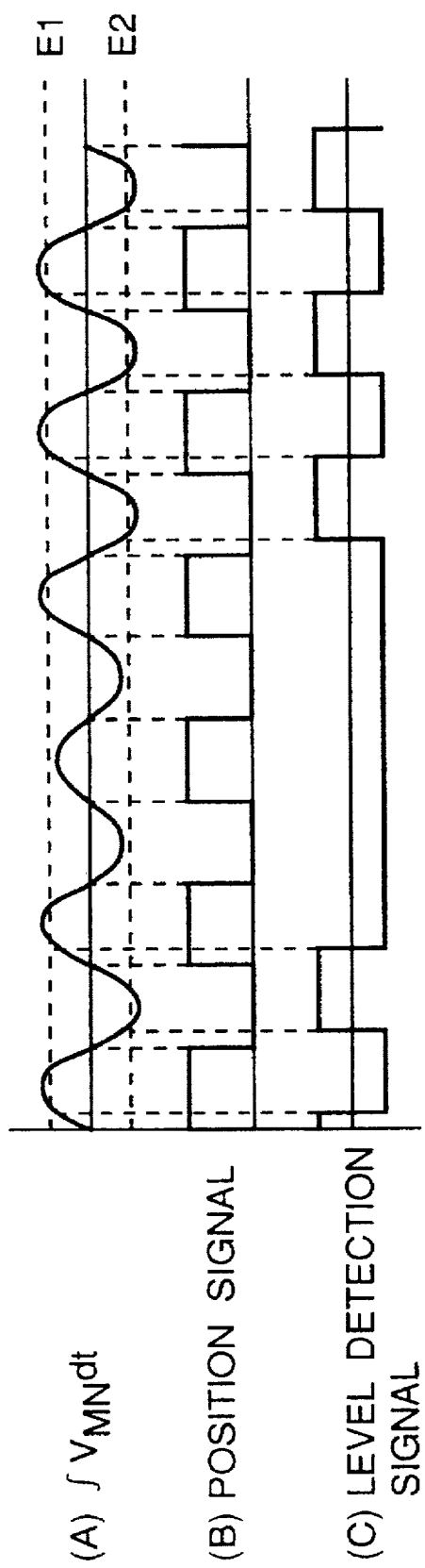
FIG. 27 is a diagram showing signals of the individual components when the level detector shown in FIG. 25 is used.

The above-mentioned brushless DC motor system includes a level detector 6 which receives the integral signal $\int V_{MN} dt$ from the integrator 22 of the rotational-position sensor 3 and outputs a level detection signal to the microcomputer 4. In the level detector 6, as shown in FIG. 25, the integral signal $\int V_{MN} dt$ from the integrator 22 of the rotational-position sensor 3 is inputted to an inverted input terminal of an amplifier IC4, a non-inverted input terminal of the amplifier IC4 is connected to the ground GND via a resistor $R_6$, and a resistor $R_7$ is connected between an output terminal and the non-inverted input terminal of the amplifier IC4. The amplifier IC4 and the resistors $R_6$ and $R_7$ constitute a hysteresis comparator having a hysteresis characteristic. The brushless DC motor is driven in accordance with the position signal, and as shown in FIG. 27, when the integral signal $\int V_{MN} dt$ (shown in FIG. 27 (A)) inputted to the inverted input terminal of the amplifier IC4 of the level detector 6 exceeds a reference value E1, the output terminal of the amplifier IC4 comes to have L-level. When the integral signal $\int V_{MN} dt$ becomes smaller than a reference value E2, the output terminal of the amplifier IC4 comes to have H-level. That is, the level detection signal (shown in FIG. 27 (C)) of the level detector 6 is a signal having a cycle identical to that of the position signal (shown in FIG. 27 (B)) and a phase different from that of the position signal. However, when the level of the integral signal $\int V_{MN} dt$ from the rotational-position position sensor 3 lowers, there is the possibility that the integral signal $\int V_{MN} dt$ does not exceed the reference value E1 or the possibility that the integral signal $\int V_{MN} dt$ does not become smaller than the reference value E2. In such a case, the level detection signal has a frequency lower than that of the position signal and a different duty ratio. In other words, whether or not the integral signal $\int V_{MN} dt$ has a level not smaller than a specified level can be detected depending on whether or not the level detection signal is continuous in a specified cycle.

Further, as shown in FIG. 24, the inverter section 20 includes three transistors 20a, 20b and 20c connected to a positive side of a DC power supply 9 and three transistors 20d, 20e and 20f connected to a negative side of the DC power supply 9. An emitter of the transistor 20a and a collector of the transistor 20d are connected to each other, an emitter of the transistor 20b and a collector of the transistor 20e are connected to each other, and an emitter of the transistor 20c and a collector of the transistor 20f are connected to each other. Further, the connection point of the transistors 20a and 20d is connected with the armature coil 1a of the U-phase, the connection point of the transistors 20b and 20e is connected with the armature coil 1b of the V-phase, and the connection point of the transistors 20c and 20f is connected with the armature coil 1c of the W-phase. Further, diodes are connected in an inverse-parallel connection form between the collectors and the emitters of the transistors 20a through 20f.

Figure 26:
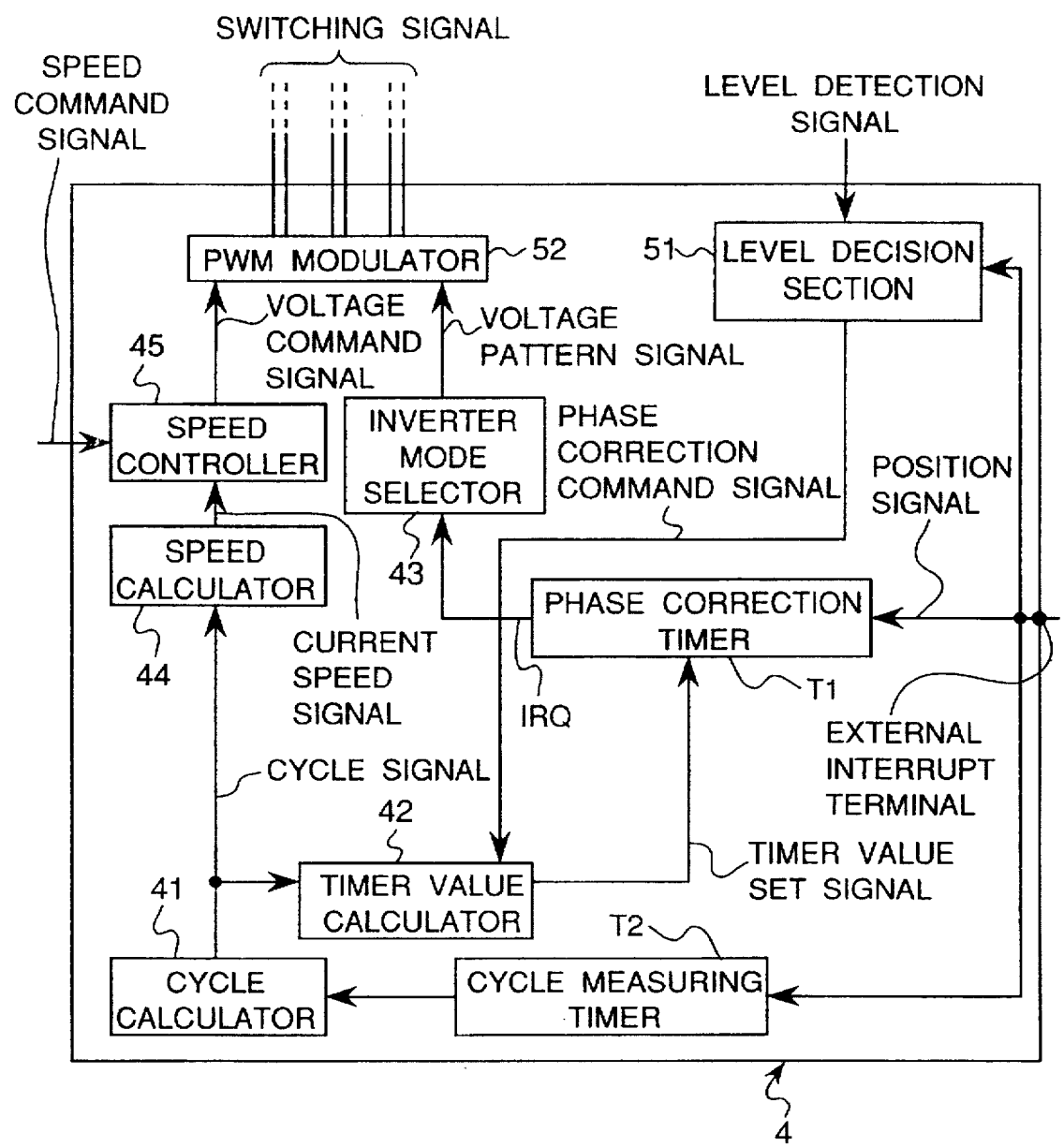
FIG. 26 is a block diagram of the microcomputer of the brushless DC motor system of FIG. 24.

Further, as shown in FIG. 26, the microcomputer 4 includes a phase correction timer T1 to which the position signal from the rotational-position sensor 3 shown in FIG. 24 is inputted via an external interrupt terminal; a cycle measuring timer T2 which receives the position signal and measures a cycle of the voltage pattern of the armature coils 1a, 1b and 1c; a cycle calculator 41 which receives a measured timer value from the cycle measuring timer T2, calculates a cycle of the voltage pattern of the armature coils 1a, 1b and 1c from the timer value, and outputs a cycle signal representing the cycle; and a timer value calculator 42 which receives the cycle signal from the cycle calculator 41, calculates a timer value corresponding to a phase correction angle based on the cycle, and outputs a timer value set signal to the phase correction timer T1. The microcomputer 4 further includes an inverter mode selector 43 which receives an interrupt signal IRQ from the phase correction timer T1 and outputs a voltage pattern signal; a speed calculator 44 which receives the cycle signal from the cycle calculator 41, calculates a rotation speed, and outputs a current-time speed signal; a speed controller 45 which receives the current-time speed signal from the speed calculator 44 and an external speed command signal, and outputs a voltage command signal; a level decision section 51 which receives the position signal from the rotational-position sensor 3 and the level detection signal from the level detector 6, and outputs a phase correction command signal to the timer value calculator 42; and a PWM (Pulse Width Modulation) modulator 52 which receives the voltage pattern signal from the inverter mode selector 43 and the voltage command signal from the speed controller 45, and outputs a switching signal. The phase correction timer T1, the cycle measuring time T2, the cycle calculator 41, and the timer value calculator 42 constitute phase correction means. The level detector 6 and the level decision section 51 constitute level decision means.

Figure 28:
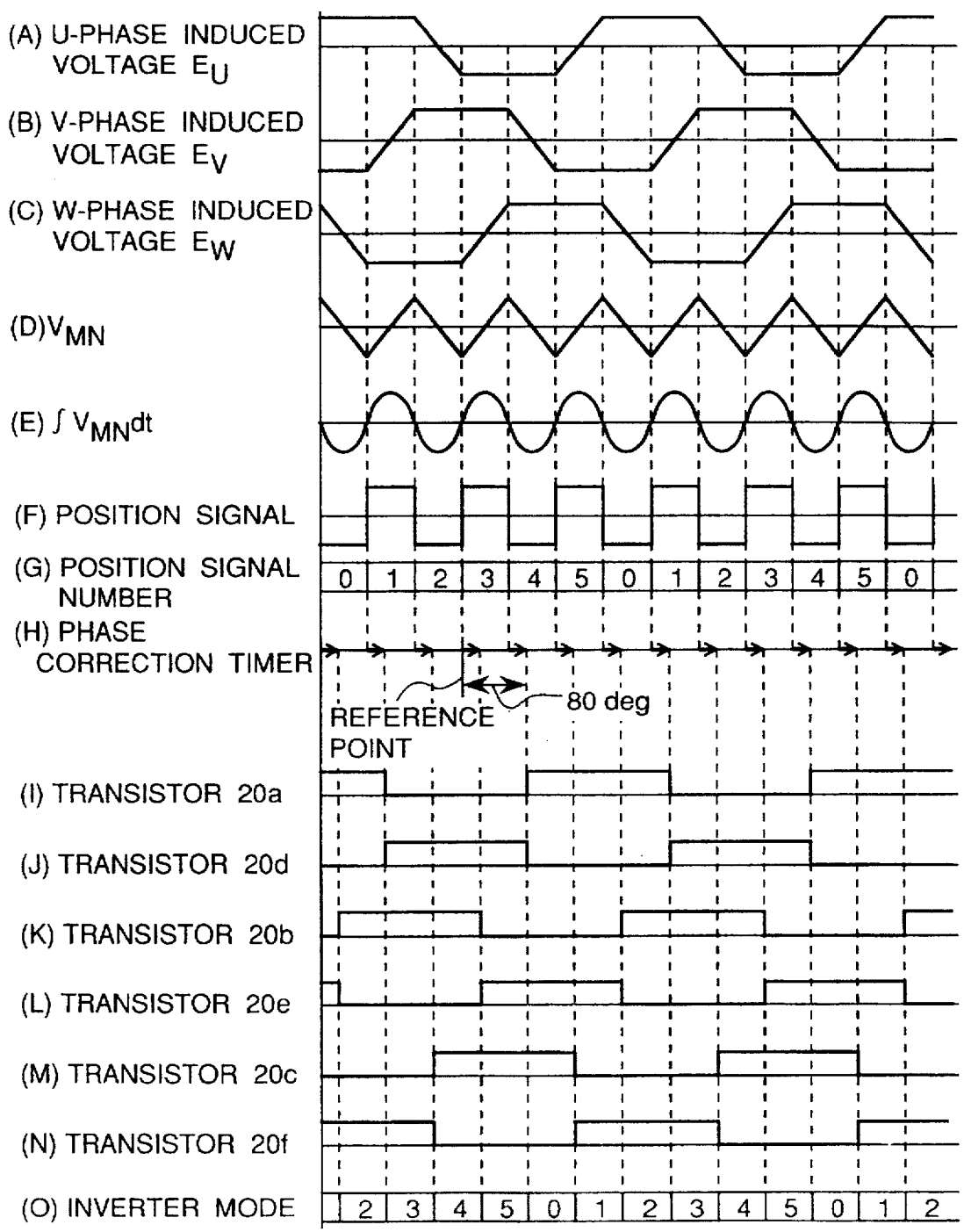
FIG. 28 is a diagram showing signals of the individual components of the brushless DC motor system of FIG. 24.

In the above-mentioned construction, when the brushless DC motor is driven in accordance with the position sensing, induced voltages Eu, Ev and Ew of the U-phase, V-phase and W-phase of the armature coils 1a, 1b and 1c come to have trapezoidal waveforms having different phases at intervals of 120 degrees as shown in FIG. 28 (A) through (c). Then, the amplifier IC1 of the rotational-position sensor 3 detects a voltage difference signal $V_{MN}$ (shown in FIG. 28 (D)) representing a voltage difference between a voltage $V_M$ at the neutral point of the resistor circuit 2 inputted to the inverted input terminal and a voltage $V_N$ at the neutral point of the armature coils 1a, 1b and 1c inputted to the non-inverted input terminal of the amplifier IC1, integrates the voltage difference signal $V_{MN}$, and outputs an integral signal $\int V_{MN} dt$ (shown in FIG. 28 (E)). The integral signal $\int V_{MN} dt$ comes to have an approximate sine waveform having a frequency three times as great as the power source frequency. Then, the inverting amplifier 23 amplifies the integral signal $\int V_{MN} dt$ inputted to the inverted input terminal of the amplifier IC2 to a specified amplitude, while the zero-crossing comparator 24 detects a zero-crossing point of the amplified integral signal $\int V_{MN} dt$ and outputs a position signal (shown in FIG. 28 (F)).

Then, the position signal from the rotational-position sensor 3 is inputted through the external interrupt terminal of the microcomputer 4 to the cycle measuring timer T2. The cycle measuring timer T2 measures a period from a leading edge to a trailing edge of the position signal and a period from a trailing edge to a leading edge of the position signal, and outputs a timer value representing each measured period. Upon receiving a signal representing the timer value from the cycle measuring timer T2, the cycle calculator 41 obtains a cycle of the voltage pattern of the armature coils 1a, 1b and 1c. That is, the period from the leading edge to the trailing edge of the position signal and the period from the trailing edge to the leading edge of the position signal are repeated every 60 degrees, so that by multiplying the timer value for each measured period by six, a timer value per cycle of the voltage pattern is obtained.

Then, upon receiving the cycle signal representing the cycle from the cycle calculator 41, the timer value calculator 42 outputs the timer value set signal. Upon receiving the timer value set signal from the timer value calculator 42, the phase correction timer T1 counts a time from the position signal to the switching of the voltage pattern. That is, when completing the counting, the phase correction timer T1 outputs the interrupt signal IRQ to the inverter mode selector 43, and the inverter mode selector 43 outputs phase-corrected voltage pattern signals (shown in FIG. 28 (I) through (N)) to the PWM modulator 52. Then, the PWM modulator 52 outputs the switching signal to the base drive circuit 5 shown in FIG. 33, and when the base drive circuit 5 outputs the commutation control signal to the inverter section 20, the transistors 20a through 20f of the inverter section 20 are turned on and off, respectively. It is to be noted that position signal numbers 0 through 5 as shown in FIG. 28 (G) are assigned to each cycle of the position signal for the sake of simplicity of explanation. Voltage pattern signals shown in FIG. 28 (I) through (N) represent timings for turning on and off the transistors 20a through 20f. Further, in regard to an inverter mode as shown in FIG. 28 (O), numbers 0 through 5 are assigned so that they correspond to the voltage pattern signals (shown in FIG. 28 (I) through (N)) selected by the inverter mode selector 43.

An operation of the microcomputer 4 will be described according to flow charts of FIGS. 29, 30, 31 and 32. It is to be noted that an interrupt handling process 1 is executed at every rise time and fall time of the position signal inputted to the external interrupt terminal of the microcomputer 4.

Figure 29:
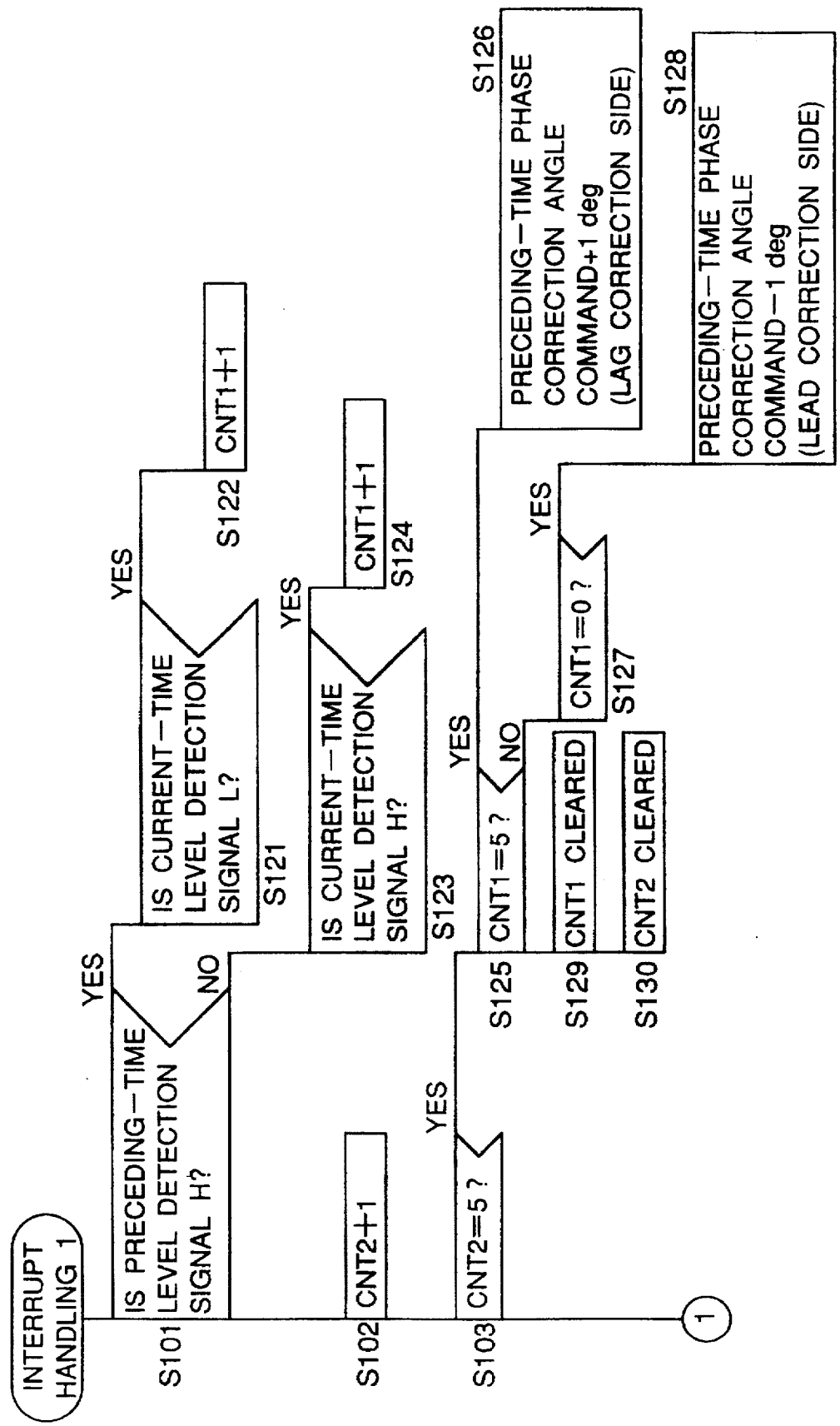
FIGS. 29, 30, and 31 are flow charts showing interrupt handling 1 of the microcomputer shown in FIG. 24.

First, in FIG. 29, when the interrupt handling process 1 starts, it is decided whether or not a preceding-time level detection signal is at H-level at step S101. When it is decided that the preceding-time level detection signal is at H-level, the program flow proceeds to step S121 to decide whether or not a current-time level detection signal is at L-level. When it is decided that the current-time level detection signal is at L-level at step S121, the program flow proceeds to step S122 to increment a counter CNT1 by one. When it is decided that the current-time level detection signal is not at L-level, the program flow proceeds to step S102.

Otherwise, when it is decided that the preceding-time level detection signal is not at H-level at step S101, the program flow proceeds to step S123, and it is decided whether or not the current-time level detection signal is at H-level. When it is decided that the current-time level detection signal is at H-level at step S123, the program flow proceeds to step S124 to increment the counter CNT1 by one. When it is decided that the current-time level detection signal is not at H-level, the program flow proceeds to step S102.

Then, a counter CNT2 is incremented by one at step S102, and the program flow proceeds to step S103. Then, it is decided whether or not the value of the counter CNT2 is 5 at step S103. When it is decided that the value of the counter CNT2 is 5, the program flow proceeds to step S125. When it is decided that the value of the counter CNT2 is not 5, the program flow proceeds to step S104 shown in FIG. 30. Then, it is decided whether or not the value of the counter CNT1 is 5 at step S125. When it is decided that the counter CNT1 indicates 5, the program flow proceeds to step S126 to increment by one degree a preceding-time phase correction angle command (to the lag correction side), and the program flow proceeds to step S129. When it is decided that the counter CNT1 is not 5, the program flow proceeds to step S127 to decide whether or not the counter CNT1 is 0. When it is decided that the counter CNT1 is 0 at step S127, the program flow proceeds to step S128 to decrement by one degree the preceding-time phase correction angle command (to the lead correction side), and the program flow proceeds to step S129. When it is decided that the counter CNT1 is not 0 at step S127, the program flow proceeds to step S129. Then, the counter CNT1 is cleared at step S129, and the program flow proceeds to step S130 to clear the counter CNT2, and proceeds to step S104. It is to be noted that an initial value is set to the phase correction angle command and the counters CNT1 and CNT2 are cleared before the initial interrupt handling process 1 starts.

Figure 30:
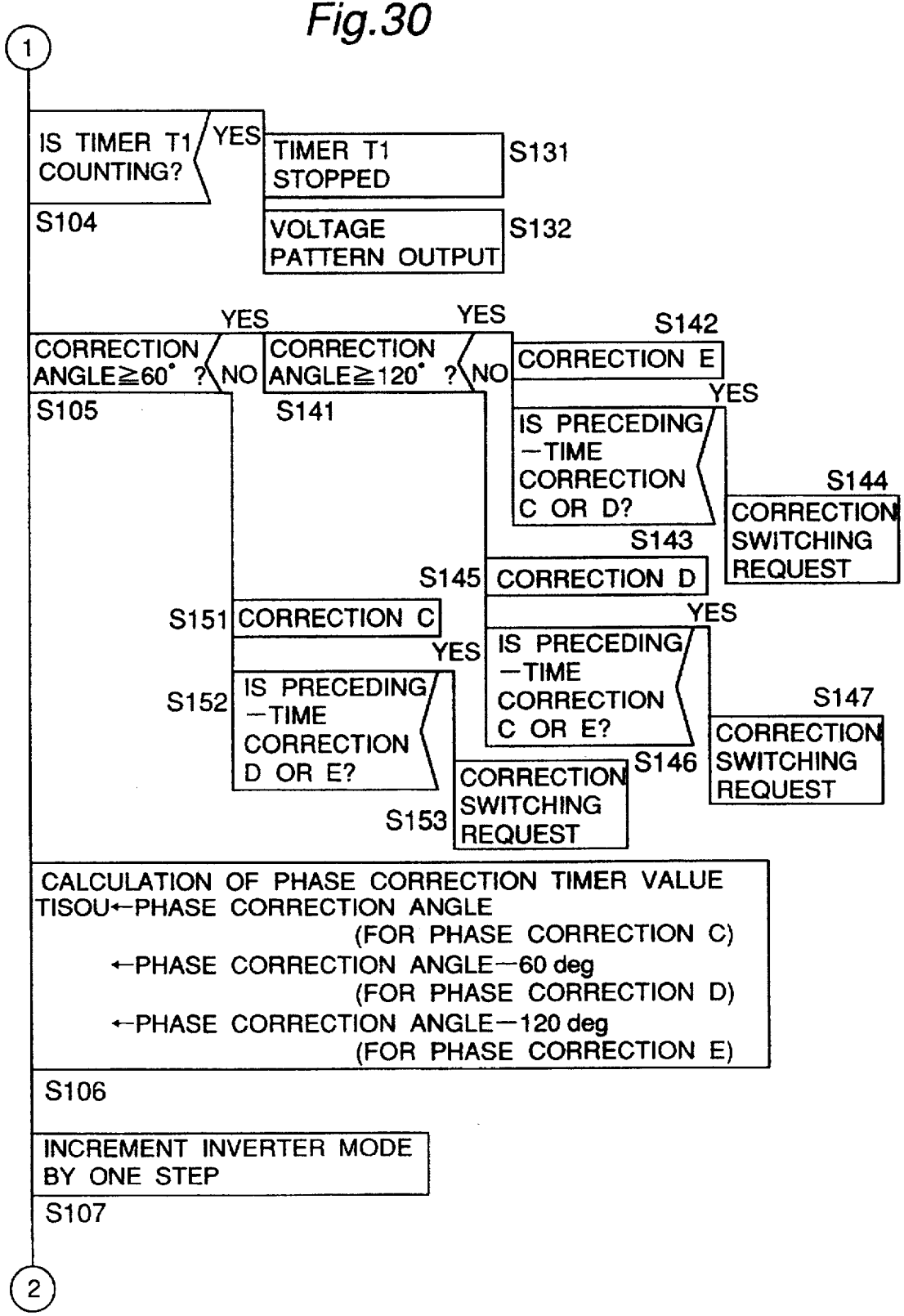

Then, at step S104 shown in FIG. 30, it is decided whether or not the phase correction timer T1 (referred to as a timer T1 in FIG. 30) is counting. When it is decided that the timer T1 is counting, the program flow proceeds to step S131 to stop the timer T1. That is, when the timer T1 is counting, the timer T1 is stopped to be ready for the next start. Then, a voltage pattern is outputted at step S132, and the program flow proceeds to step S105. When it is decided that the timer T1 is not counting at step S104, the program flow proceeds to step S105.

Then, it is decided whether or not a correction angle (phase correction angle based on the phase correction command signal from the level decision section 51) is not smaller than 60 degrees. When the correction angle is not smaller than 60 degrees, the program flow proceeds to step S141 to decide whether or not the correction angle is not smaller than 120 degrees. When the correction angle is not smaller than 120 degrees at step S141, the program flow proceeds to step S142 to establish a phase correction E (referred to as a correction E in FIG. 30), and proceeds to step S143. Then, it is decided whether or not the preceding phase correction is a phase correction C (referred to as a correction C in FIG. 30) or a phase correction D (referred to as a correction D in FIG. 30) at step S143. When it is decided that the preceding phase correction is the phase correction C or the phase correction D, the program flow proceeds to step S144 to issue a correction switching request, and thereafter proceeds to step S106. Otherwise, when it is decided that the preceding phase correction is neither the phase correction C nor the phase correction D at step S143, the program flow proceeds to step S106.

On the other hand, when the correction angle is smaller than 120 degrees at step S141, the program flow proceeds to step S145 to establish a phase correction D, and proceeds to step S146. Then, it is decided whether or not the preceding phase correction is the phase correction C or the phase correction E at step S146. When it is decided that the preceding phase correction is the phase correction C or the phase correction E, the program flow proceeds to step S147 to issue a correction switching request, and thereafter proceeds to step S106. Otherwise, when it is decided that the preceding phase correction is neither the phase correction C nor the phase correction E at step S146, the program flow proceeds to step S106. When it is decided that the correction angle is smaller than 60 degrees at step S105, the program flow proceeds to step S151 to establish a phase correction C, and proceeds to step S152. Then, it is decided whether or not the preceding phase correction is the phase correction D or the phase correction E at step S152. When it is decided that the preceding phase correction is the phase correction D or the phase correction E, the program flow proceeds to step S153 to issue a correction switching request, and thereafter proceeds to step S106. Otherwise, when it is decided that the preceding phase correction is neither the phase correction D nor the phase correction E at step S152, the program flow proceeds to step S106.

Then, at step S106, a timer value TISOU is calculated every time of phase corrections C, D and E. That is in the phase correction C, a timer value corresponding to the phase correction angle is set to the timer value TISOU. In the phase correction D, a timer value corresponding to a phase angle obtained by subtracting 60 degrees from the phase correction angle is set to the timer value TISOU. In the phase correction E, a timer value corresponding to a phase angle obtained by subtracting 120 degrees from the phase correction angle is set to the timer value TISOU. Then, the program flow proceeds to step S107 to increment the inverter mode by one step.

Figure 31:
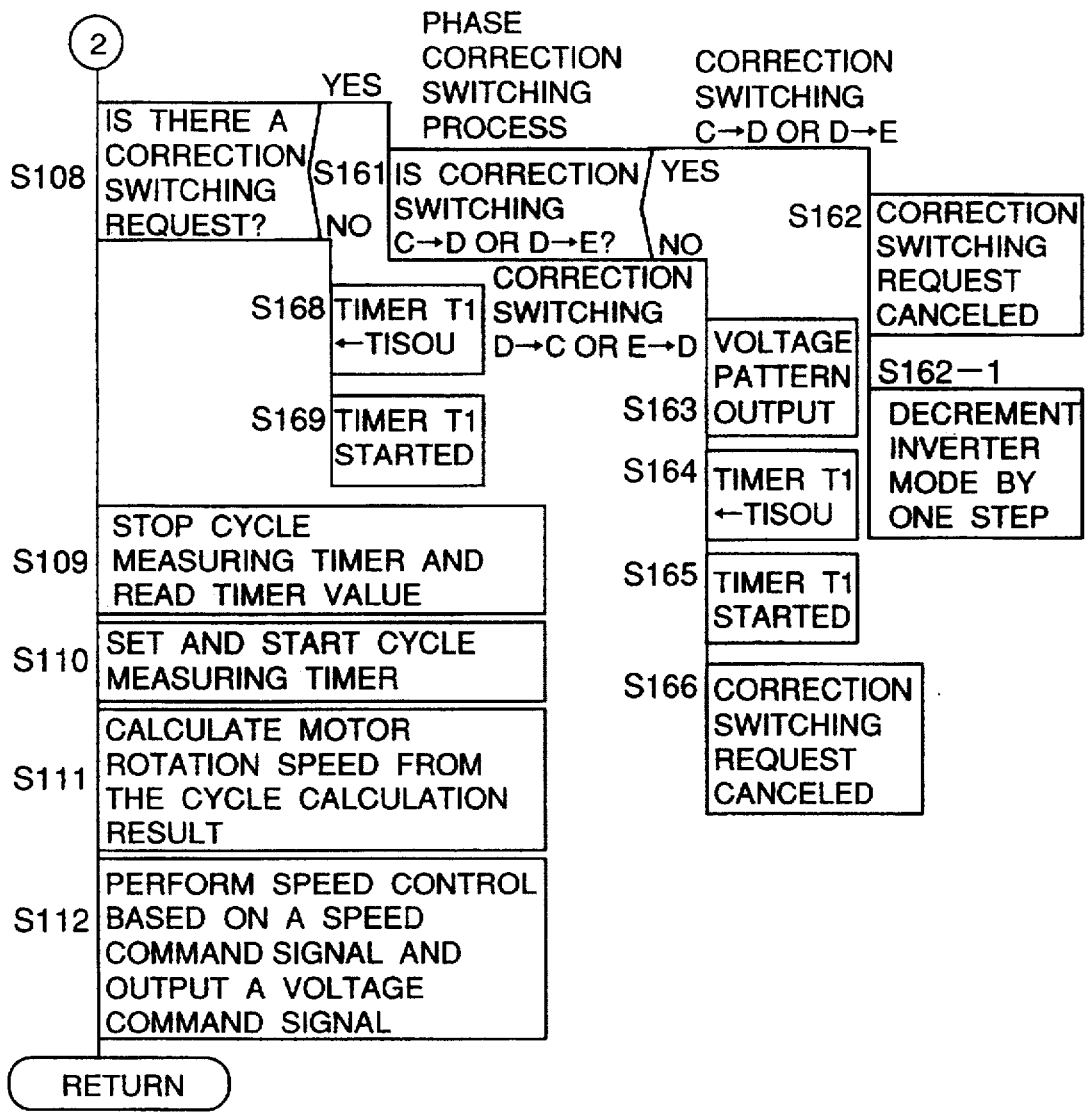

Then, the program flow proceeds to step S108 shown in FIG. 31, and it is decided whether or not, the correction switching request is there. When there is the correction switching request, the program flow proceeds to step S161 to decide whether the correction mode is switched from the phase correction C (referred to as a correction C in FIG. 31) to the phase correction D (referred to as a correction D in FIG. 31) or from the phase correction D to the phase correction E (referred to as a correction E in FIG. 30). When it is decided that the correction mode is switched from the phase correction C to the phase correction D or from the phase correction D to the phase correction E, the program flow proceeds to step S162 to cancel the correction switching request, the inverter mode is put back by one step at step S162-1, and the program flow proceeds to step S109.

On the other hand, when the correction mode is switched neither from the phase correction C to the phase correction D nor from the phase correction D to the phase correction E, i.e., switched from the phase correction D to the phase correction C or from the phase correction E to the phase correction D, the program flow proceeds to step S163 to output a voltage pattern. Then, the program flow proceeds to step S164 to set the timer value TISOU calculated at step S106 to the timer T1, and thereafter the timer T1 is started at step S165. Then, the program flow proceeds to step S166 to cancel the correction switching request, and proceeds to step S109.

When it is decided that there is no correction switching request at step S108, the program flow proceeds to step S168 to set the timer value TISOU calculated at step S106 to the timer T1, the timer T1 is started at step S169, and the program flow proceeds to step S109.

Then, the cycle measuring timer T2 is stopped and a timer value of the cycle measuring timer T2 is read at step S109, and the program flow proceeds to step S110. Then, the cycle measuring timer T2 is set and started at step S110 to start the next cycle measurement. Then, a cycle is calculated from the value of the cycle measuring timer T2 in the cycle calculator 41 at step S111, and from the calculation result, the rotation speed of the motor is calculated in the speed calculator 44. Then, the speed controller 45 executes speed control in response to an external speed command signal to output a voltage command signal at step S112.

Figure 32:
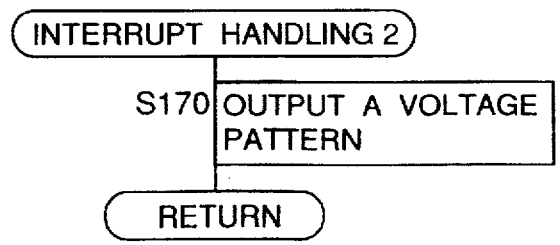
FIG. 32 is a flow chart showing interrupt handling 2 due to a timer interrupt by the phase correction timer of the microcomputer shown in FIG. 24.

Then, in a manner as shown in FIG. 32, when the counting operation of the timer T1 is completed and an interrupt signal IRQ is outputted from the timer T1, an interrupt handling process 2 starts, and a voltage pattern is outputted at step S170 to complete the interrupt handling process 2.

Thus, the phase correction C effects a phase correction of 0 degree to 60 degrees, the phase correction D effects a phase correction of 60 degrees to 120 degrees, and the phase correction E effects a phase correction of 120 degrees to 180 degrees. It is to be noted that FIGS. 28 (A) through (O) show signals at individual portions of the present brushless DC motor system in the process of phase correction D for effecting a phase correction of 80 degrees.

As shown in FIG. 28 (H), the timer T1 starts sequentially for each of the position signal numbers (shown in FIG. 28 (G)). When the phase correction angle is set to 80 degrees with respect to a reference point established, for example, at a point where the position signal number changes from 2 to 3, the position signal number is delayed by one from the reference point, so that the timer T1 starts at a point where the position signal number changes from 3 to 4, and that the inverter mode (shown in FIG. 28 (P)) is incremented by one step to [0] with a delay of 80 degrees from the reference point.

Thus, it is decided whether or not the change in level of the level detection signal from H-level to L-level and from L-level to H-level continuously occurs every time the interrupt handling process 1 is executed five times. When it is decided that the change in level of the level detection signal has continuously occurred five times, the phase of the voltage pattern is delayed one degree by one degree toward the lag correction side. When it is decided that no change of the level detection signal has occurred, the phase of the voltage pattern is advanced one degree by one degree toward the lead correction side. Thus, the aforementioned integral signal $\int V_{MN} dt$ comes to have a level set by the reference values E1 and E2 of the level detector 6. When there is neither the case where the change of the level detection signal continuously occurs five times nor the case where no change of the level detection signal occurs, the phase of the voltage pattern is not adjusted.

It was confirmed by an experiment detailed later that the level of the integral signal $\int V_{MN} dt$ is in approximately inverse proportion to the motor efficiency, and that regardless of the magnitude of the load and the running frequency, the level of the integral signal $\int V_{MN} dt$ is substantially constant at the peak motor efficiency point. Therefore, by paying attention to the above-mentioned fact, the phase correction is effected by setting the reference values E1 and E2 at the amplitude value of the integral signal $\int V_{MN} dt$ at the peak motor efficiency point so that the level of the integral signal $\int V_{MN} dt$ becomes a target value at the peak motor efficiency point. That is, by switching the voltage pattern in synchronization with the voltage pattern signal obtained by correcting the phase of the position signal, the motor is operated at the peak motor efficiency point. When the drive system enters into the steady state, the phase correction angle is not adjusted, and the motor is operated stably at the peak motor efficiency point.

Therefore, the motor can be operated at the peak motor efficiency point regardless of the magnitude of the load and the pitch of the running frequency. Furthermore, by adjusting the phase of the voltage pattern gradually from the lead correction side to the lag correction side so as to achieve the peak motor efficiency point, the phase of the voltage pattern is prevented from being adjusted to a step-out region existing on the lag correction side of the peak efficiency point. Therefore the step out is prevented.

The experiment which proved the fact that the level of the integral signal $\int V_{MN} dt$ is approximately constant at the peak motor efficiency point will be described below. It is to be noted that the experiment was performed on an amplitude characteristic of the voltage difference signal $V_{MN}$ representing the voltage difference between the voltage $V_M$ at the neutral point of the resistor circuit 2 and the voltage $V_N$ at the neutral point of the armature coils 1a, 1b and 1c, and on an amplitude characteristic of the integral signal $\int V_{MN} dt$ obtained by integrating the voltage difference signal $V_{MN}$.

Figure 33:
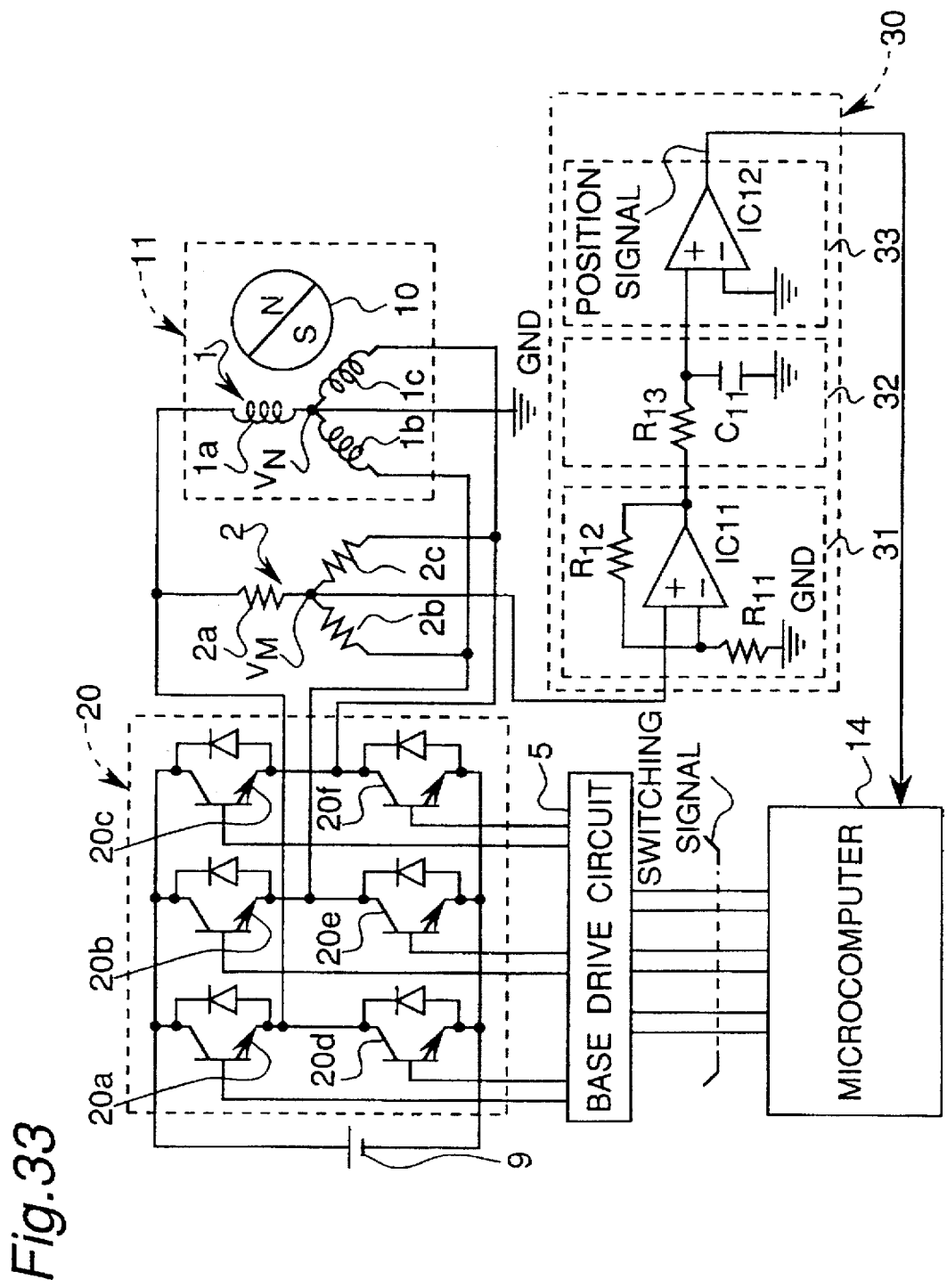
FIG. 33 is an arrangement diagram of a brushless DC motor with which experiments were made on the characteristics of voltage difference signals and integral signals.
Figure 34:
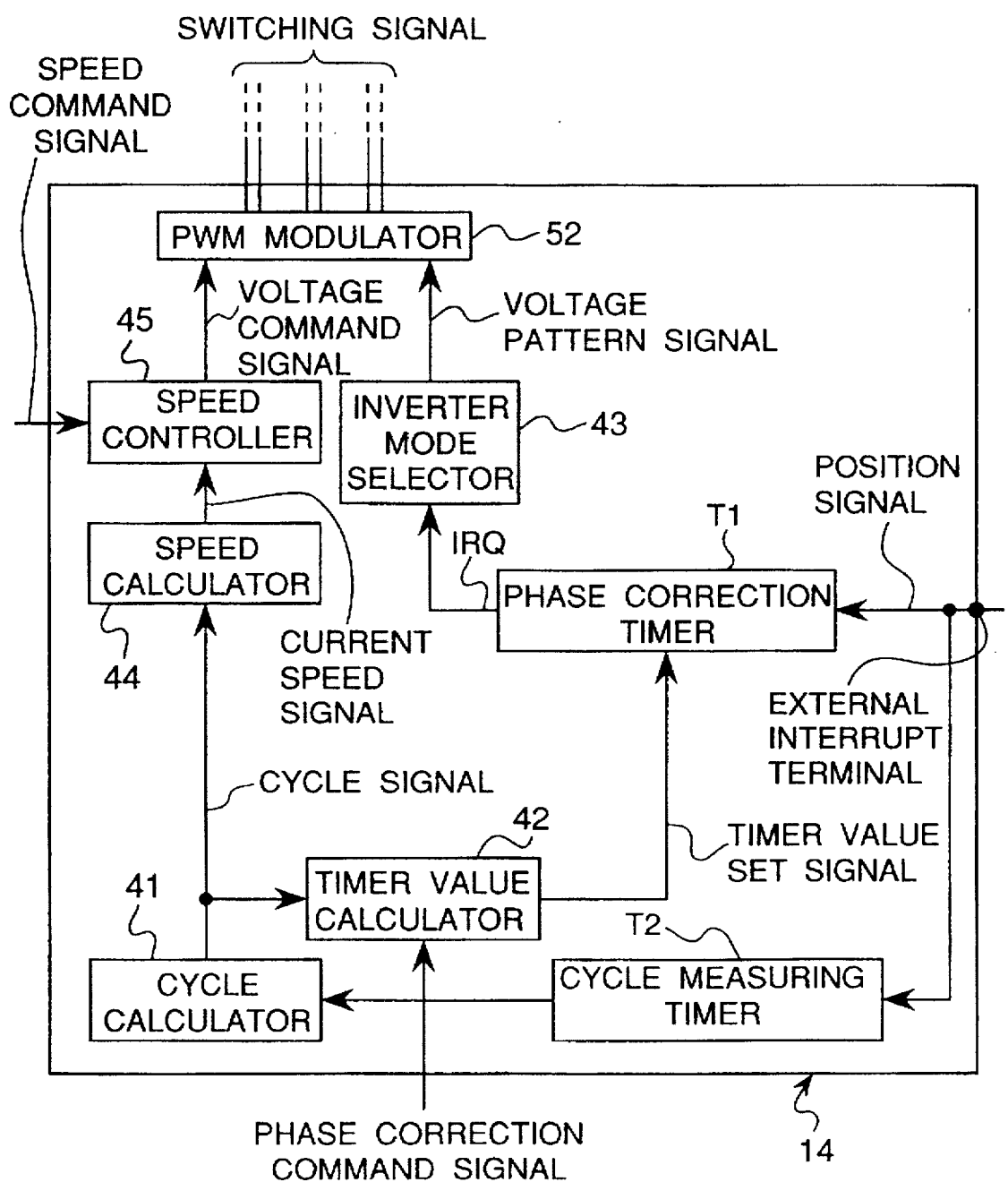
FIG. 34 is a block diagram of the microcomputer of the brushless DC motor system of FIG. 33.

FIG. 33 shows a construction of the brushless DC motor system used for the experiment. The brushless DC motor system has the same construction as that of the brushless DC motor system of the fourth embodiment except for a rotational-position sensor 30 and a microcomputer 14, and therefore no description is provided therefor. FIG. 34 shows a construction of the microcomputer 14 which has a construction formed by excluding the level decision section 51 from the microcomputer 4 shown in FIG. 26. Therefore, the same components are denoted by the same reference numerals, and no description is provided therefor. It is to be noted that an interrupt handling process for correcting the phase of the microcomputer 14 is executed in the same manner as that of the flow charts of FIGS. 29, 30, 31 and 32 except for the steps S101, 102, 103 and 120 through 130.

The rotational-position sensor 30 includes: a differential amplifier 31 in which the voltage $V_M$ at the neutral point of the resistor circuit 2 is inputted to a non-inverted input terminal of an amplifier IC11, a ground GND is connected to an inverted input terminal of the amplifier IC11 via a resistor $R_{11}$, and a resistor $R_{12}$ is connected between an output terminal and an inverted input terminal of the amplifier IC11; an integrator 32 comprised of a resistor $R_{13}$ of which one end is connected to the output terminal of the differential amplifier 31 and a capacitor $C_{11}$ connected between the other end of the resistor $R_{13}$ and the ground GND; and a zero-crossing comparator 33 comprised of an amplifier IC12 which has its non-inverted input terminal connected to the other end of the resistor $R_{13}$ of the integrator 32 and has its inverted input terminal connected to the ground GND. Further, the neutral point of the armature coils 1a, 1b and 1c is connected to the inverted input terminal of the differential amplifier 31 via the ground GND. Therefore, the differential amplifier 31 detects the voltage difference signal $V_{MN}$ representing the voltage difference between the voltage $V_M$ at the neutral point of the resistor circuit 2 and the voltage $V_N$ at the neutral point of the armature coils 1a, 1b and 1c.

In the above-mentioned construction, when the brushless DC motor is driven in accordance with the position sensing, the differential amplifier 31 of the rotational-position sensor 30 detects the voltage difference signal $V_{MN}$ representing the voltage difference between the voltage $V_M$ at the neutral point of the resistor circuit 2 and the voltage $V_N$ at the neutral point of the armature coils 1a, 1b and 1c. Then, the integrator 32 integrates the voltage difference signals $V_{MN}$ so as to output an integral signal $\int V_{MN} dt$, and inputs the integral signal $\int V_{MN} dt$ to the non-inverted input terminal of the zero-crossing comparator 33. Then, the zero-crossing comparator 33 compares the integral signal $\int V_{MN} dt$ with a reference voltage at the ground GND, and outputs a position signal.

Then, the position signal from the zero-crossing comparator 33 is inputted through an external interrupt terminal of the microcomputer 14 to the cycle measuring timer T2. Then, the cycle measuring timer T2 measures a period from a leading edge to a trailing edge of the position signal and a period from a trailing edge to a leading edge of the position signal, and outputs a timer value representing each measured period. Upon receiving a signal representing the timer value from the cycle measuring timer T2, the cycle calculator 41 obtains a cycle of the voltage pattern of the armature coils 1a, 1b and 1c.

Then, upon receiving the cycle signal representing the cycle from the cycle calculator 41 and an external phase correction command signal, the timer value calculator 42 outputs the timer value set signal. Upon receiving the timer value set signal from the timer value calculator 42, the phase correction timer T1 counts a time from the position signal to the switching of the voltage pattern. That is, when completing the counting, the phase correction timer T1 outputs the interrupt signal IRQ to the inverter mode selector 43, and the inverter mode selector 43 outputs phase-corrected voltage pattern signals to the PWM modulator 52. Then, the PWM modulator 52 outputs a switching signal to the base drive circuit 5 shown in FIG. 33, and the base drive circuit 5 outputs a commutation control signal to the inverter section 20, so that the transistors 20a through 20f of the inverter section 20 are tuned on and off, respectively.

Figure 35:
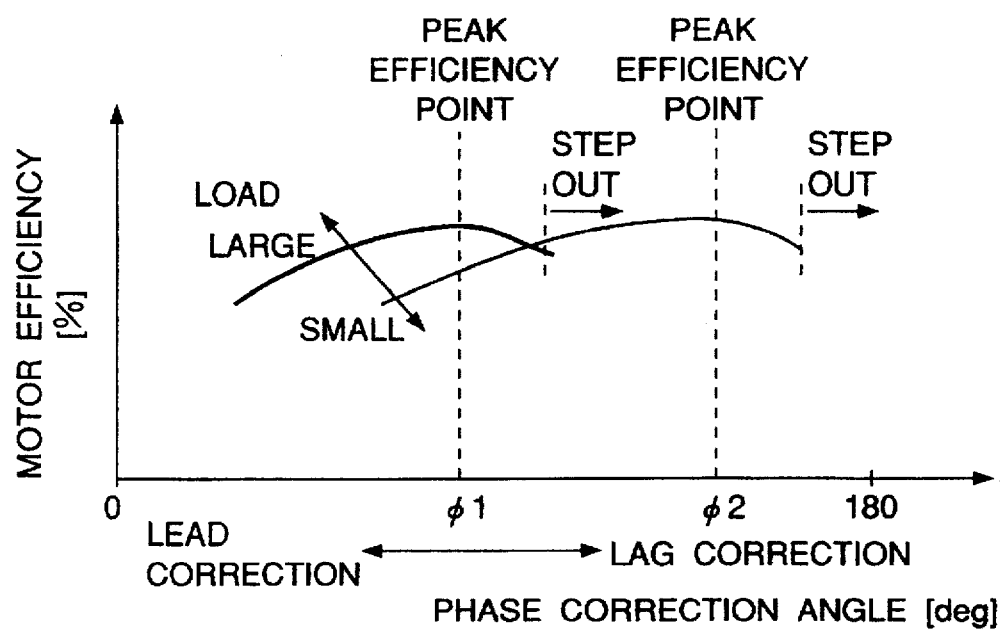
FIG. 35 is a chart showing the motor efficiency characteristic relative to the phase correction angle when the load is varied with the running frequency constant in the brushless DC motor system of FIG. 33.

First, when the load is varied with the running frequency kept constant, a characteristic curve of the motor efficiency relative to the phase correction angle exhibits a curve as shown in FIG. 35 where the curve shifts to the lead correction side of the phase correction angle according as the load increases, and the curve shifts to the lag correction side of the phase correction angle according as the load decreases. Then, the peak efficiency point takes place at a phase correction angle of $\phi 1$ when the load is great, and the peak efficiency point takes place at a phase correction angle of $\phi 2$ when the load is small.

Figure 36:
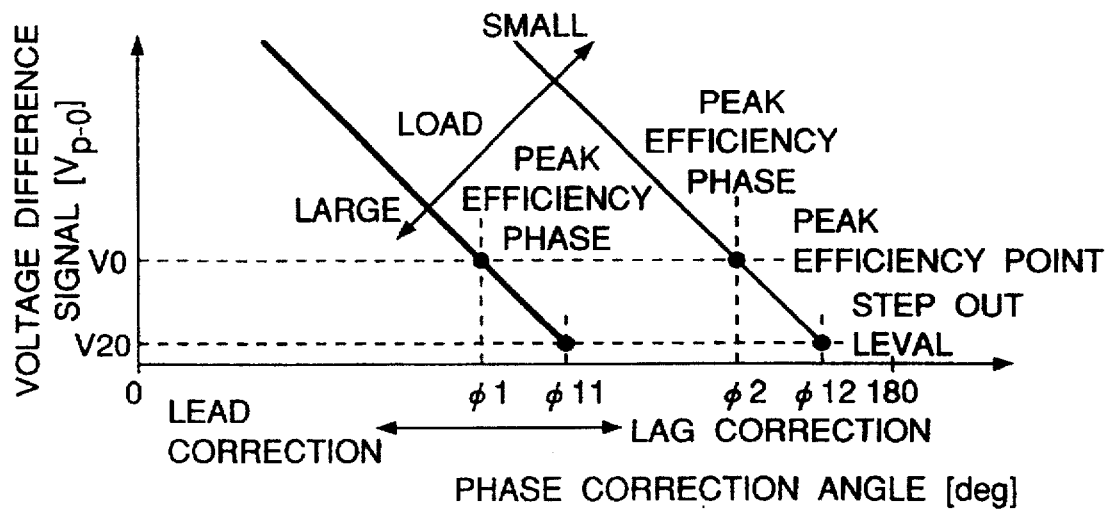
FIG. 36 is a chart showing the voltage difference signal characteristic relative to the phase correction angle when the load is varied with the running frequency constant in the brushless DC motor system of FIG. 33.

In the present case, the characteristic of the voltage difference signal $V_{MN}$ relative to the phase correction angle is represented by an approximately straight line, as shown in FIG. 36, which indicates that the level of the voltage difference signal $V_{MN}$ gradually reduces according as the phase correction angle advances from the lead correction side to the lag correction side. The line shifts to the lead correction side of the phase correction angle according as the load increases, and the line shifts approximately parallel from the lead correction side to the lag correction side of the phase correction angle according as the load decreases. It is to be noted that the axis of abscissas of FIG. 36 represents the phase correction angle, while the axis of ordinates represents a level ranging from the peak point to the zero point of the voltage difference signal $V_{MN}$. Then, in correspondence with the peak efficiency point of the motor efficiency characteristic shown in FIG. 35, the level of the voltage difference signal $V_{MN}$ is V0 at a phase correction angle of $\phi 1$ when the load is great, and the level of the voltage difference signal $V_{MN}$ is V0 at a phase correction angle of $\phi 2$ when the load is small. That is, it can be understood that the voltage difference signal $V_{MN}$ at the peak efficiency point is approximately constant regardless of the variation of the load. When the load is great, the motor steps out at a phase correction angle of $\phi 11$ located further on the lag correction side than the phase correction angle of $\phi 1$ is. The level of the voltage difference signal $V_{MN}$ then is V20. When the load is small, the motor steps out at a phase correction angle of $\phi 12$ located further on the lag correction side than the phase correction angle of $\phi 2$ is. The level of the voltage difference signal $V_{MN}$ then is V20.

Figure 37:
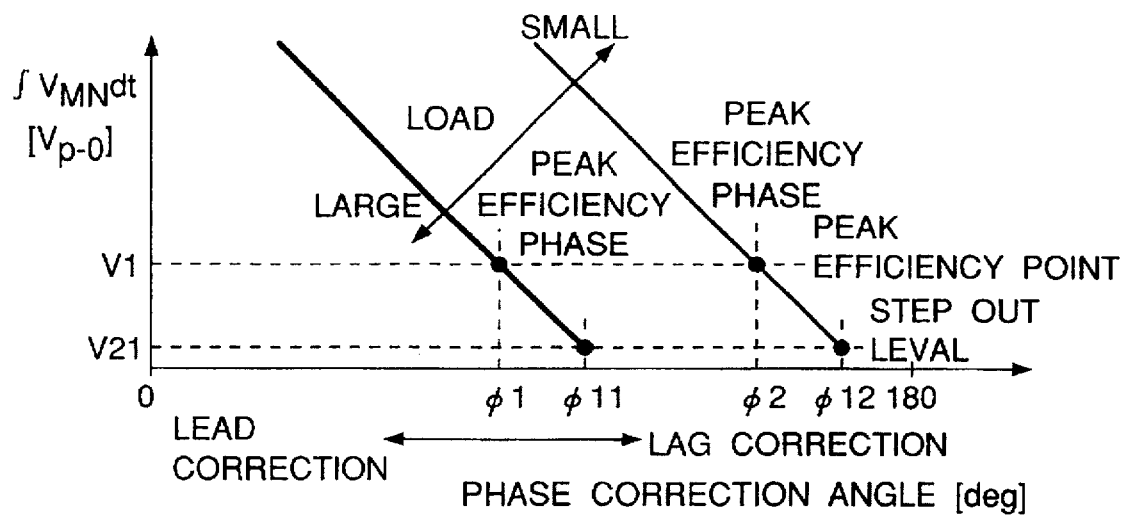
FIG. 37 is a chart showing the integral signal characteristic relative to the phase correction angle when the load is varied with the running frequency constant in the brushless DC motor system of FIG. 33.

Further, the characteristic of the integral signal $\int V_{MN} dt$ relative to the phase correction angle exhibits an approximately straight line which indicates, as shown in FIG. 37, that the level of the integral signal $\int V_{MN} dt$ gradually reduces according as the phase correction angle advances from the lead correction side to the lag correction side. The line shifts to the lead correction side of the phase correction angle according as the load increases, and the line shifts approximately parallel from the lead correction side to the lag correction side of the phase correction angle according as the load decreases. It is to be noted that the axis of abscissas of FIG. 37 represents the phase correction angle, while the axis of ordinates represents a level ranging from the peak point to the zero point of the integral signal $\int V_{MN} dt$. Then, in correspondence with the peak efficiency point of the motor efficiency characteristic shown in FIG. 35, the level of the integral signal $\int V_{MN} dt$ is V1 at a phase correction angle of $\phi 1$ when the load is great, and the level of the integral signal $\int V_{MN} dt$ is V1 at a phase correction angle of $\phi 2$ when the load is small. That is, it can be understood that the integral signal $\int V_{MN} dt$ at the peak efficiency point is approximately constant regardless of the variation of the load. When the load is great, the motor steps out at a phase correction angle of $\phi 11$ located further on the lag correction side than the phase correction angle of $\phi 1$ is, and the level of the integral signal $\int V_{MN} dt$ then is V21. When the load is small, the motor steps out at a phase correction angle of $\phi 12$ located further on the lag correction side than the phase correction angle of $\phi 2$, and the level of the integral signal $\int V_{MN} dt$ then is V21.

Figure 38:
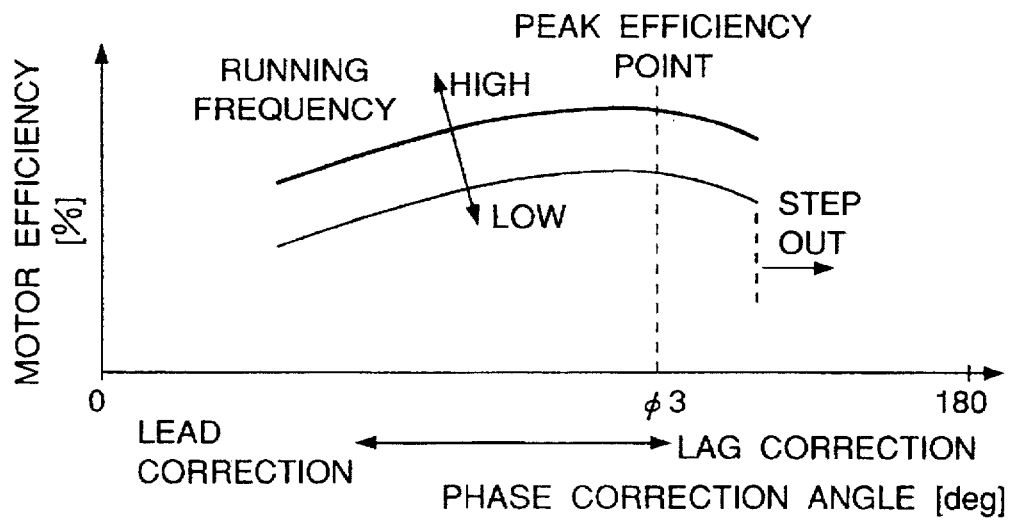
FIG. 38 is a chart showing the motor efficiency characteristic relative to the phase correction angle when the running frequency is varied with the load constant in the brushless DC motor system of FIG. 33.

When the running frequency is varied with the load kept constant, a characteristic of the motor efficiency relative to the phase correction angle exhibits a curve as shown in FIG. 38 where the motor efficiency increases according as the running frequency increases, and the motor efficiency decreases according as the running frequency decreases. Then, regardless of the pitch of the running frequency, the phase correction angle at the peak efficiency point is $\phi 3$.

Figure 39:
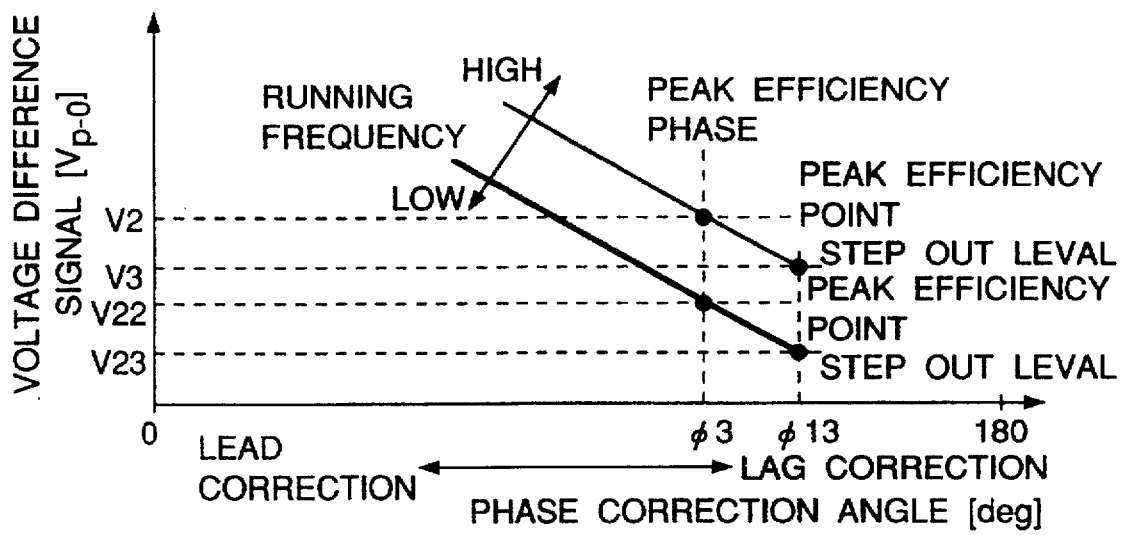
FIG. 39 is a chart showing the voltage difference signal characteristic relative to the phase correction angle when the running frequency is varied with the load constant in the brushless DC motor system of FIG. 33.

In the present case, the characteristic of the voltage difference signal $V_{MN}$ relative to the phase correction angle exhibits an approximately straight line which indicates that, as shown in FIG. 39, the level of the voltage difference signal $V_{MN}$ gradually lowers as the phase correction angle advances from the lead correction side to the lag correction side. The line shifts to the lag correction side of the phase correction angle according as the running frequency increases, and the line shifts approximately parallel to the lead correction side of the phase correction angle according as the running frequency decreases. It is to be noted that the axis of abscissas of FIG. 39 represents the phase correction angle, while the axis of ordinates represents a level ranging from the peak point to the zero point of the voltage difference signal $V_{MN}$. Then, in correspondence with the peak efficiency point of the motor efficiency characteristic shown in FIG. 38, the level of the voltage difference signal $V_{MN}$ is V2 at a phase correction angle of $\phi 3$ when the running frequency is high, and the level of the voltage difference signal $V_{MN}$ is V22 at a phase correction angle of $\phi 3$ when the running frequency is low. When the running frequency is high, the motor steps out at a phase correction angle of $\phi 13$ located further on the lag correction side than the phase correction angle of $\phi 3$ is, and the level of the voltage difference signal $V_{MN}$ then is V3. When the running frequency is low, the motor steps out at a phase correction angle of $\phi 13$ located further on the lag correction side than the phase correction angle of $\phi 3$ is, and the level of the voltage difference signal $V_{MN}$ then is V23.

Figure 40:
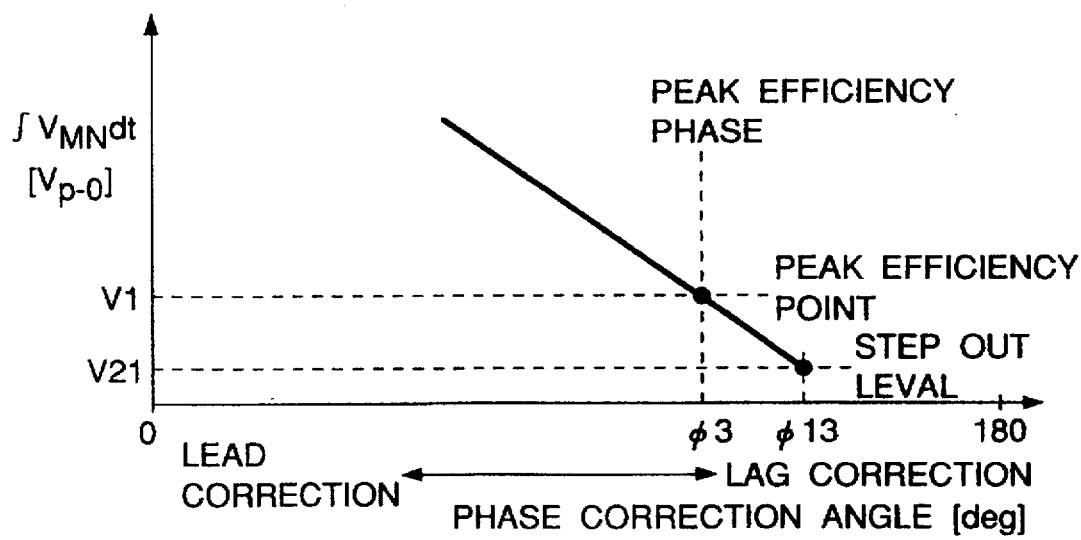
FIG. 40 is a chart showing the integral signal characteristic relative to the phase correction angle when the running frequency is varied with the load constant in the brushless DC motor system of FIG. 33.

Further, the characteristic of the integral signal $\int V_{MN}dt$ relative to the phase correction angle exhibits an approximately straight line which indicates that, as shown in FIG. 40, the level of the integral signal $\int V_{MN}dt$ gradually lowers according as the phase correction angle advances from the lead correction side to the lag correction side. It can be understood that the characteristic scarcely varies regardless of the variation of the running frequency. It is to be noted that the axis of abscissas of FIG. 40 represents the phase correction angle, while the axis of ordinates represents a level ranging from the peak point to the zero point of the integral signal $\int V_{MN}dt$. Then, in correspondence with the peak efficiency point of the motor efficiency characteristic shown in FIG. 38, the level of the integral signal $\int V_{MN}dt$ is V1 at a phase correction angle of $\phi 3$. It is to be noted that the motor steps out at a phase correction angle of $\phi 13$ located further on the lag correction side than the phase correction angle of $\phi 3$ is, when the level of the integral signal $\int V_{MN}dt$ is V21.

Figure 41:
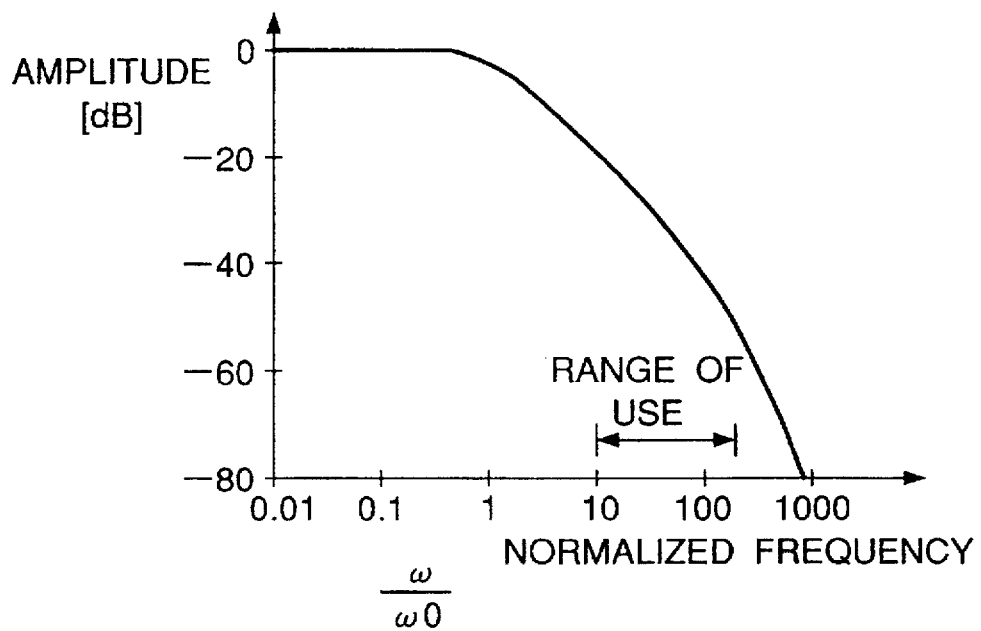
FIG. 41 is a chart showing the amplitude characteristic relative to the normalized frequency of the integrator of the rotational-position sensor of the brushless DC motor system of FIG. 33.
Figure 42:
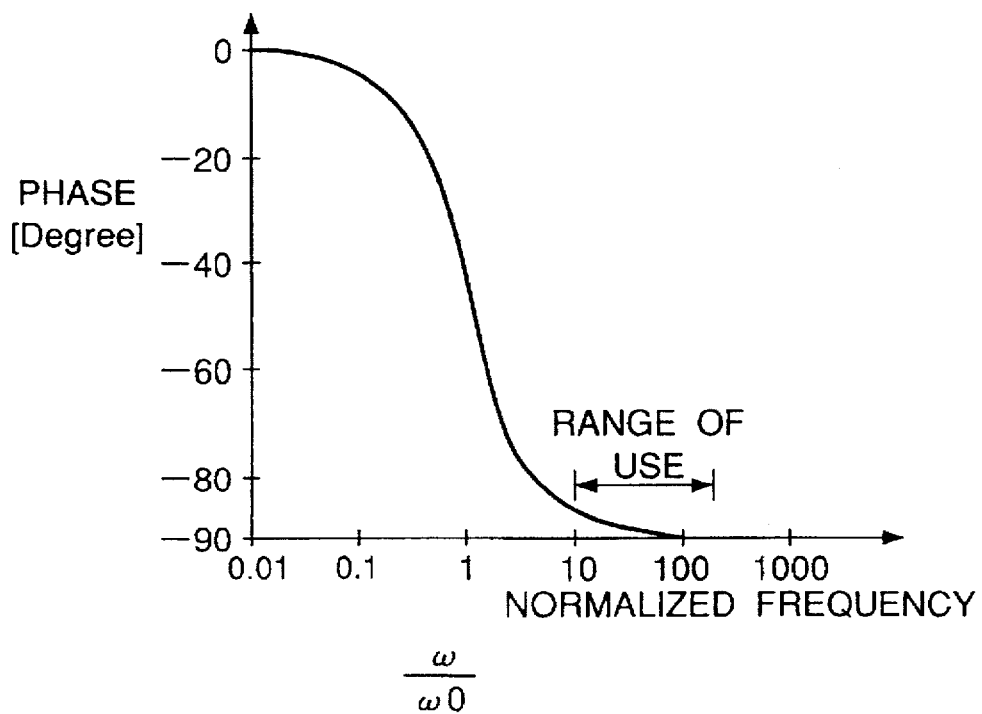
FIG. 42 is a chart showing the phase characteristic relative to the normalized frequency of the integrator of the rotational-position sensor of the brushless DC motor system of FIG. 33.

It is because of an integral characteristic of the integrator 32 of the rotational-position sensor 30 that when the running frequency is varied with the load kept constant, the level of the integral signal $\int V_{MN}dt$ is kept constant, in contrast to the level of the voltage difference signal $V_{MN}$ varying. That is, the integrator 32 of the rotational-position sensor 30 has an amplitude vs. normalized frequency characteristic as shown in FIG. 41 and a phase vs. normalized frequency characteristic as shown in FIG. 42. When the motor has four poles in the running area of a compressor, a frequency of an induced voltage is about 20 to 300 Hz (motor rotational frequency is 10 to 150 rps), while the frequency of the voltage difference signal $V_{MN}$ is three times as great as the induced voltage frequency of about 20 to 300 Hz, i.e., 60 to 900 Hz. When a cut-off frequency of the integrator 32 is set to approximately 5 Hz, a range of use falls within a range of the normalized frequency of 12 to 180 as shown in FIGS. 41 and 42, meaning that the integrator operates as a substantially ideal integrator. Assuming that the voltage difference signal $V_{MN}$ is:

$$V_{MN} = (1/3)(Eu + Ev + Ew)$$
$$= (1/3)(-k(d\Phi u/dt + d\Phi v/dt + d\Phi w/dt))$$

$\Phi u$, $\Phi v$ and $\Phi w$: flux linkage of respective phases, the integral signal $\int V_{MN}dt$ is as follows:

$$\int V_{MN}dt = -(k/3)(\Phi u + \Phi v + \Phi w)$$

From the above, it can be understood that the voltage difference signal $V_{MN}$ varies depending on the running frequency, whereas the integral signal $\int V_{MN}dt$ does not vary depending on the running frequency.

Therefore, by deciding whether or not the level of the voltage difference signal $V_{MN}$ or the integral signal $\int V_{MN}dt$ is at the target value, and adjusting the phase correction angle by the phase correction means so that the voltage difference signal $V_{MN}$ or the integral signal $\int V_{MN}dt$ becomes the target value at the peak efficiency point, a peak-efficiency operation can be achieved.

(Fifth Embodiment)

Figure 43:
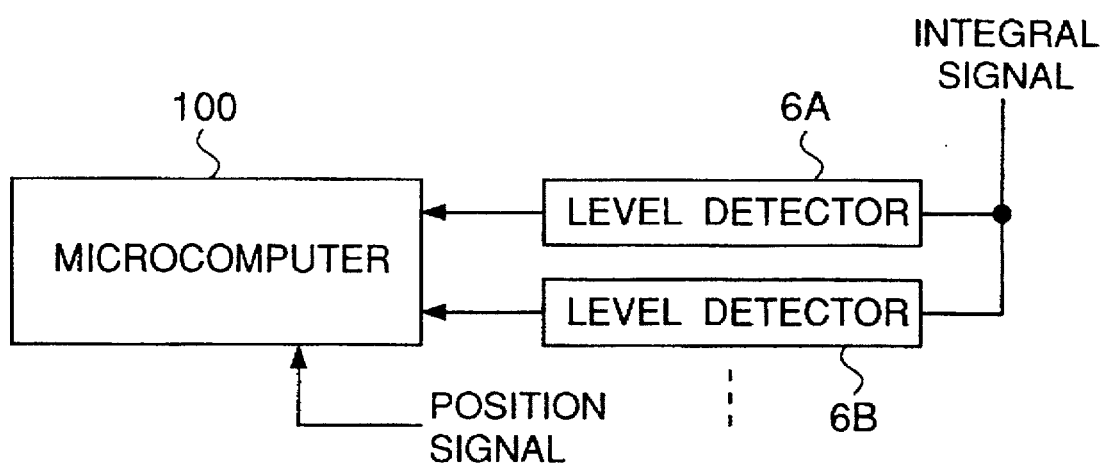
FIG. 43 is a main-part arrangement diagram of the brushless DC motor according to a fifth embodiment of the present invention.
Figure 44:
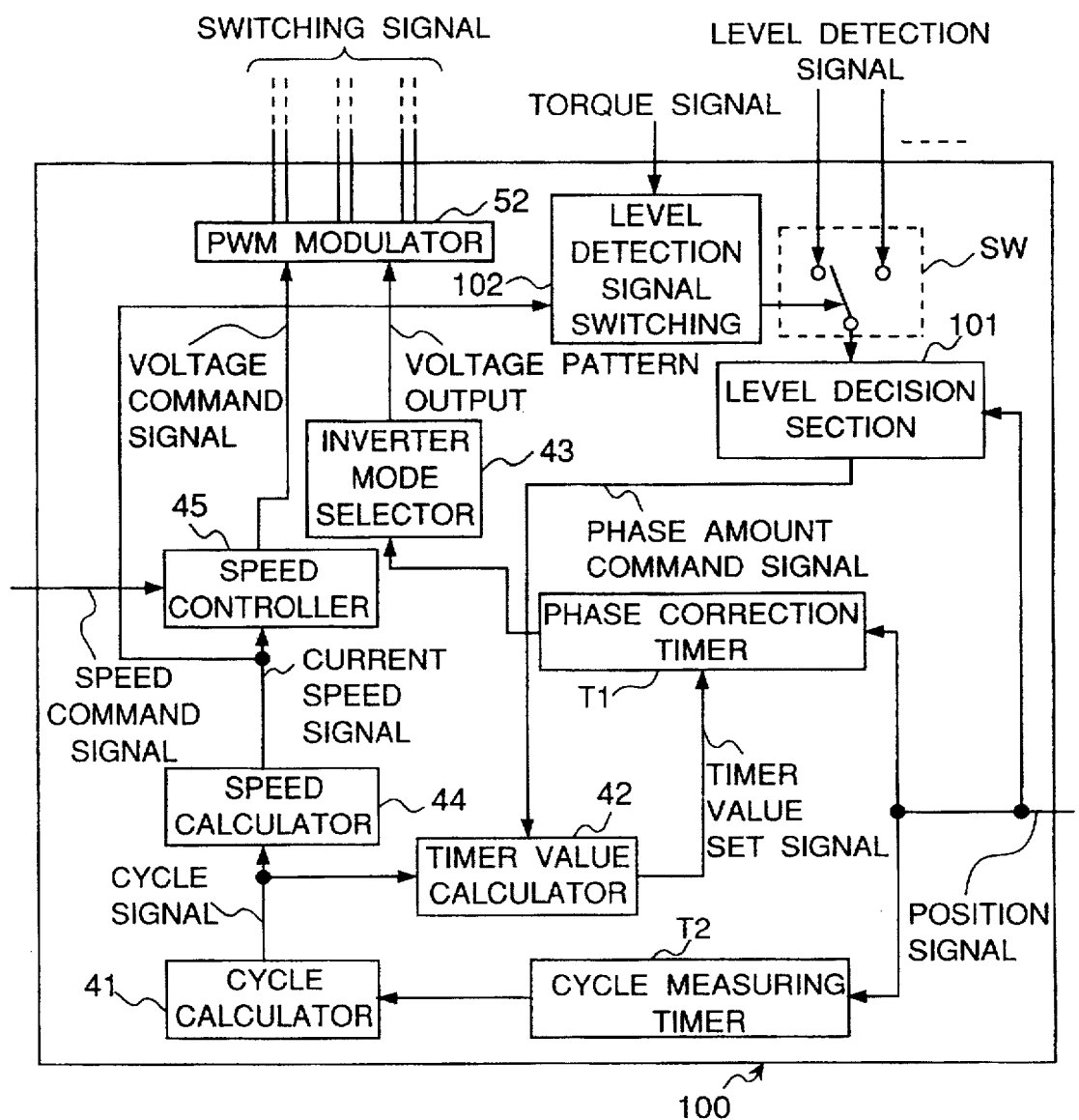
FIG. 44 is a block diagram of the microcomputer shown in FIG. 43.

FIG. 43 shows a construction of an essential part of a brushless DC motor system of a fifth embodiment of the present invention. The present brushless DC motor system has the same construction as that of the brushless DC motor system shown in FIG. 24 except for the microcomputer and the level detector, and therefore no description is provided therefor except for a microcomputer 100 and level detectors 6A, 6B, . . . ; Further, FIG. 44 shows a block diagram of the microcomputer 100 of the brushless DC motor system. The microcomputer 100 of the brushless DC motor system includes the components of the microcomputer 4 of the brushless DC motor system of the fourth embodiment except for the level decision section 51; a level detection signal switching section 102 which receives the current speed signal from the speed calculator 44 and a torque signal, and outputs a switching signal; a switch SW which receives the switching signal from the level detection signal switching section 102 and switches over between level detection signals from the level detectors 6A, 6B, . . . ; and a level decision section 101 which receives the level detection signal from the switch SW and a position signal from the rotational-position sensor 3, and outputs a phase amount command signal.

Figure 45:
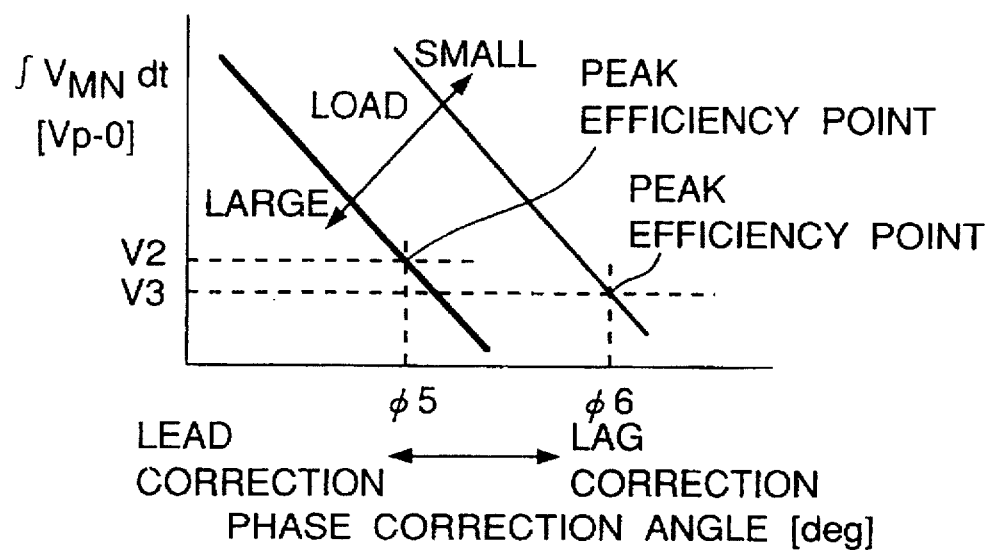
FIG. 45 is a chart showing the integral signal characteristic relative to the phase correction angle when the load is varied with the frequency constant in the brushless DC motor system of FIG. 43.
Figure 46:
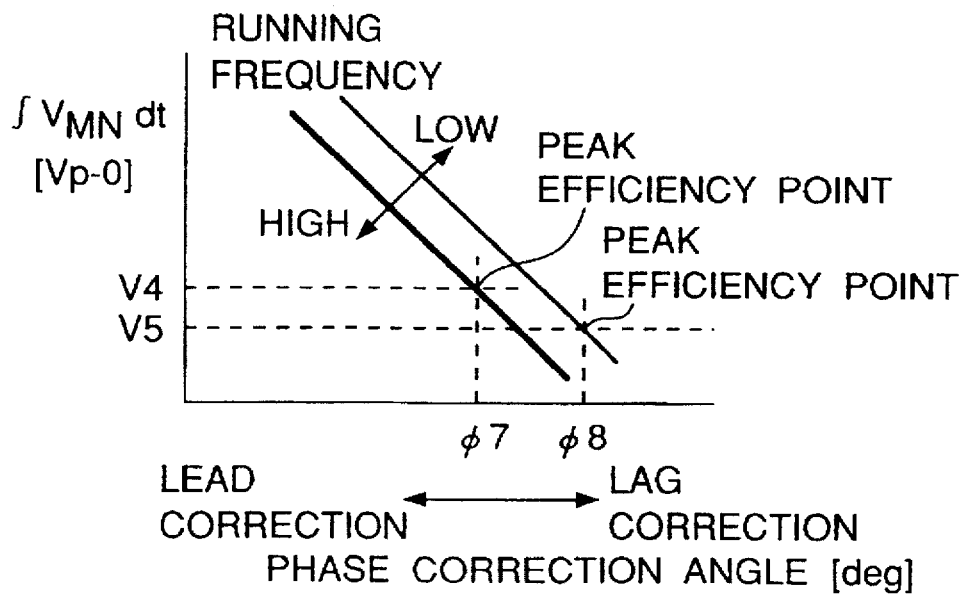
FIG. 46 is a chart showing the integral signal characteristic relative to the phase correction angle when the frequency is varied with the load constant in the brushless DC motor system of FIG. 43.

It is to be noted that, as shown in FIGS. 45 and 46, the brushless DC motor system of the fifth embodiment has a characteristic different from that of the brushless DC motor system of the fourth embodiment.

First, FIG. 45 shows a characteristic of the integral signal $\int V_{MN}dt$ relative to the phase correction angle when the load is varied with the running frequency kept constant in the above-mentioned brushless DC motor system. The characteristic of the above-mentioned brushless DC motor system exhibits an approximately straight line where the level of the integral signal $\int V_{MN}dt$ gradually reduces from the lead correction side to the lag correction side of the phase correction angle. The line shifts to the lead correction side of the phase correction angle according as the load increases, and the line shifts approximately parallel from the lead correction side to the lag correction side of the phase correction angle according as the load decreases. At a phase correction angle of $\phi 5$ at which the peak efficiency point takes place when the load is great, the level of the integral signal $\int V_{MN}dt$ is V2. At a phase correction angle of $\phi 6$ at which the peak efficiency point takes place when the load is small, the level of the integral signal $\int V_{MN}dt$ is V3.

FIG. 46 shows a characteristic of the integral signal $\int V_{MN}dt$ relative to the phase correction angle when the running frequency is varied with the load kept constant in the above-mentioned brushless DC motor system. The characteristic of the above-mentioned brushless DC motor system exhibits an approximately straight line where the level of the integral signal $\int V_{MN}dt$ gradually reduces from the lead correction side to the lag correction side of the phase correction angle. The line shifts to the lead correction side of the phase correction angle according as the running frequency increases, and the line shifts approximately parallel from the lead correction side to the lag correction side of the phase correction angle according as the running frequency decreases. At a phase correction angle of $\phi 7$ at which the peak efficiency point takes place when the running frequency is high, the level of the integral signal $\int V_{MN}dt$ is V4. At a phase correction angle of $\phi 8$ at which the peak efficiency point takes place when the running frequency is low, the level of the integral signal $\int V_{MN}dt$ is V5.

That is, the present invention is applied to a brushless DC motor system in which the level of the integral signal is not constant at the peak efficiency point depending on the magnitude of the load and the pitch of the running frequency.

In the brushless DC motor system having the above-mentioned construction, based on the position signal from the rotational-position sensor 3 and the torque signal representing a torque value depending on the current speed signal from the speed calculator 44 and an external load, the level detection signal switching section 102 outputs a switching signal to the switch SW. That is, according to the variation of the load and the variation of the running frequency, one of the level detectors 6A, 6B, . . . , is selected and a reference value for deciding the level of the integral signal $\int V_{MN} dt$ is changed. Subsequently, the microcomputer 100 executes an interrupt handling process as shown in the flow charts of FIGS. 29, 30, 31 and 32 of the fourth embodiment. The level decision section 101 adjusts the phase correction angle so that the peak motor efficiency is achieved, and outputs a phase correction angle command signal. Therefore, the motor can be operated at the peak efficiency regardless of the magnitude of the load and the pitch of the running frequency.

(Sixth Embodiment)

Figure 47:
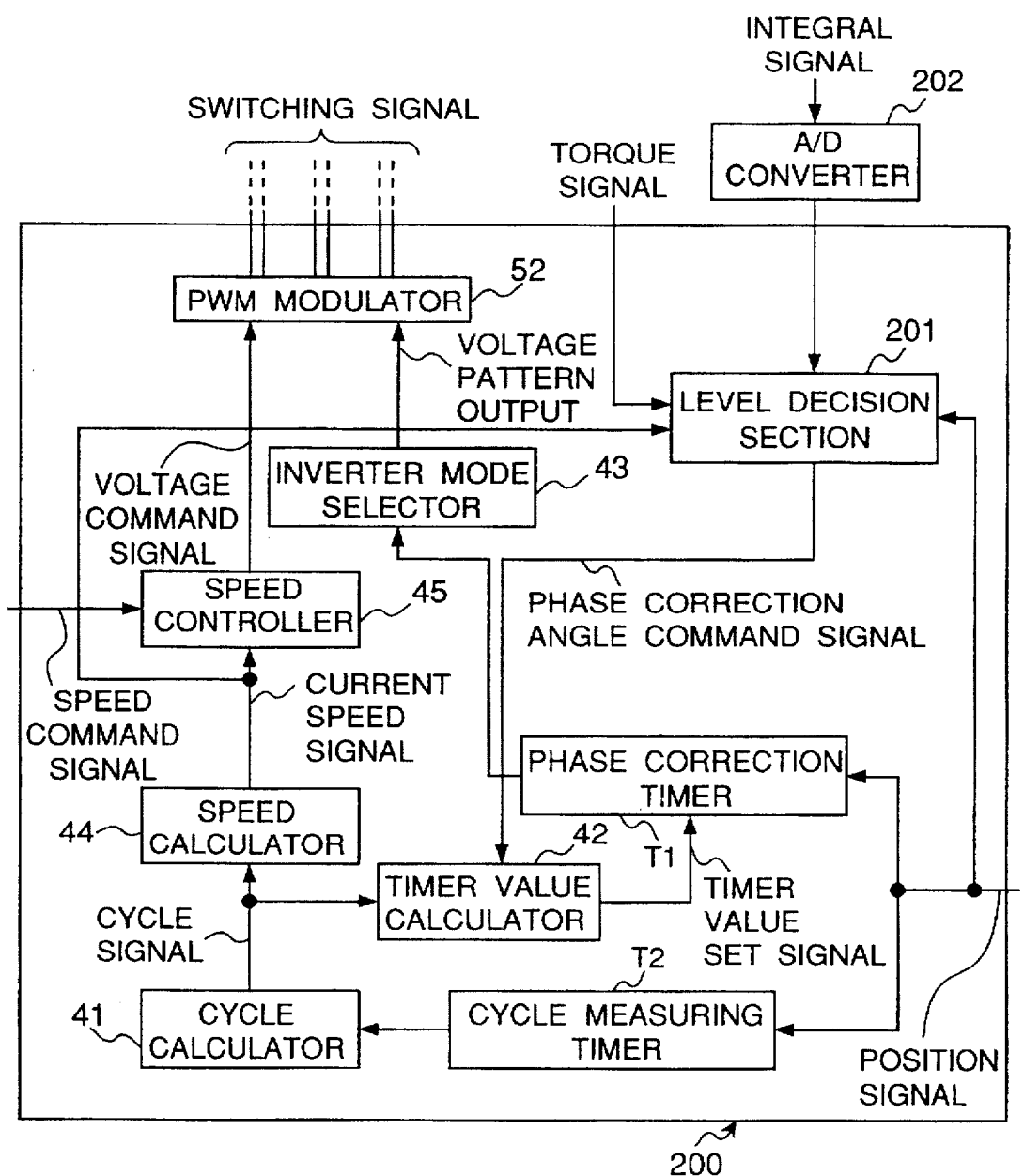
FIG. 47 is a block diagram of the microcomputer of the brushless DC motor system according to a sixth embodiment of the present invention.

FIG. 47 shows a block diagram of a microcomputer employed in a brushless DC motor system of a sixth embodiment of the present invention. The brushless DC motor system has the same construction as that of the brushless DC motor system shown in FIG. 24 except for the microcomputer and the level detector. There is provided no description for the components except for a microcomputer 200 and an A/D converter 202 which substitutes for the level detector. Upon receiving the integral signal from the rotational-position sensor 3, the A/D converter 202 outputs an integral signal which has undergone an analog to digital conversion process.

The above-mentioned brushless DC motor system includes a level decision section 201 which receives the position signal from the rotational-position sensor 3, the current speed signal from the speed calculator 44, an external torque signal representing a load torque value, and the integral signal which has undergone the analog to digital conversion process, and outputs a phase correction angle command signal to the timer value calculator 42. In this brushless DC motor system, the level of the integral signal is not made constant at the peak efficiency point in accordance with the magnitude of the load and the pitch of the running frequency similarly to the fifth embodiment.

In the brushless DC motor system having the above-mentioned construction, the level decision section 201 selects a target value from a preset table based on the current speed signal from the speed calculator 44 and the external torque signal, and decides whether or not the peak value of the integral signal which has undergone the analog to digital conversion process is not smaller than the target value. Then, an interrupt handling process shown in the flow charts of FIGS. 29 through 32 is executed to adjust the phase correction angle so that the peak motor efficiency is achieved, and a phase correction angle command signal is outputted. Therefore, by setting a target value, i.e., a reference value for deciding the level of the integral signal $\int V_{MN} dt$, according to the variation of the load and the variation of the running frequency, and adjusting the phase correction angle so that the peak-efficiency operation is achieved, the motor can be operated at the peak efficiency regardless of the magnitude of the load and the pitch of the running frequency.

(Seventh Embodiment)

Figure 48:
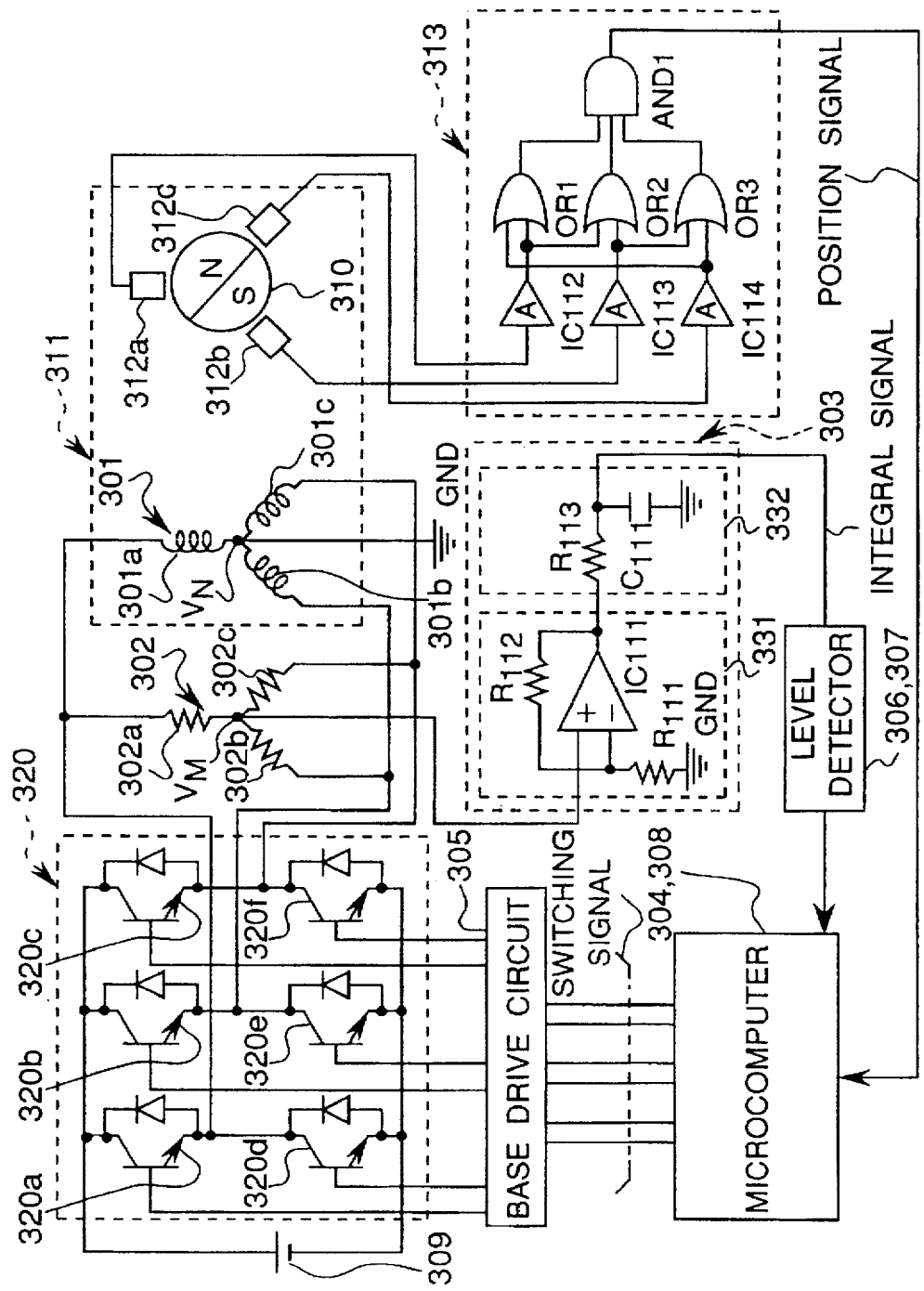
FIG. 48 is an arrangement diagram of the brushless DC motor system according to a seventh embodiment of the present invention.

FIG. 48 shows a construction of a brushless DC motor system of a seventh embodiment of the present invention. Reference numeral 301 denotes a stator which has star-connected armature coils 301a, 301b and 301c, and rotates a rotor 310 having a plurality of permanent magnets by a rotating magnetic field. Reference numeral 302 denotes a resistor circuit which is comprised of star-connected resistors 302a, 302b and 302c and connected in parallel with the armature coils 301a, 301b and 301c. Reference numeral 303 denotes an integral signal detector which detects the voltage difference signal $V_{MN}$ representing the voltage difference between the voltage $V_M$ at the neutral point of the resistor circuit 302 and the voltage $V_N$ at the neutral point of the armature coils 301a, 301b and 301c, integrates the voltage difference signals $V_{MN}$, and outputs the integral signal $\int V_{MN} dt$. Reference numeral 304 denotes a microcomputer which receives the integral signal from the integral signal detector 303 and outputs a switching signal. Reference numeral 305 denotes a base drive circuit which receives the switching signal from the microcomputer 304 and outputs a commutation control signal. The commutation control signal from the base drive circuit 305 is inputted to an inverter section 320. The stator 301 and the rotor 310 constitute a brushless DC motor 311.

Figure 49:
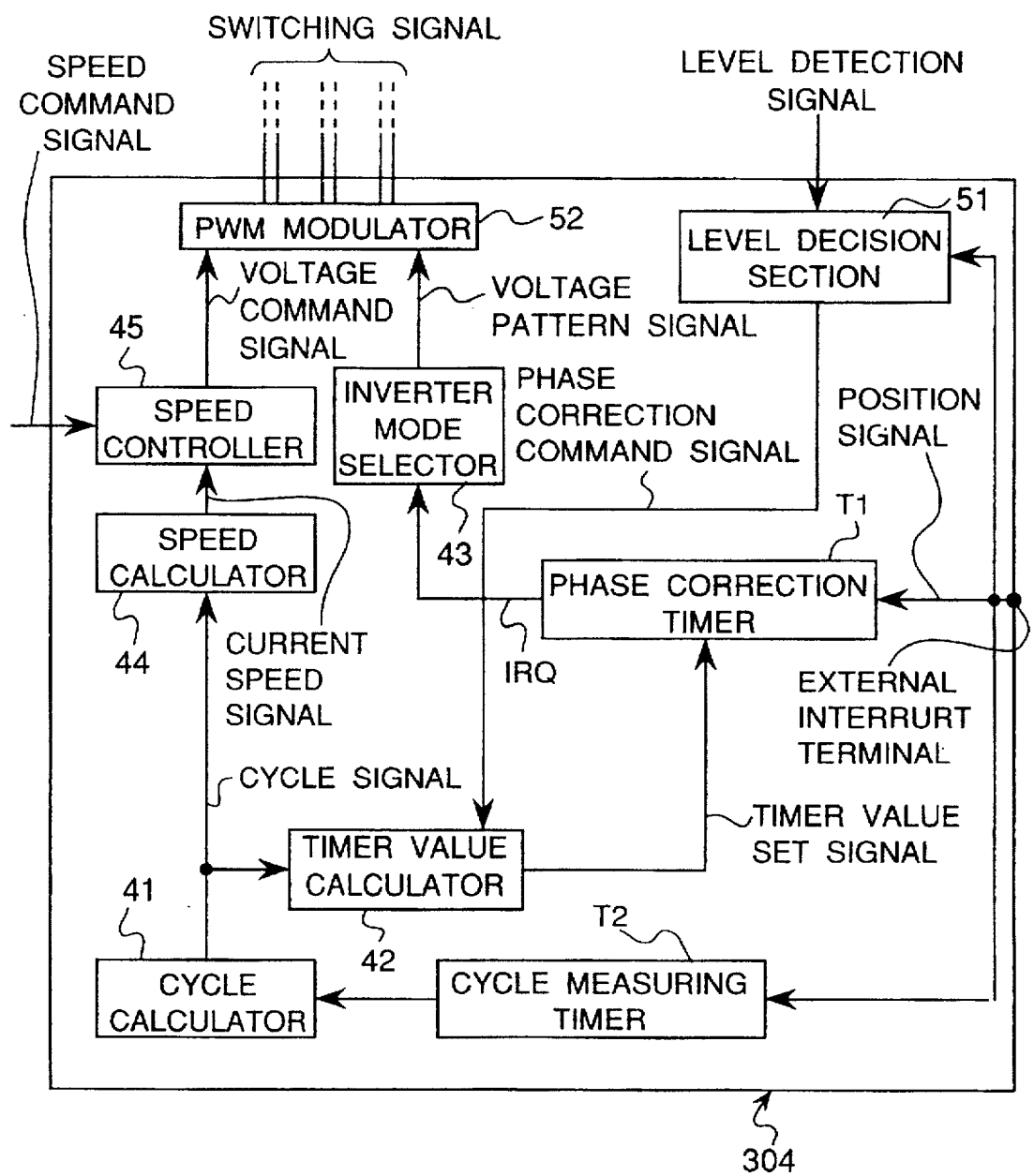
FIG. 49 is a block diagram of the microcomputer of the brushless DC motor system of FIG. 48.

FIG. 49 is a block diagram of the microcomputer 304. The microcomputer 304 has the same construction as that of the fourth embodiment. Therefore, the same components are denoted by the same reference numerals, and no description is provided therefor.

The integral signal detector 303 includes a differential amplifier 331 in which the voltage $V_M$ at the neutral point of the resistor circuit 302 is inputted to a non-inverted input terminal of an amplifier IC111, a ground GND is connected to an inverted input terminal of the amplifier IC111 via a resistor $R_{111}$, and a resistor $R_{112}$ is connected between an output terminal and an inverted input terminal of the amplifier IC111; and an integrator 332 comprised of a resistor $R_{113}$ of which one end is connected to the output terminal of the differential amplifier 331 and a capacitor $C_{111}$ connected between the other end of the resistor $R_{113}$ and the ground GND. Further, the neutral point of the armature coils 301a, 301b and 301c is connected to the inverted input terminal of the differential amplifier 331 via the ground GND and the resistor $R_{111}$. Therefore, the differential amplifier 331 detects the voltage difference signal $V_{MN}$ representing the voltage difference between the voltage $V_M$ at the neutral point of the resistor circuit 302 and the voltage $V_N$ at the neutral point of the armature coils 301a, 301b and 301c.

Figure 50:
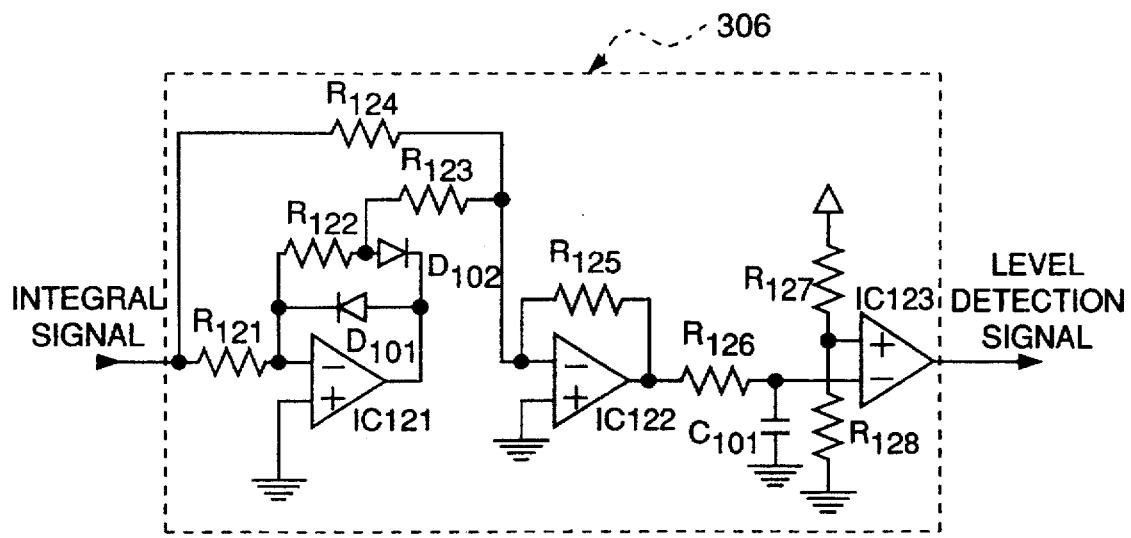
FIG. 50 is a circuit diagram of the level detector of the brushless DC motor system of FIG. 48.

The above-mentioned brushless DC motor system further includes a level detector 306 which receives the integral signal $\int V_{MN} dt$ from the integrator 332 of the integral signal detector 303, and outputs a level detection signal to the microcomputer 304. In the level detector 306 shown in FIG. 50, the integral signal $\int V_{MN} dt$ from the integrator 332 is inputted to an inverted input terminal of an amplifier IC121 via a resistor $R_{121}$, and a non-inverted input terminal of the amplifier IC121 is connected to the ground GND. Further, an anode of a diode $D_{101}$ is connected to an output terminal of the amplifier IC121, and a cathode of the diode $D_{101}$ is connected to the inverted input terminal of the amplifier IC121. Further, a cathode of a diode $D_{102}$ is connected to the output terminal of the amplifier IC121, and an anode of the diode $D_{102}$ is connected to the inverted input terminal of the amplifier IC121 via a resistor $R_{122}$. An inverted input terminal of an amplifier IC122 is connected to a connection point of the anode of the diode $D_{102}$ and the resistor $R_{122}$ via a resistor $R_{123}$. Further, a resistor $R_{124}$ is connected between the inverted input terminal of the amplifier IC122 and an end on the integral signal $\int V_{MN} dt$ input side of the resistor $R_{121}$, while a non-inverted input terminal of the amplifier IC122 is connected to the ground GND. An inverted input terminal of a comparator IC123 is connected to the output terminal of the amplifier IC122 via a resistor $R_{126}$, and connected to the ground GND via a capacitor $C_{101}$. Meanwhile, a non-inverted input terminal of the comparator IC123 is connected to a power supply via a resistor $R_{127}$, and connected to the ground GND via a resistor $R_{128}$. The resistor $R_{127}$ and the resistor $R_{128}$ define a reference value E3 for the comparator IC123.

The above-mentioned brushless DC motor system includes Hall elements 312a, 312b and 312c which detect the rotational position of the rotor 310 by a magnetic field exerted from the magnets of the rotor 310 of the motor 311, and a rotational-position sensor 313 which serves as rotational-position sensor means and operates to receive output signals from the Hall elements 312a, 312b and 312c and output a position signal representing the rotational position of the rotor 310. The rotational-position sensor 313 includes an amplifier IC112 for amplifying the output signal from the Hall element 312a; an amplifier IC113 for amplifying the output signal from the Hall element 312b; an amplifier IC114 for amplifying the output signal from the Hall element 312c; an OR-circuit OR1 to which both the output signals of the amplifiers IC112 and IC114 are input; an OR-circuit OR2 to which both the output signals of the amplifiers IC112 and IC113 are input; an OR-circuit OR3 to which both the output signals of the amplifiers IC113 and IC114 are input; and an AND-circuit AND1 which receives output signals of the OR-circuits OR1, OR2 and OR3 and outputs the position signal.

Figure 52:
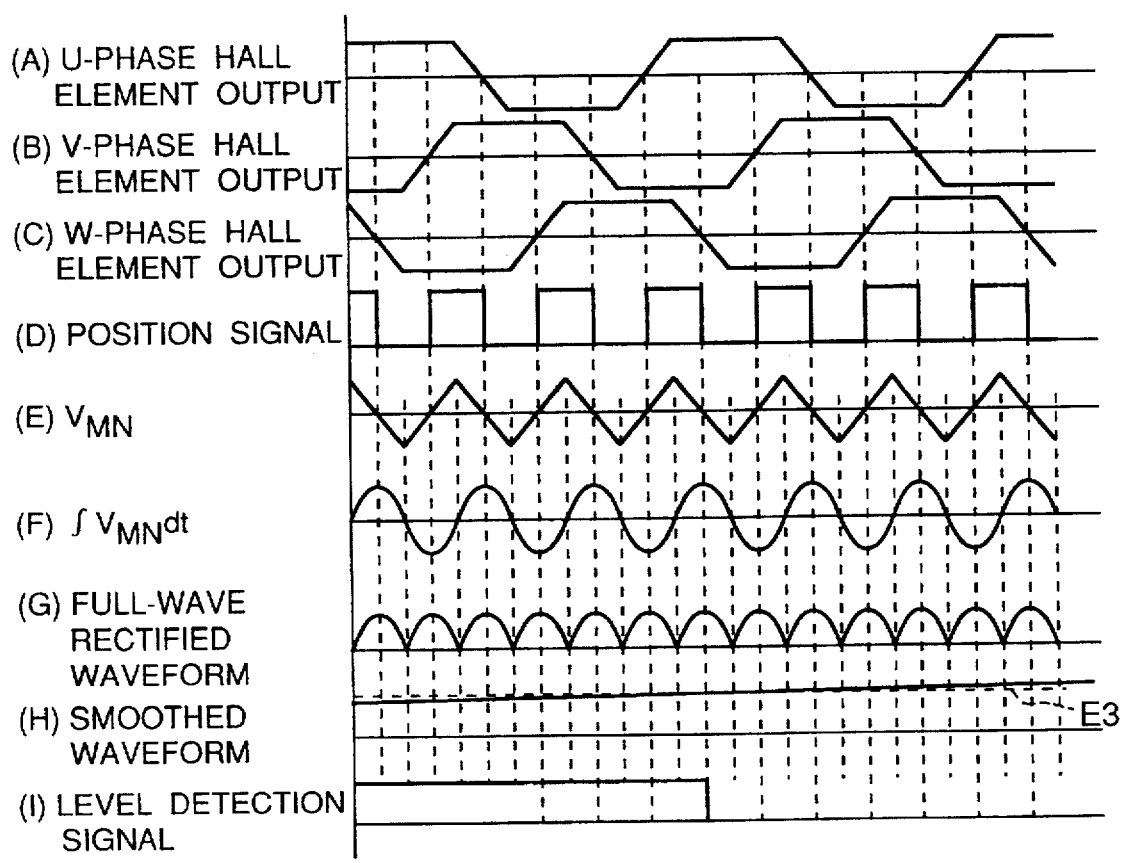
FIG. 52 is a diagram showing signals of individual components of the brushless DC motor system of the seventh embodiment.

In the above-mentioned construction, when the brushless DC motor is driven in accordance with the position sensing, outputs of the Hall elements 312a, 312b and 312c detecting the rotational position of the rotor 310 have trapezoidal waveforms having different phases at intervals of 120 degrees as shown in FIG. 52 (A) through (C). Then, the rotational-position sensor 313 outputs a position signal whose level changes every 60 degrees as shown in FIG. 52 (D). Further, the integral signal detector 303 detects by means of the amplifier IC111 the voltage difference signal $V_{MN}$ (shown in FIG. 52 (E)) representing the voltage difference between the voltage $V_M$ at the neutral point of the resistor circuit 302 inputted to the no-inverted input terminal and the voltage $V_N$ at the neutral point of the armature coils 301a, 301b and 301c inputted to the inverted input terminal of the amplifier IC111, integrates the voltage difference signal $V_{MN}$ by means of the integrator 332, and outputs the integral signal $\int V_{MN} dt$ (shown in FIG. 52 (F)). The integral signal $\int V_{MN} dt$ has an approximately sine waveform having a frequency three times as high as the rotation frequency. Then, upon receiving the integral signal $\int V_{MN} dt$ from the integrator 332, the level detector 306 subjects the integral signal $\int V_{MN} dt$ to full-wave rectification (shown in FIG. 52 (G)) by means of a full-wave rectifier comprised of the diodes $D_{101}$ and $D_{102}$, the resistors $R_{121}$ through $R_{126}$, and amplifiers. IC121 and IC122. Then the full-wave rectified signal is smoothed by a smoothing circuit comprised of the resistor $R_{126}$ and the capacitor $C_{101}$. Thereafter, the smoothed signal (shown in FIG. 52 (H)) is compared with the reference value E3 in the comparator IC123, and a level detection signal (shown in FIG. 52 (I)) is output. That is, the level detection signal is made to have H-level when the level of the smoothed signal is not greater than the reference value E3, and the level detection signal is made to have L-level when the level of the smoothed signal exceeds the reference value E3.

Figure 51:
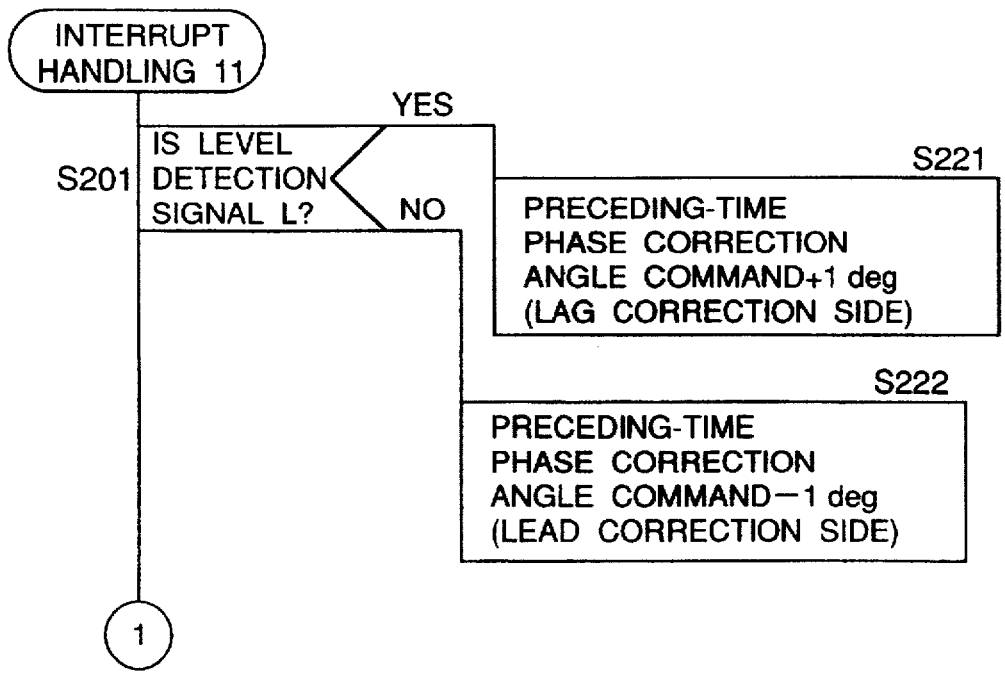
FIG. 51 is a flow chart showing interrupt handling 11 of the microcomputer shown in FIG. 49.

FIG. 51 shows an interrupt handling process 11 of the microcomputer 304 which executes the same operation as that of the flow charts of FIGS. 30, 31 and 32 except for the flow chart of FIG. 51. It is to be noted that the interrupt handling process 11 is executed at every rise time and fall time of the position signal inputted to the external interrupt terminal of the microcomputer 304.

First, it is decided whether or not the level detection signal is at L-level at step S201. When it is decided that the level detection signal is at L-level, the program flow proceeds to step S221, at which the preceding phase correction angle command is incremented by one degree (to the lag correction side), and the program flow proceeds to step S104 shown in FIG. 30. When the level detection signal is not at L-level at step S201, the program flow proceeds to step S222, at which the preceding phase correction angle command is decremented by one degree (to the lead correction side), and the program flow proceeds to step S104 shown in FIG. 30.

Then, the motor can be operated at the peak efficiency regardless of the magnitude of the load and the pitch of the running frequency similarly to the fourth embodiment. Furthermore, by gradually adjusting the phase of the voltage pattern from the lead correction side to the lag correction side so as to achieve the peak motor efficiency point, the phase of the voltage pattern is prevented from being adjusted to a step-out region existing on the lag correction side of the peak efficiency point. Therefore the step out is prevented.

(Eighth Embodiment)

Figure 53:
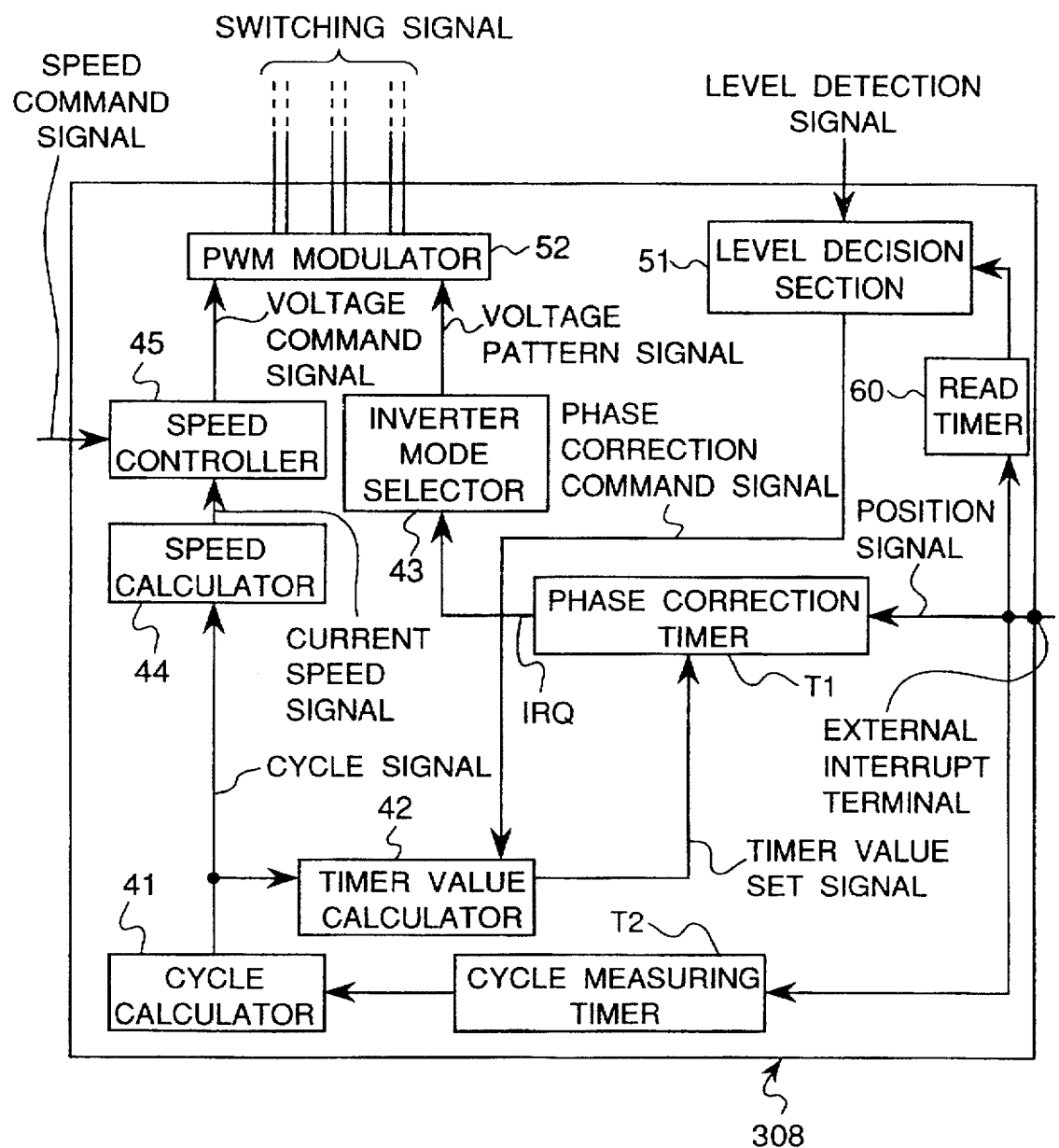
FIG. 53 is a block diagram of the microcomputer of the brushless DC motor system according to an eighth embodiment of the present invention.

FIG. 53 shows a block diagram of a microcomputer of a brushless DC motor system of an eighth embodiment of the present invention. The present brushless DC motor system has the same construction as that of the brushless DC motor system of the seventh embodiment shown in FIG. 48 except for a microcomputer 308 and a level detector 307 (see FIG. 54), and there is provided no description therefor. Refer to FIG. 48 for the same components. The microcomputer 308 has the same construction as that of the microcomputer 304 of the seventh embodiment shown in FIG. 49 except for a read timer 60, and the same components are denoted by the same reference numerals, and no description is provided therefor.

Figure 54:
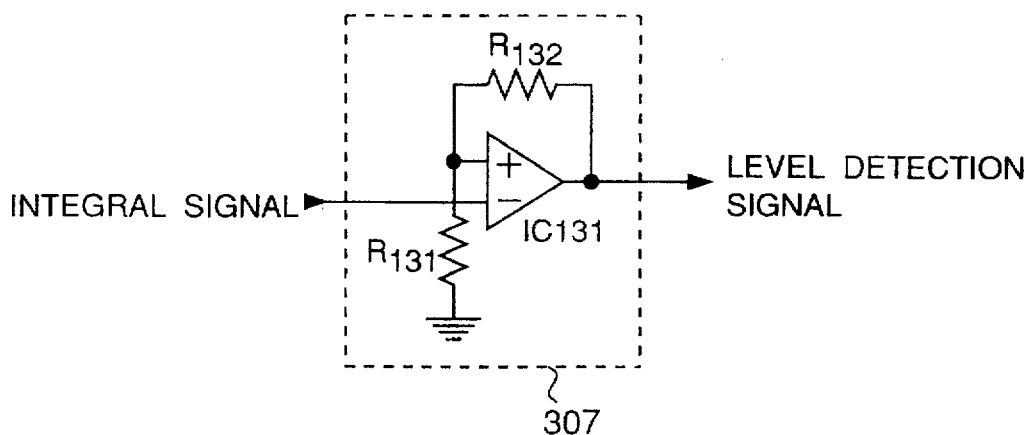
FIG. 54 is a circuit diagram of the level detector of the brushless DC motor system of the eighth embodiment.

As shown in FIG. 54, the level detector 307 includes an amplifier IC131 where the integral signal $\int V_{MN} dt$ from the integrator 332 is inputted to an inverted input terminal thereof, a non-inverted input terminal thereof is connected to the ground GND via a resistor $R_{131}$, and an output terminal and the non-inverted input terminal thereof are connected to each other via a resistor $R_{132}$. The amplifier IC131 and the resistors $R_{131}$ and $R_{132}$ constitute a hysteresis comparator having a hysteresis characteristic.

Figure 55:
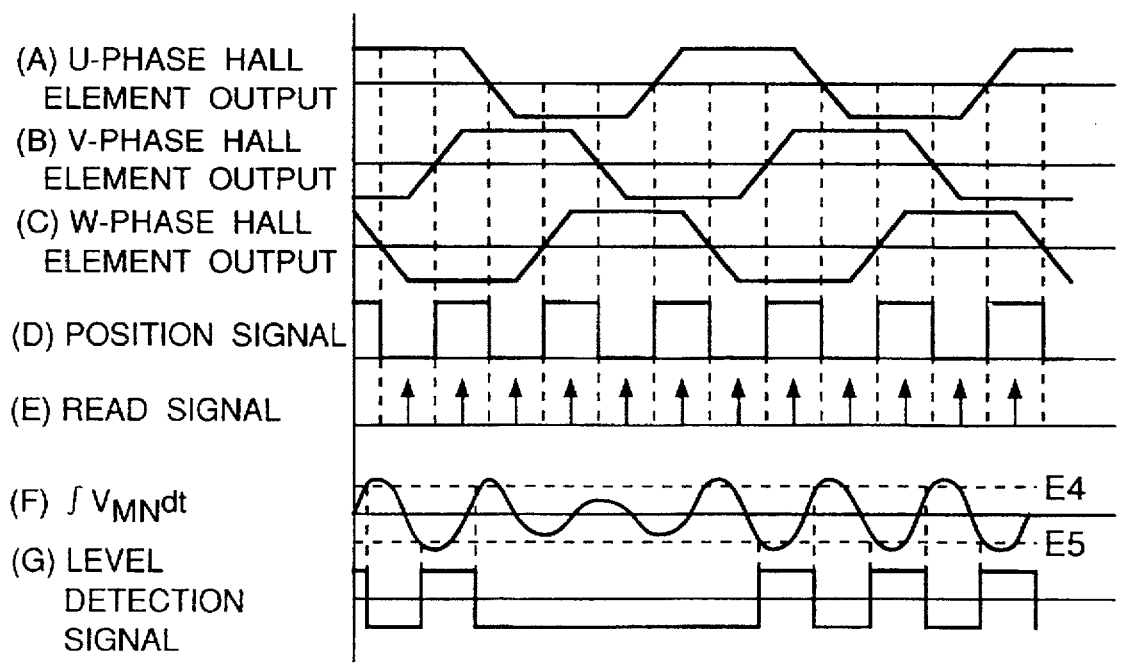
FIG. 55 is a diagram showing signals of individual components of the brushless DC motor system of the eighth embodiment.

In the above-mentioned construction, when the brushless DC motor is driven in accordance with the position sensing, outputs of the Hall elements 312a, 312b and 312c detecting the rotational position of the rotor 310 have trapezoidal waveforms having different phases at intervals of 120 degrees as shown in FIG. 55 (A) through (C). Then, the rotational-position sensor 313 shown in FIG. 48 outputs a position signal whose level changes every 60 degrees as shown in FIG. 55 (D). Upon receiving the integral signal $\int V_{MN} dt$ from the integrator 332, an output terminal of the amplifier IC131 of the level detector 307 comes to have L-level when the integral signal $\int V_{MN} dt$ (shown in FIG. 55 (F)) exceeds a reference value E4, and the output terminal of the amplifier IC131 comes to have H-level when the integral signal $\int V_{MN} dt$ becomes smaller than a reference value E5. That is, the level detection signal (shown in FIG. 55 (G)) of the level detector 307 becomes a signal which has a phase different from that of the position signal (shown in FIG. 55 (D)) and a cycle identical to the position signal. However, when the level of the integral signal $\int V_{MN}dt$ from the integrator 332 becomes low, there is a possibility that the integral signal $\int V_{MN}dt$ does not exceed the reference value E4 or the possibility that the integral signal $\int V_{MN}dt$ does not become smaller than the reference value E5. Consequently, the level detection signal comes to have a frequency smaller than that of the position signal, and a duty ratio different from that of the position signal. In other words, decision as to whether or not the integral signal $\int V_{MN}dt$ has a level not smaller than a specified level can be done through the discrimination whether or not the level detection signal is continuous in a specified cycle.

An operation of the microcomputer 308 will be described according to flow charts of FIGS. 56, 57, 58 and 59. It is to be noted that an interrupt handling process 21 is executed at every rise time and fall time of the position signal inputted to the external interrupt terminal of the microcomputer 308.

Figure 56:
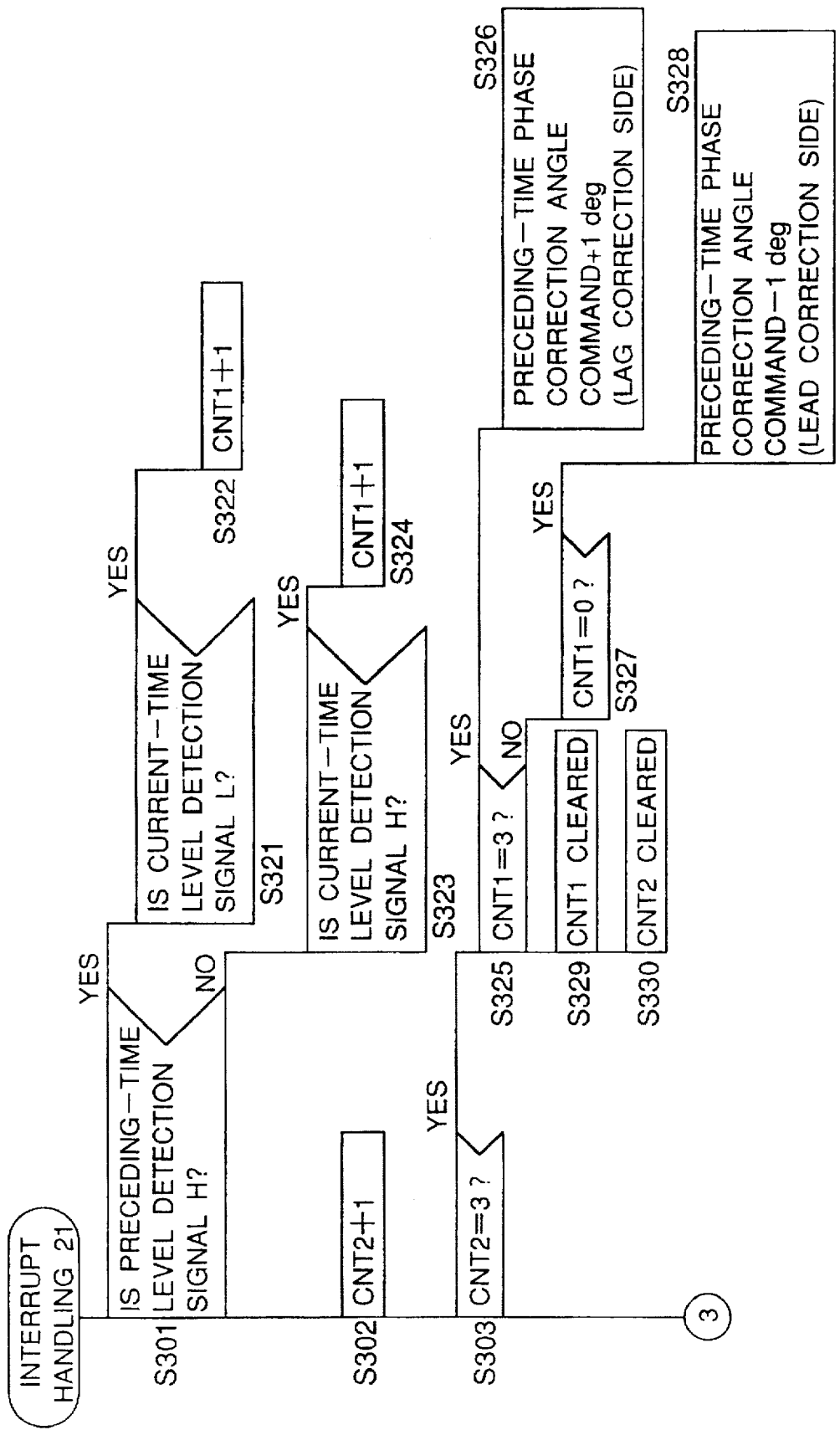
FIGS. 56, 57, and 58 are flow charts showing interrupt handling 21 of the microcomputer of FIG. 53.

Referring first to FIG. 56, when the interrupt handling process 21 starts, it is decided whether or not a preceding-time level detection signal is at H-level at step S301. When it is decided that the preceding-time level detection signal is at H-level, the program flow proceeds to step S321 to decide whether or not a current-time level detection signal is at L-level. When it is decided that the current-time level detection signal is at L-level at step S321, the program flow proceeds to step S322 to increment a counter CNT1 by one. When it is decided that the current-time level detection signal is not at L-level, the program flow proceeds to step S302.

On the other hand, when it is decided that the preceding-time level detection signal is not at H-level at step S301, the program flow proceeds to step S323, at which it is decided whether or not the current-time level detection signal is at H-level. When it is decided that the current-time level detection signal is at H-level at step S323, the program flow proceeds to step S324 to increment the counter CNT1 by one. When it is decided that the current-time level detection signal is not at H-level, the program flow proceeds to step S302.

Then, a counter CNT2 is incremented by one at step S302, and the program flow proceeds to step S303. Then, it is decided whether or not the counter CNT2 indicates 3 at step S303. When it is decided that the counter CNT2 indicates 3, the program flow proceeds to step S325. When it is decided that the counter CNT2 does not indicate 3, the program flow proceeds to step S304 shown in FIG. 57. Then, it is decided whether or not the counter CNT1 indicates 3 at step S325. When it is decided that the counter CNT1 indicates 3, the program flow proceeds to step S326 to increment by one degree the preceding-time phase correction angle command (to the lag correction side), and the program flow proceeds to step S329. When it is decided that the counter CNT1 is not 3, the program flow proceeds to step S327 to decide whether or not the counter CNT1 indicates 0. When it is decided that the counter CNT1 indicates 0 at step S327, the program flow proceeds to step S328 to decrement by one degree the preceding-time phase correction angle command (to the lead correction side), and the program flow proceeds to step S329. On the other hand, when it is decided that the counter CNT1 is not 0 at step S327, the program flow proceeds to step S329. Then, the counter CNT1 is cleared at step S329, and the program flow proceeds to step S330 to clear the counter CNT2, and proceeds to step S304. It is to be noted that before the initial interrupt handling process 21 starts, an initial value is set to the phase correction angle command and the counters CNT1 and CNT2 are cleared.

Figure 57:
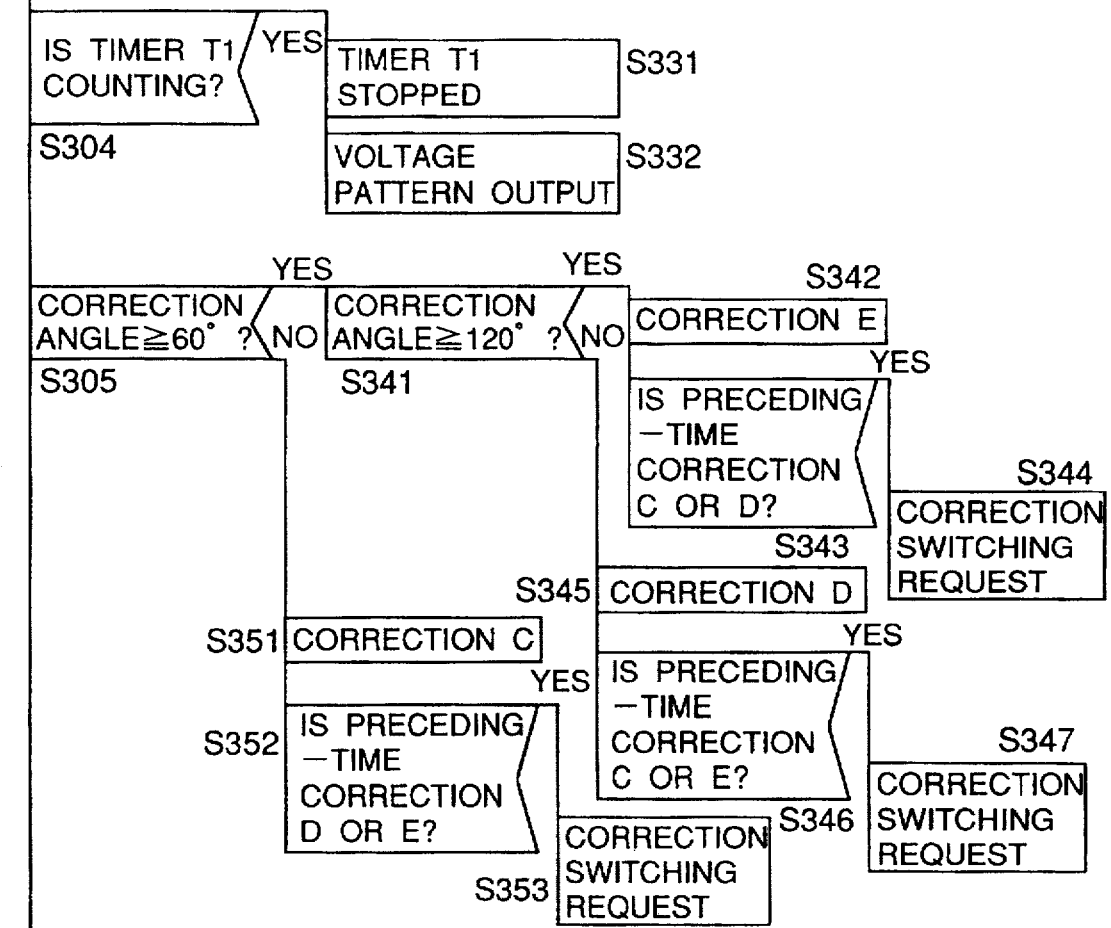

Then, at step S304 shown in FIG. 57, it is decided whether or not the phase correction timer T1 (referred to as a timer T1 in FIG. 57) is counting. When it is decided that the timer T1 is counting, the program flow proceeds to step S331 to stop the timer T1. That is, when the timer T1 is counting, the timer T1 is stopped to get ready for the next start. Then, a voltage pattern is outputted at step S332, and the program flow proceeds to step S305. When it is decided that the timer T1 is not counting at step S304, the program flow proceeds to step S305.

Then, it is decided whether or not a correction angle (phase correction angle based on the phase correction command signal from the level decision section 51) is not smaller than 60 degrees. When the correction angle is not smaller than 60 degrees, the program flow proceeds to step S341 to decide whether or not the correction angle is not smaller than 120 degrees. When the correction angle is not smaller than 120 degrees at step S341, the program flow proceeds to step S342 to establish a phase correction E (referred to as a "correction E" in FIG. 57), and proceeds to step S343. Then, it is decided whether or not the preceding phase correction is a phase correction C (referred to as a "correction C" in FIG. 57) or a phase correction D (referred to as a "correction D" in FIG. 57) at step S343. When it is decided that the preceding phase correction is the phase correction C or the phase correction D, the program flow proceeds to step S344 to issue a correction switching request, and thereafter proceeds to step S306. When it is decided that the preceding phase correction is neither the phase correction C nor the phase correction D at step S343, the program flow proceeds to step S306.

When the correction angle is smaller than 120 degrees at step S341, the program flow proceeds to step S345 to establish the phase correction D, and proceeds to step S346. Then, it is decided whether or not the preceding phase correction is the phase correction C or the phase correction E at step S346. When it is decided that the preceding phase correction is the phase correction C or the phase correction E, the program flow proceeds to step S347 to issue a correction switching request, and thereafter proceeds to step S306. When it is decided that the preceding phase correction is neither the phase correction C nor the phase correction E at step S346, the program flow proceeds to step S306. When it is decided that the correction angle is smaller than 60 degrees at step S305, the program flow proceeds to step S351 to establish the phase correction C, and proceeds to step S352. Then, it is decided whether or not the preceding phase correction is the phase correction D or the phase correction E at step S352. When it is decided that the preceding phase correction is the phase correction D or the phase correction E, the program flow proceeds to step S353 to issue a correction switching request, and thereafter proceeds to step S306. Otherwise, when it is decided that the preceding phase correction is neither the phase correction D nor the phase correction E at step S352, the program flow proceeds to step S306.

Then, at step S306, a timer value TISOU is calculated every time of phase corrections C, D and E. That is, in the phase correction C, a timer value corresponding to the phase correction angle is set as the timer value TISOU. In the phase correction D, a timer value corresponding to a phase angle obtained by subtracting 60 degrees from the phase correction angle is set as the timer value TISOU. In the phase correction E, a timer value corresponding to a phase angle obtained by subtracting 120 degrees from the phase correction angle is set as the timer value TISOU. Then, the program flow proceeds to step S307 to increment the inverter mode by one step.

Figure 58:
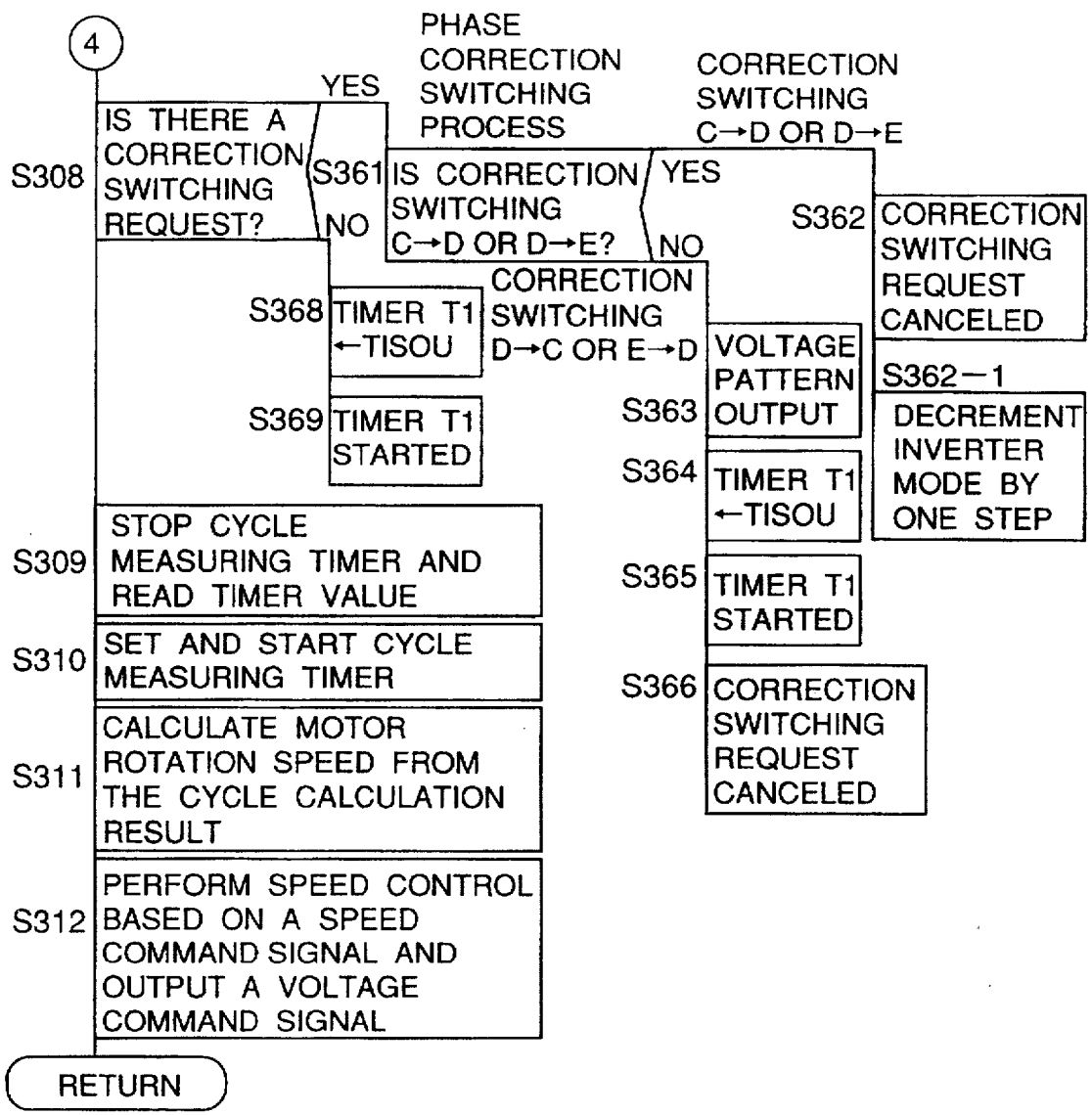

Then, the program flow proceeds to step S308 shown in FIG. 58, at which it is decided whether or not the correction switching request has been issued. When there is the correction switching request, the program flow proceeds to step S361 to decide whether the correction mode is switched from the phase correction C (referred to as a "correction C" in FIG. 58) to the phase correction D (referred to as a "correction D" in FIG. 58) or from the phase correction D to the phase correction E (referred to as a "correction E" in FIG. 58). When it is decided that the correction mode is switched from the phase correction C to the phase correction D or from the phase correction D to the phase correction E, the program flow proceeds to step S362 to cancel the correction switching request, the inverter mode is put back by one step at step S362-1, and the program flow proceeds to step S309.

On the other hand, when the correction mode is switched neither from the phase correction C to the phase correction D nor from the phase correction D to the phase correction E, i.e., switched from the phase correction D to the phase correction C or from the phase correction E to the phase correction D, the program flow proceeds to step S363 to output a voltage pattern. Then, the program flow proceeds to step S364 to set the timer value TISOU calculated at step S306 to the timer T1, and thereafter the timer T1 is started at step S365. Then, the program flow proceeds to step S366 to cancel the correction switching request, and proceeds to step S309.

When it is decided that there is no correction switching request at step S308, the program flow proceeds to step S368 to set the timer value TISOU calculated at step S306 to the timer T1, the timer T1 is started at step S369, and the program flow proceeds to step S309.

Then, the cycle measuring timer T2 is stopped and a timer value in the cycle measuring timer T2 is read at step S309, and the program flow proceeds to step S310. Then, the cycle measuring timer T2 is set and started at step S310 to start the next cycle measurement. Then, a cycle calculation is executed from the value of the cycle measuring timer T2 in the cycle calculator 41 at step S311, and from the calculation result, the rotation speed of the motor is calculated in the speed calculator 44. Then, the speed controller 45 executes speed control based on an external speed command signal to output a voltage command signal at step S112.

Figure 59A:
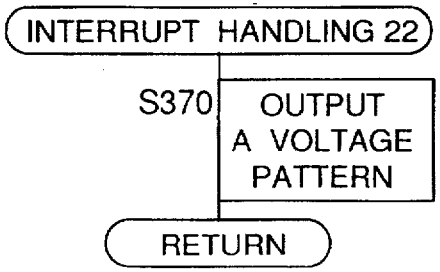
FIGS. 59A and 59B are flow charts showing interrupt handling 22 and interrupt handling 23 of the microcomputer of FIG. 53, respectively.

Then, in a manner as shown in FIG. 59A, when the counting operation of the timer T1 is completed and an interrupt signal IRQ is outputted from the timer T1, an interrupt handling process 22 starts, and a voltage pattern is outputted at step S370 to complete the interrupt handling process 22.

Figure 59B:
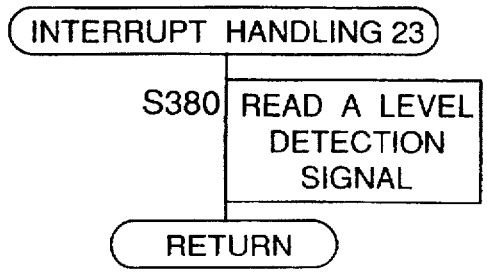

It is to be noted that for confirmation of the current-time level detection signal executed at steps S321 and S323, the signal is read through the aid of the read timer 60 shown in FIG. 53. That is, the read timer 60 is started at a rise time and a fall time of the position signal from the rotational-position sensor 113. When completing counting for a specified time, the read timer 60 outputs a read signal (shown in FIG. 55 (E)) to the level decision section 51. When the level decision section 51 receives the read signal, an interrupt handling process 23 as shown in FIG. 59B starts. The level detection signal is read (it is decided whether the level of the level detection signal is at L-level or H-level by the level decision section 51) at step S380 of the interrupt handling process 23, and thereafter the interrupt handling process 23 ends.

Thus, the motor can be operated at the peak efficiency regardless of the magnitude of the load and the pitch of the running frequency. Furthermore, by gradually adjusting the phase of the voltage pattern from the lead correction side to the lag correction side so as to achieve the peak motor efficiency point, the phase of the voltage pattern is prevented from being adjusted to a step-out region existing on the lag correction side of the peak efficiency point. Therefore the step out can be prevented.

(Ninth Embodiment)

Figure 60:
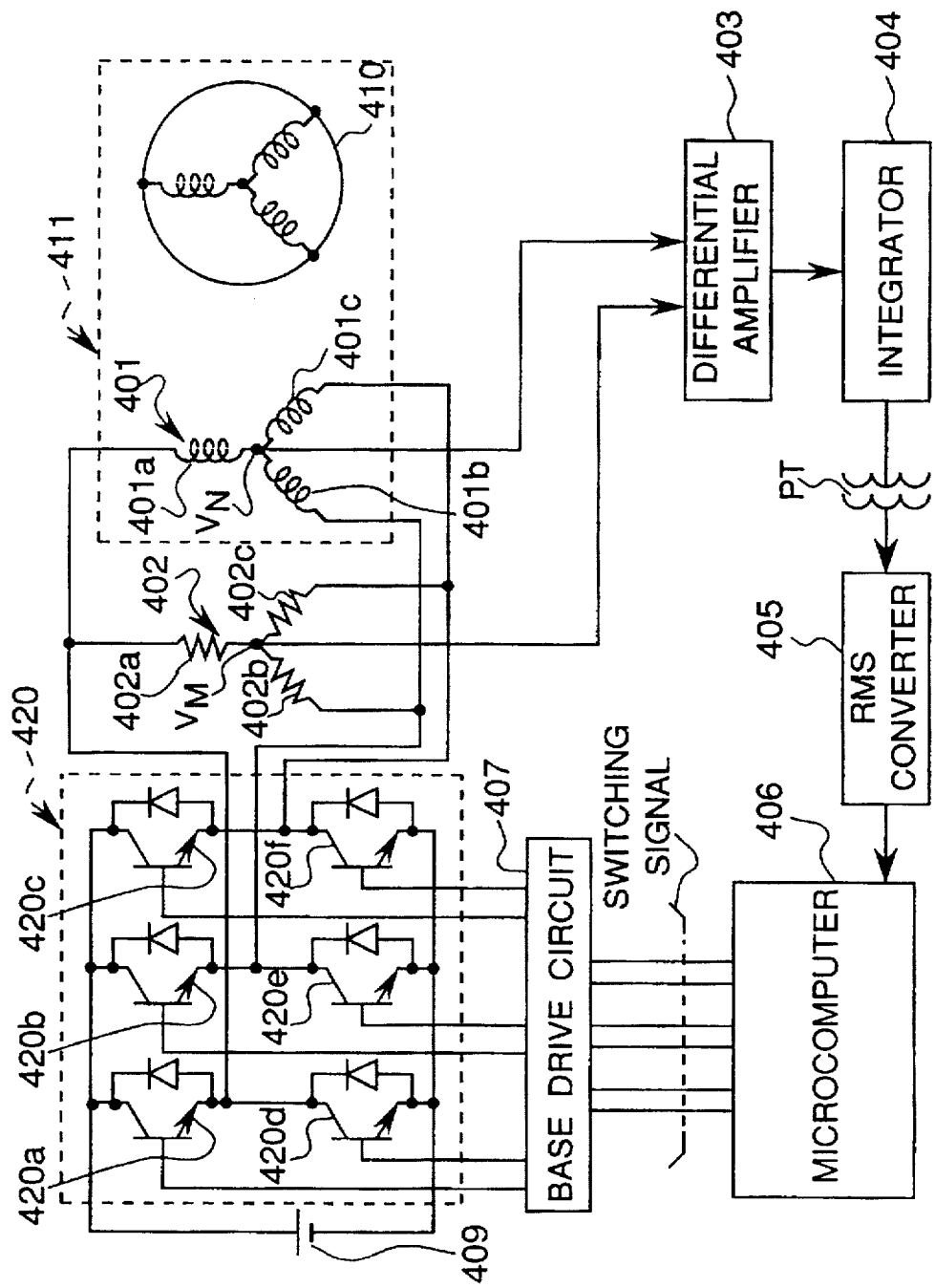
FIG. 60 is an arrangement diagram of the AC motor system according to a ninth embodiment of the present invention.

FIG. 60 shows a construction of an AC (Alternating Current) motor system of a ninth embodiment of the present invention. Reference numeral 401 denotes a stator which has star-connected armature coils 401a, 401b and 401c and rotates a rotor 410 by a rotating magnetic field. Reference numeral 402 denotes a resistor circuit which is comprised of star-connected resistors 402a, 402b and 402c and is connected in parallel with the armature coils 401a, 401b and 401c. Reference numeral 403 denotes a differential amplifier which detects the voltage difference signal representing the voltage difference between a voltage $V_M$ at a neutral point of the resistor circuit 402 and a voltage $V_N$ at a neutral point of the armature coils 401a, 401b and 401c. Reference numeral 404 denotes an integrator which receives the voltage difference signal from the differential amplifier 403 and integrates the voltage difference signal. Reference numeral 405 denotes an RMS (Root Mean Square) converter which receives the integral signal from the integrator 404 via a transformer PT and obtains an RMS value of the integral signal from which DC components are removed. Reference numeral 406 denotes a microcomputer which receives a signal representing the RMS value of the integral signal from the RMS converter 405 and outputs a switching signal. Reference numeral 407 denotes a base drive circuit which receives the switching signal from the microcomputer 406 and outputs a commutation control signal. The commutation control signal from the base drive circuit 407 is inputted to an inverter section 420. The stator 401 and the rotor 410 constitute an AC motor 411.

Figure 61:
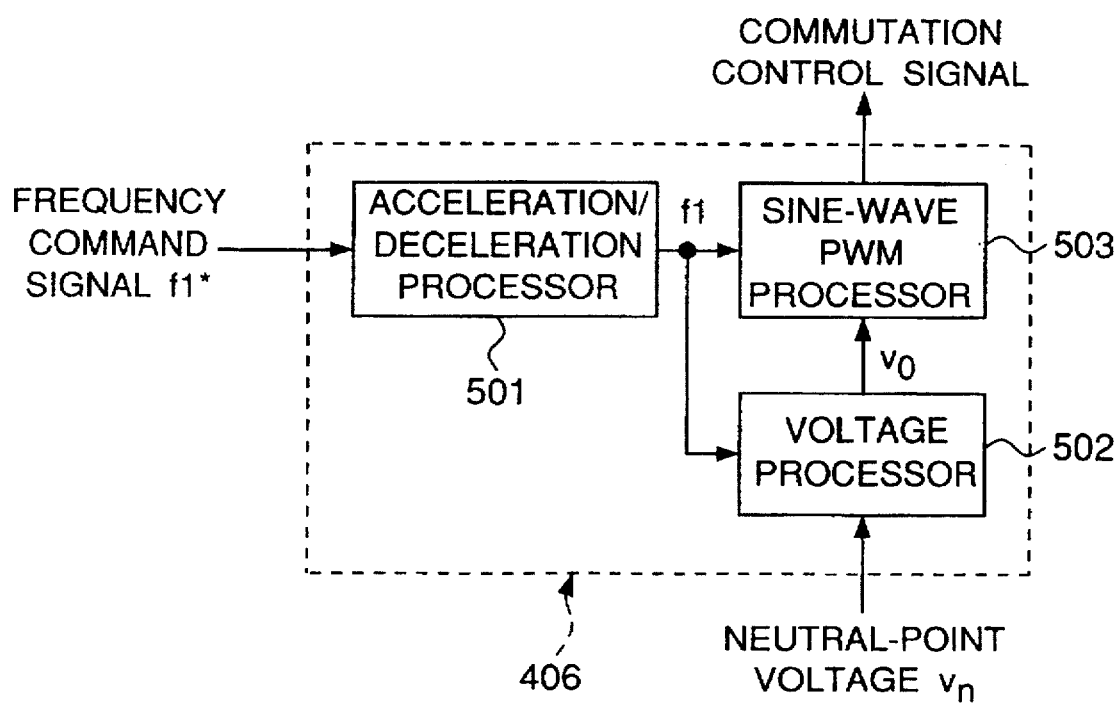
FIG. 61 is an outlined block diagram of the microcomputer of the above AC motor system.

FIG. 61 is a schematic block diagram of the microcomputer 406. The microcomputer 406 includes an acceleration/deceleration processor 501 which receives a frequency command signal f1* and outputs a signal f1 representing an inverter output frequency; a voltage processor 502 which receives the signal f1 representing the inverter output frequency from the acceleration/deceleration processor 501 and a neutral-point voltage vn, and outputs a signal vo representing an inverter output voltage; and a sine-wave PWM processor 503 which receives the output frequency signal f1 obtained by the acceleration/deceleration processor 501 and the signal vo representing the inverter output voltage from the voltage processor 502, and outputs a commutation control signal.

Figure 62:
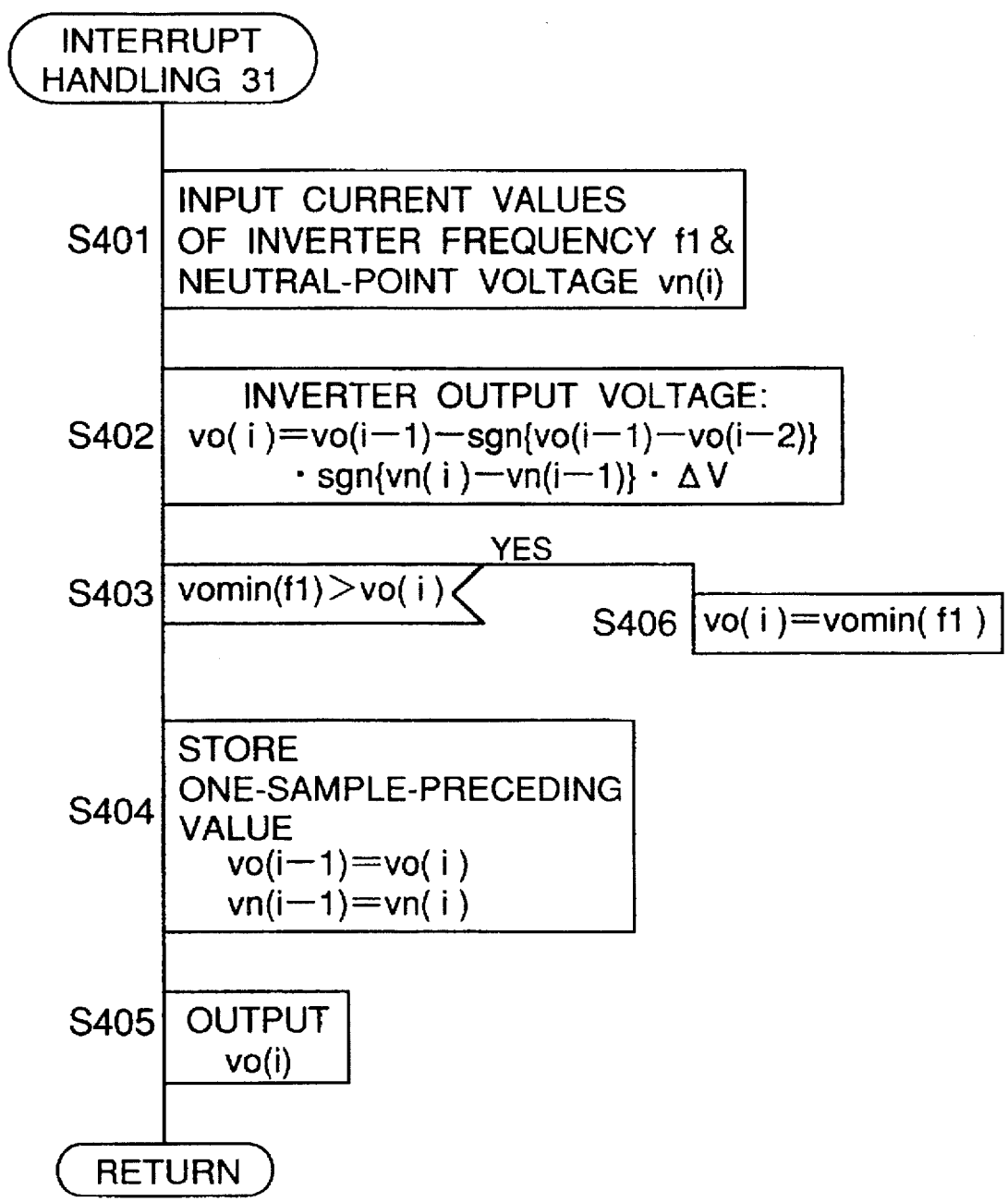
FIG. 62 is a flow chart showing interrupt handling 31 for controlling the voltage of the microcomputer of FIG. 61.

FIG. 62 shows a flow chart of a processing operation of the microcomputer 406. An interrupt handling process 31 of the microcomputer 406 will be described below with reference to FIG. 62. It is to be noted that the interrupt handling process 31 is processed by an interrupt signal generated every 0.1 to 1 second from a timer (not shown).

First, when the interrupt handling process 31 starts, a current-time value f1 of the inverter frequency and a current-time value vn(i) of the neutral-point voltage, i.e., the effective value of an integral signal obtained by the RMS converter 405 are respectively inputted at step S401. Then, the inverter output voltage vo(i) is calculated at step S402 according to the following equation.

$$vo(i)=vo(i-1)-sgn\{vo(i-1)-vo(i-2)\}\cdot sgn\{vn(i)-vn(i-1)\}\cdot \Delta V$$

where sgn(x)=+1 when x≧0, or sgn(x)=−1 when x<0.

Figure 63:
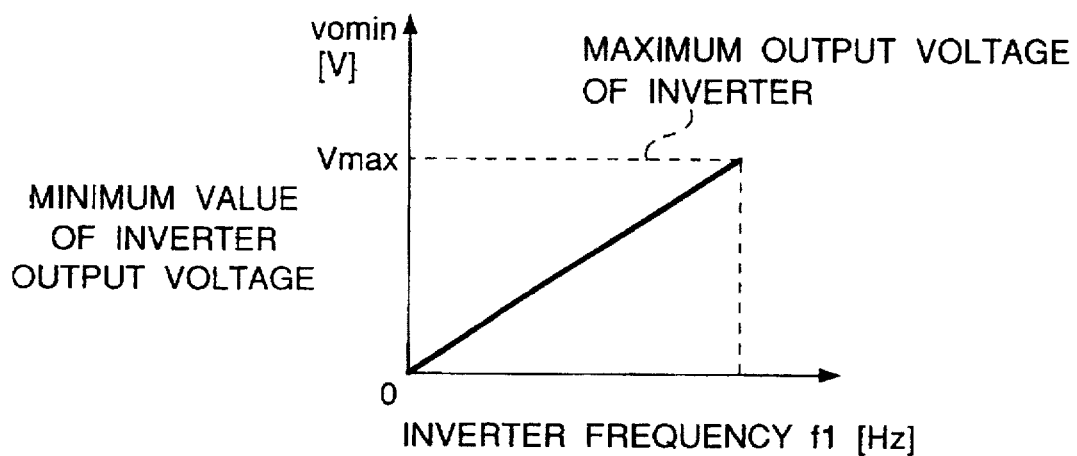
FIG. 63 is a chart showing inverter output voltage characteristic versus inverter frequency of the above AC motor system.

Then, it is decided whether or not a minimum value vomin(f1) of the inverter output voltage is greater than the inverter output voltage vo(i) at step S403. When it is decided that the minimum value vomin(f1) of the inverter output voltage is greater than the inverter output voltage vo(i), the program flow proceeds to step S406 to make the inverter output voltage vo(i) assume the minimum value vomin(f1), and thereafter the program flow proceeds to step S404. On the other hand, when it is decided that the minimum value vomin(f1) of the inverter output voltage is not greater than the inverter output voltage vo(i), the program flow proceeds to step S404. That is, as shown in FIG. 63, the minimum value vomin of the inverter output voltage is approximately proportional to the inverter frequency f1, and the inverter output voltage vo(i) obtained at step S402 is made to be not smaller than the minimum value vomin.

Then, a value of the preceding sample is stored at step S404. That is, the inverter output voltage vo(i) is substituted into the inverter output voltage vo(i−1), and the current-time value Vn(i) of the neutral-point voltage is substituted into the neutral-point voltage Vn(i−1).

Then, the inverter output voltage vo(i) is outputted at step S405, and the interrupt handling process 31 ends.

Figure 64:
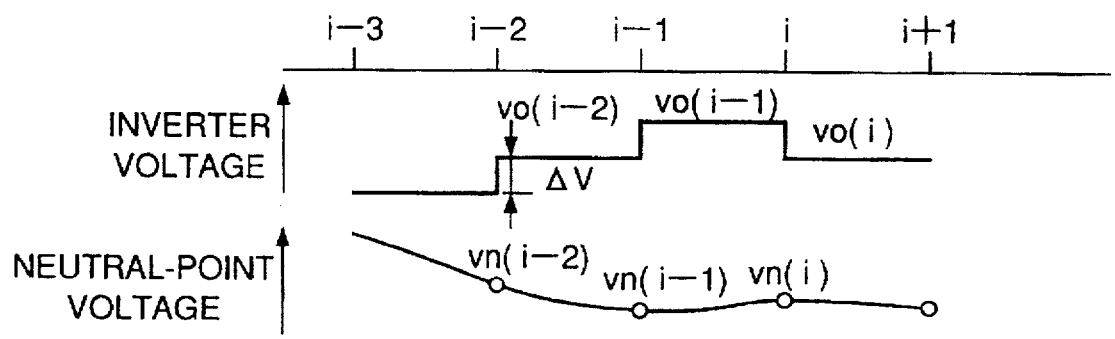
FIG. 64 is a chart showing status transitions of inverter voltage and neutral-point voltage in the process of voltage control of the above AC motor system.

Therefore, as shown in FIG. 64, when:

$$vo(i-1)-vo(i-2)>0$$

$$vo(i)-vn(i-1)<0,$$

the inverter output voltage vo(i) is:

$$vo(i)=vo(i-1)+\Delta V$$

On the other hand, when:

$$vo(i-1)-vo(i-2)<0$$

$$vo(i)-vn(i-1)>0,$$

the inverter output voltage vo(i) is:

$$vo(i)=vo(i-1)-\Delta V$$

That is, the inverter output voltage vo is adjusted so that the neutral-point voltage Vn is minimized. In other words, the inverter output voltage vo is adjusted so that the minimum neutral-point voltage Vn, a target value, is obtained.

Figure 65:
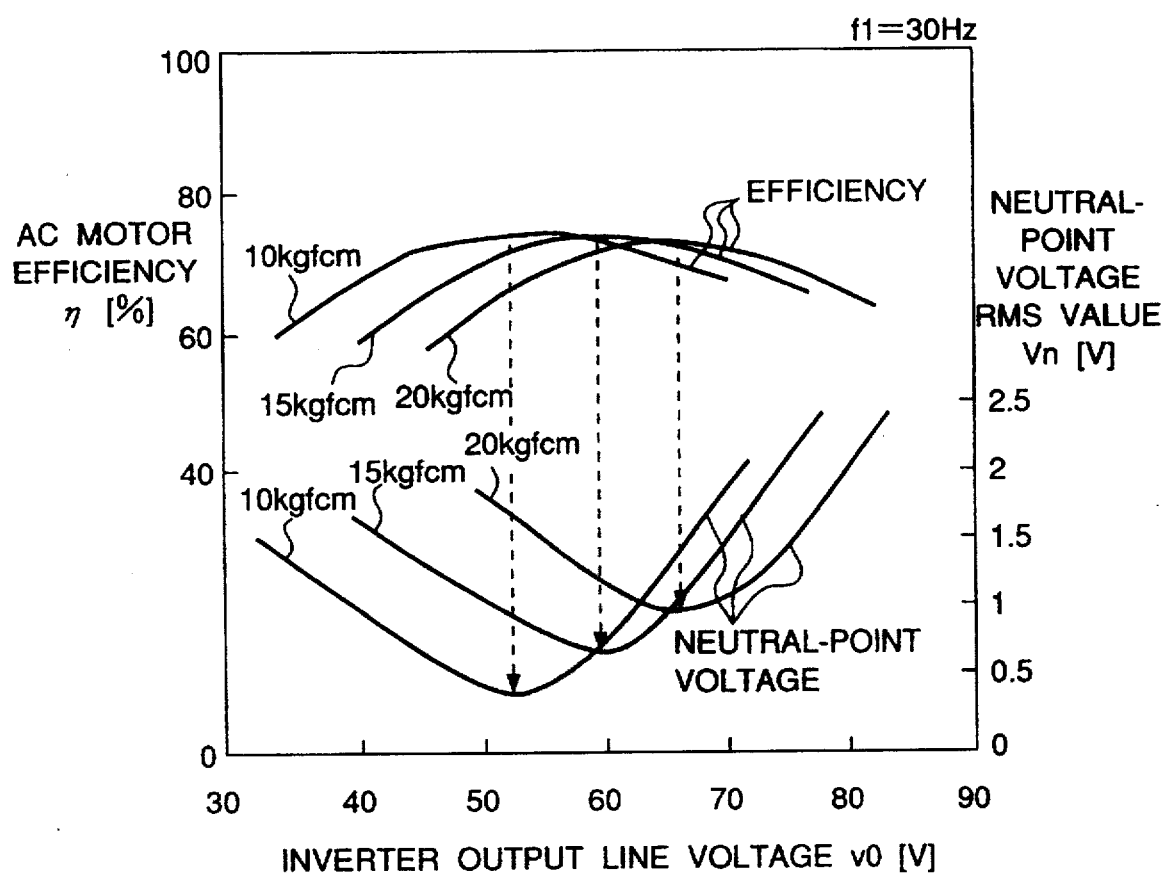
FIG. 65 is a chart showing the characteristics of AC motor efficiency and neutral-point voltage RMS value relative to the inverter output line voltage of the above AC motor system.

FIG. 65 shows a graph obtained through an experiment of characteristics of an efficiency η of the AC motor and the neutral-point voltage RMS value vn relative to the inverter output line voltage vo when the inverter frequency f1 is 30 Hz and the torque is set at 10 kgfcm, 15 kgfcm and 20 kgfcm. From the result of the experiment, it can be found that characteristic curves of the neutral-point voltage each have an approximately minimum value at a point corresponding to the peak point of the efficiency η of the AC motor. Therefore, by adjusting the inverter output voltage vo(i) based on the inverter frequency f1 and the current-time value vn(i) at the neutral point so that the neutral-point voltage vn is minimized every specified interrupt cycle, the AC motor is operated at the peak efficiency.

In the fourth through eighth embodiments, the rotation speed is controlled by adjusting the inverter output voltage, and the optimum efficiency control by which the motor is operated at the peak efficiency is achieved by adjusting the phase of the voltage pattern of the inverter output. However, it is acceptable to achieve the optimum efficiency control by adjusting the inverter output voltage and perform the control of the rotation speed by adjusting the phase of the voltage pattern of the inverter output.

Furthermore, a brushless DC motor is used in the fourth through eighth embodiments, and an AC motor is used in the ninth embodiment. However, the present invention is not limited to this, and the present invention can be of course applied to a reluctance motor or the like.

Furthermore, in the fourth through eighth embodiments, the peak-efficiency operation is performed by adjusting the phase correction angle so that the level of the integral signal becomes the target value at the peak efficiency point. However, the above-mentioned operation can be performed so that the level of the voltage difference signal becomes the target value at the peak efficiency point. Also, the motor can be operated at an arbitrary efficiency by using the above-mentioned integral signal or the voltage difference signal and setting a target value at the arbitrary efficiency.

Furthermore, in the fourth through eighth embodiments, the phase correction timer T1, the cycle measuring timer T2, the cycle calculator 41 and the timer value calculator 42 are used as the phase correction means. However, the phase correction means is of course not limited to this.

Furthermore, in the fourth through ninth embodiments, the microcomputer 4 (14, 100, 200, 304, 308 and 406) is used. A logic circuit and so forth can be used instead of the microcomputer.

Furthermore, in the fourth through eighth embodiments, the voltage pattern switching system of the armature coils 1a, 1b and 1c (301a, 301b and 301c) is implemented by the 180° conduction system. However, the voltage pattern switching is not limited to the 180° system, and it may be a conduction system of 120° to 180°.

Furthermore, in the fourth, fifth and sixth embodiments, the rotational-position sensor 3 is used as the rotational-position sensor means. However, the rotational-position sensor means is not limited to this, and another circuit construction can be of course adopted.

Figure 66:
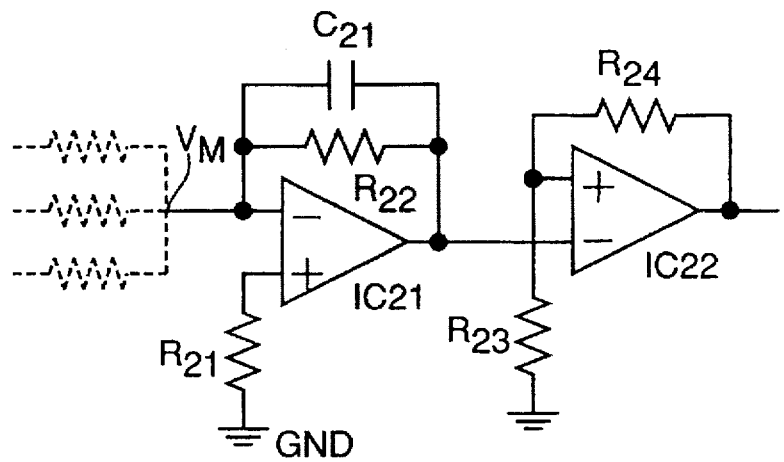
FIG. 66 is a circuit diagram of another rotational-position sensor.

That is, the rotational-position sensor means can be implemented by a circuit shown in FIG. 66, including an amplifier IC21 where the voltage $V_M$ at the neutral point of the resistor circuit 2 is inputted to an inverted input terminal thereof, a resistor $R_{21}$ is connected between a non-inverted input terminal thereof and the ground GND, and a resistor $R_{22}$ and a capacitor $C_{21}$ are connected in parallel with each other between an output terminal thereof and the inverted input terminal; and an amplifier IC22 where an inverted input terminal thereof is connected to the output terminal of the amplifier IC21, a resistor $R_{23}$ is connected between a non-inverted input terminal thereof and the ground GND, and a resistor $R_{24}$ is connected between an output terminal thereof and the non-inverted input terminal.

Figure 67:
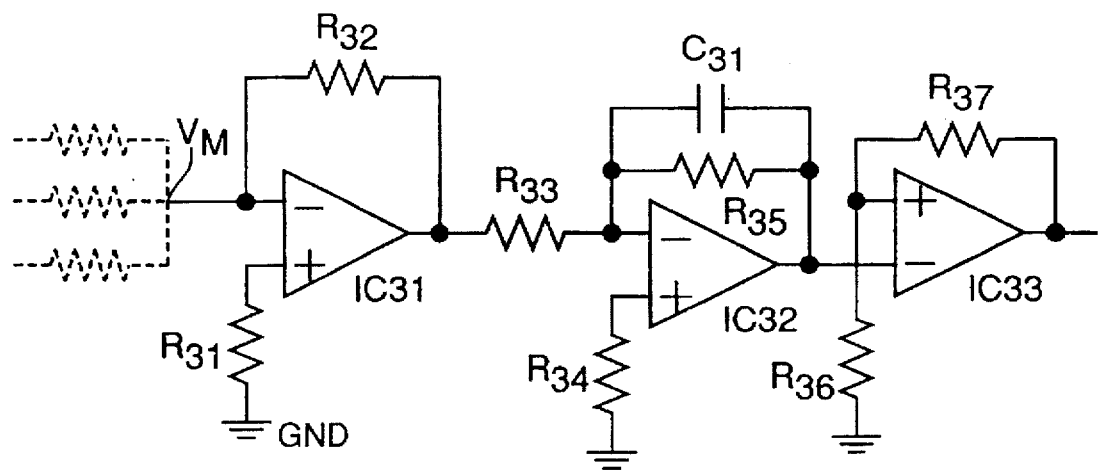
FIG. 67 is a circuit diagram of still another rotational-position sensor.

Also, the rotational-position sensor means can be achieved by a circuit as shown in FIG. 67 including an amplifier IC31 where the voltage $V_M$ at the neutral point of the resistor circuit 2 is inputted to an inverted input terminal thereof, a resistor $R_{31}$ is connected between a non-inverted input terminal thereof and the ground GND, and a resistor $R_{32}$ is connected between an output terminal thereof and the inverted input terminal; an amplifier IC32 where an inverted input terminal thereof is connected to the output terminal of the amplifier IC31 via a resistor $R_{33}$, a resistor $R_{34}$ is connected between a non-inverted input terminal thereof and the ground GND, and a resistor $R_{35}$ and a capacitor $C_{31}$ are connected in parallel with each other between an output terminal thereof and the inverted input terminal; and an amplifier IC33 where an inverted input terminal thereof is connected to the output terminal of the amplifier IC32, a resistor $R_{36}$ is connected between a non-inverted input terminal thereof and the ground GND, and a resistor $R_{37}$ is connected between an output terminal thereof and the non-inverted input terminal.

Figure 68:
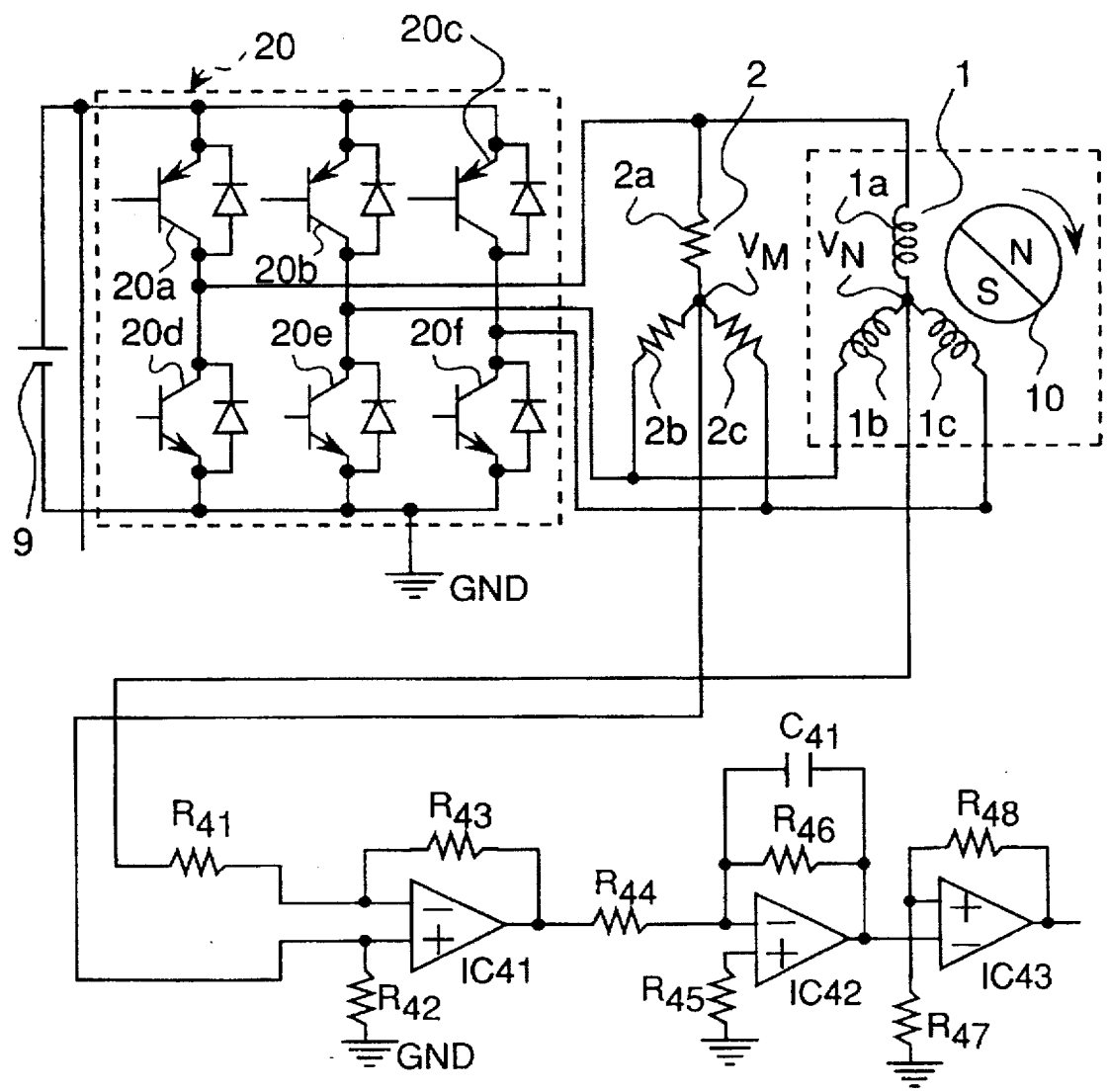
FIG. 68 is a circuit diagram of yet another rotational-position sensor.

Also, for a brushless DC motor system as shown in FIG. 68 including a stator 1 which has star-connected armature coils 1a, 1b and 1c and rotates a rotor 10 having a plurality of permanent magnets by a rotating magnetic field; a resistor circuit 2 having star-connected resistors 2a, 2b and 2c and being connected in parallel with the armature coils 1a, 1b and 1c; and an inverter section 20 having three transistors 20a, 20b and 20c connected to a positive side of a DC power supply 9 and three transistors 20d, 20e and 20f connected to a negative side of the DC power supply 9, the transistors 20d, 20e and 20f having their emitters connected to the ground GND, the rotational position sensor means can be constructed as a circuit which includes an amplifier IC41 where a voltage $V_N$ at the neutral point of the armature coils 1a, 1b and 1c is inputted to an inverted input terminal thereof via a resistor $R_{41}$, a voltage $V_M$ at the neutral point of the resistors 2a, 2b and 2c is inputted to a non-inverted input terminal thereof, a resistor $R_{42}$ is connected between the non-inverted input terminal and the ground GND, and a resistor $R_{43}$ is connected between an output terminal thereof and the inverted input terminal; an amplifier IC42 where an inverted input terminal thereof is connected to the output terminal of the amplifier IC41 via a resistor $R_{44}$, a resistor $R_{45}$ is connected between a non-inverted input terminal thereof and the ground GND, and a resistor $R_{46}$ and a capacitor $C_{41}$ are connected in parallel with each other between an output terminal thereof and the inverted input terminal; and an amplifier IC43 where an inverted input terminal thereof is connected to the output terminal of the amplifier IC42, a resistor $R_{47}$ is connected between a non-inverted input terminal thereof and the ground GND, and a resistor $R_{48}$ is connected between an output terminal thereof and the non-inverted input terminal.

Furthermore, in the sixth embodiment, the integral signal $\int V_{MN} dt$ is subjected to an analog to digital conversion process. However, it is also practicable to subject a voltage difference signal, a signal obtained by smoothing the voltage difference signal, or a signal obtained by smoothing the integral signal $\int V_{MN} dt$ to an analog to digital conversion process, and perform the level decision using the signal obtained through the analog to digital conversion process.

Furthermore, the number of times of counting of the level detection signal is five in the fourth embodiment, and three in the eighth embodiment. However, the number of times of counting can be an arbitrary number.

Furthermore, the integrator 22 of the rotational-position sensor 3 is used as an integration means in the fourth embodiment, however, the integration means can be constructed independently of the integrator of the rotational-position sensor.

Figure 69:
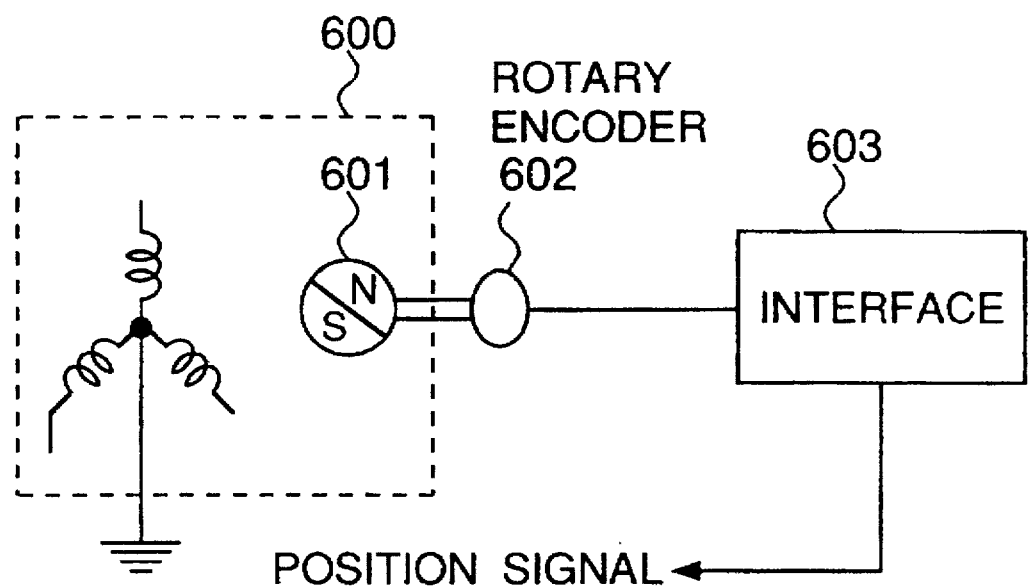
FIG. 69 is a diagram showing a rotational-position sensor using a rotary encoder.
Figure 70:
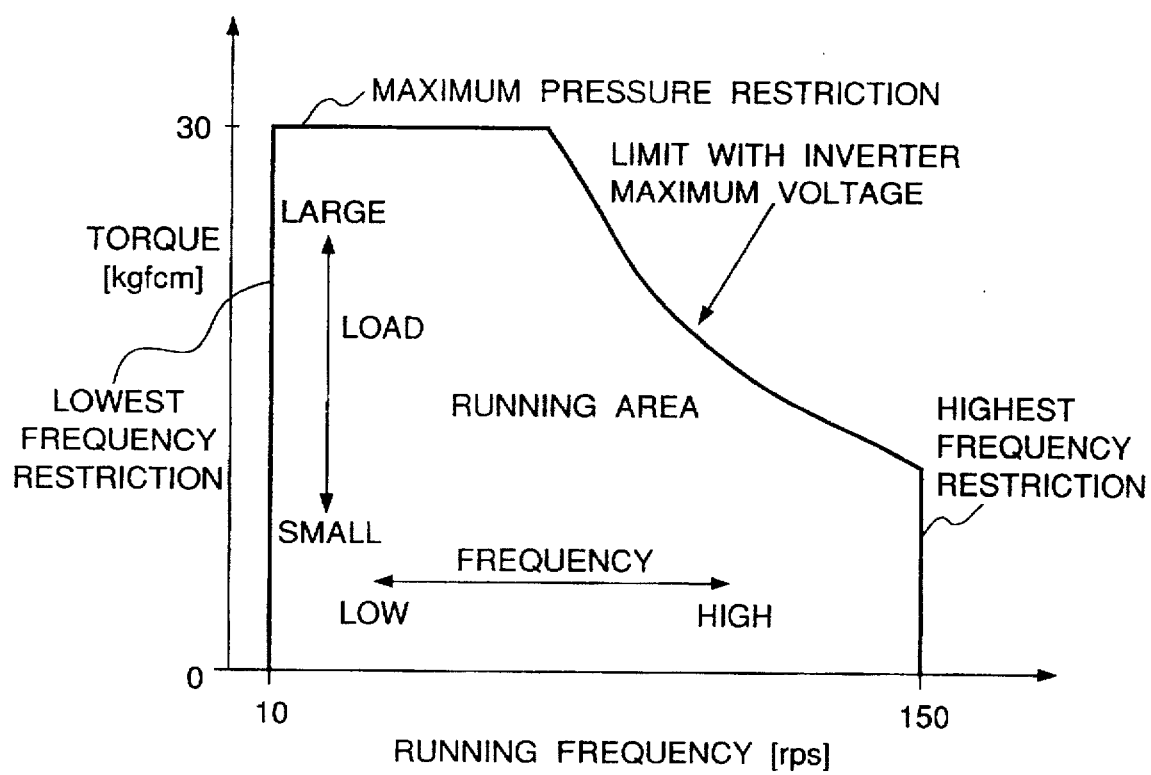
FIG. 70 is a chart showing the running area of a compressor in the relationship between running frequency and torque of the brushless DC motor.

Furthermore, the rotational position of the rotor 10 is detected by the rotational-position sensor 3 which serves as the rotational-position sensor means in the fourth through sixth embodiments, and the rotational position of the rotor 10 is detected by the Hall elements 312a, 312b and 312c and the rotational-position sensor 313 in the seventh and eighth embodiments, however, the rotational-position sensor means is not limited to these. For instance, there may be a construction as shown in FIG. 69 including a rotary encoder 602 linked to a shaft of a rotor 601 of a motor 600, and an interface 603 which receives a signal representing a rotational position from the rotary encoder 602 and outputs a position signal.

INDUSTRIAL APPLICABILITY

The brushless DC motors and other motors as well as their control methods according to the present invention are suited for use in household electrical appliances such as inverter air conditioners and other air conditioners, electric washers, and vacuum cleaners.

We claim:

1. A method for controlling a brushless DC motor comprising the steps of:

detecting a rotation speed and a rotor position of a brushless DC motor driven by a voltage-fed inverter;

detecting an input current of the voltage-fed inverter; and setting a switching command to the voltage-fed inverter such that the phase of the inverter output voltage relative to the phase of the motor counter-electromotive voltage is set to a specified phase at which motor efficiency comes generally to a peak, in response to the detected rotation speed and the detected input current.

2. The method for controlling a brushless DC motor according to claim 1, wherein the phase at which motor efficiency comes generally to a peak leads, by a specified value, a phase at which the brushless DC motor is driven at peak efficiency.

3. A brushless DC motor system comprising:

a rotational-position sensor for detecting a rotation speed and a rotor position of a brushless DC motor driven by a voltage-fed inverter;

detection means for detecting an input current of the voltage-fed inverter; and inverter control means for setting a switching command to the voltage-fed inverter such that a phase of an inverter output voltage relative to a phase of a motor counter-electromotive voltage is set to a phase at which motor efficiency comes generally to a peak, in response to the detected rotation speed and the detected input current.

4. The brushless DC motor system according to claim 3, wherein said inverter control means includes phase holding means for holding a phase at which a peak motor efficiency can be obtained with the rotation speed and the input current, the phase having been obtained from previously performed measurements, and wherein said inverter control means sets a switching command to the voltage-fed inverter by reading a corresponding phase from said phase holding means as the phase at which motor efficiency comes generally to a peak, in response to the detected rotation speed and the detected input current.

5. The brushless DC motor system according to claim 3, wherein said inverter control means further includes:

value holding means for holding values that prescribe a variation characteristic of a phase at which a peak motor efficiency can be obtained with the rotation speed and the input current, the values having been obtained from previously performed measurements, and linear approximation means for linearly approximating a phase based on a value held in said value holding means, and wherein said inverter control means reads a corresponding value from said value holding means in response to a detected rotation speed and a detected input current, obtains a phase through a linear approximation with said linear approximation means, and sets a switching command to the voltage-fed inverter with the obtained phase taken as the phase at which the motor efficiency comes generally to a peak.

6. The brushless DC motor system according to claim 3, wherein said inverter control means further includes phase correction means for setting a switching command to the voltage-fed inverter by advancing, by a specified value, the phase at which the motor efficiency comes to a peak.

7. A method for controlling a brushless DC motor comprising the steps of:

- detecting a rotation speed and a rotor position of a brushless DC motor driven by a voltage-fed inverter;
- setting an output voltage amplitude of the voltage-fed inverter to a specified amplitude that is determined based on the detected rotation speed; and
- setting, in response to a difference between a rotation speed command to the brushless DC motor and the detected rotation speed, a switching command to the voltage-fed inverter such that a phase of an inverter output voltage relative to a phase of a motor counter-electromotive voltage is set to a specified phase, and such that a terminal voltage conduction width of the voltage-fed inverter is set to 180° in electrical angle.

8. The method according to claim 7, wherein the rotor of the brushless DC motor is a rotor having a permanent magnet disposed inside.

9. The method for controlling a brushless DC motor according to claim 7 further comprising the steps of:

- obtaining a first neutral-point voltage by connecting resistors, which are respectively connected at one end to output terminals of individual phases of the voltage-fed inverter, to one another at the other end;
- obtaining a second neutral-point voltage by connecting stator windings of individual phases of the brushless DC motor to one another at one end; and
- detecting a magnetic-pole position of the rotor of the brushless DC motor based on a difference between the first neutral-point voltage and the second neutral-point voltage.

10. A brushless DC motor system comprising:

- a rotational-position sensor for detecting a rotation speed and rotor position of a brushless DC motor driven by a voltage-fed inverter;
- inverter control means for setting an output voltage amplitude of the voltage-fed inverter to a specified amplitude that is determined based on the detected rotation speed; and
- setting means for setting, in response to a difference between a rotation speed command to the brushless DC motor and the detected rotation speed, a switching command to the voltage-fed inverter such that a phase of an inverter output voltage relative to a phase of a motor counter-electromotive voltage is set to a specified phase and, such that a terminal voltage conduction width of the voltage-fed inverter is set to 180° in electrical angle.

11. The brushless motor system according to claim 10, wherein the rotor of the brushless DC motor is a rotor having a permanent magnet disposed inside.

12. The brushless DC motor system according to claim 10, further comprising:

- resistors which are connected at one end to respective output terminals of individuals phases of the voltage-fed inverter, and are connected at the other end to one another; and
- difference-voltage output means for receiving, as inputs, a first neutral-point voltage obtained at the other ends of said resistors and a second neutral-point voltage obtained at one end of stator windings of individual phases of the brushless DC motor at which the stator windings are connected to one another, and for delivering, as an output, a difference voltage between the two neutral-point voltages, wherein said position sensor detects a magnetic-pole position of the rotor of the brushless DC motor based on the difference voltage.

13. The brushless DC motor system according to claim 10, wherein said motor is adopted as a drive source for an electrical appliance.

14. A motor system comprising:

- a rotor;
- a stator having armature coils connected in a three-phase star configuration;
- a resistor circuit connected in three-phase star configuration in parallel to said armature coils;
- an inverter for switching a voltage pattern to be applied to said armature coils; and
- control means for controlling an output of said inverter so that a specified efficiency is obtained, based on a neutral-point voltage of said armature coils, said control means including a level decision means for determining a relationship between a signal representing a voltage difference between neutral points of said armature coils and said resistor circuit and a target value.

15. The motor system according to claim 14, wherein the specified efficiency is a peak efficiency.

16. The motor system according to claim 14, further comprising:

- rotor-position sensor means for detecting a relative rotor position between said rotor and said stator, and thereby outputting a position signal,
- wherein said control means further includes phase correction means for adjusting a time interval from the position signal to a switching of the voltage pattern so that the level of the voltage difference signal becomes the target value, based on a decision result of said level decision means.

17. The motor system according to claim 15, further comprising:

- rotor-position sensor means for detecting a relative rotor position between said rotor and said stator, and thereby outputting a position signal,
- wherein said control means further includes; phase correction means for adjusting a time interval from the position signal to a switching of the voltage pattern so that the level of the voltage difference signal becomes the target value, based on a decision result of said level decision means.

18. The motor system according to claim 14, wherein said level decision means determines a relationship between a level of an integral signal derived by integrating the signal representing the voltage difference between the neutral point of said armature coils and the neutral point of said resistor circuit and the target value and said control means further including phase correction means (T1,T2,41,42) for adjusting a time interval from the position signal to a switching of the voltage pattern so that the level of the integral signal becomes the target value, based on a decision result of the level decision means.

19. The motor system according to claim 15, wherein said level decision means determines a relationship between a level of an integral signal derived by integrating the signal representing the voltage difference between the neutral point of said armature coils and the neutral point of said resistor circuit and the target value at which a peak efficiency is obtained and said control means further including phase correction means (T1,T2,41,42) for adjusting a time interval from the position signal to a switching of the voltage pattern so that the level of the integral signal becomes the target value, based on a decision result of the level decision means.

20. The motor system according to claim 14, wherein said control means further includes voltage correction means for correcting an output voltage of said inverter so that the level of the voltage difference signal becomes the target value, based on a decision result of said level decision means.

21. The motor system according to claim 15, wherein said control means further includes voltage correction means for correcting an output voltage of said inverter so that the level of the voltage difference signal becomes the target value, based on a decision result of said level decision means.

22. The motor system according to claim 20, wherein said level decision means determines a relationship between an integral signal derived by integrating the signal representing the voltage difference between the neutral point of said armature coils and the neutral point of said resistor circuit and the target value and said voltage correction means corrects an output voltage of the inverter (20, 320) so that the level of the integral signal becomes the target value, based on a decision result of the level decision means.

23. The motor system according to claim 21, wherein said level decision means determines a relationship between an integral signal derived by integrating the signal representing the voltage difference between the neutral point of said armature coils and the neutral point of said resistor circuit and the target value at which a peak efficiency is obtained and said voltage correction means corrects an output voltage of the inverter (20, 320) so that the level of the integral signal becomes the target value, based on a decision result of the level decision means.

24. A motor system comprising:
   a rotor having a magnet with a plurality of poles;
   a stator having armature coils connected in a three-phase star configuration;
   a resistor circuit connected in a three-phase star configuration in parallel to said armature coils;
   rotational-position sensor means for detecting a voltage difference signal representing a voltage difference between a neutral point of said armature coils and a neutral point of said resistor circuit, detecting a relative rotational position between said rotor and said stator based on the voltage difference signal, and outputting a position signal;
   an inverter for switching over a voltage pattern to be applied to said armature coils based on the position signal output by said rotational-position sensor means;
   integration means for integrating the voltage difference signal detected by said rotational position sensor means and outputting an integral signal;
   level decision means for, upon receiving the integral signal from said integration means, deciding a relationship between a level of the integral signal and a target value; and
   phase correction means for adjusting a time interval from the position signal to a switching of the voltage pattern so that the level of the integral signal derived from said integration means becomes the target value, based on a decision result of said level decision means.

25. The motor system according to claim 24, wherein the target value of said level decision means is set to a level of the integral signal at which a peak efficiency is obtained.

26. A motor system comprising:
   a rotor having a magnet with a plurality of poles;
   a stator having armature coils connected in a three-phase star configuration;
   a resistor circuit connected in a three-phase star configuration in parallel to said armature coils;
   an inverter for outputting a voltage to be applied to said armature coils;
   integration means for integrating a voltage difference signal representing a voltage difference between a neutral point of said armature coils and a neutral point of said resistor circuit, and outputting an integral signal;
   level decision means for, upon receiving the integral signal from said integration means, deciding a relationship between a level of the integral signal and a target value; and
   voltage correction means for correcting an output voltage of said inverter so that the level of the integral signal derived from said integration means becomes the target value, based on a decision result of said level decision means.

27. The motor system according to claim 26, wherein the target value of said level decision means is set to a level of the integral signal at which a peak efficiency is obtained.

28. A motor system comprising:
   a rotor having a magnet with a plurality of poles;
   a stator having armature coils connected in a three-phase star configuration;
   a resistor circuit connected in a three-phase star configuration in parallel to said armature coils;
   rotational-position sensor means for detecting a voltage difference signal representing a voltage difference between a neutral point of said armature coils and a neutral point of said resistor circuit, detecting a relative rotational position between said rotor and said stator based on the voltage difference signal, and outputting a position signal;
   an inverter for switching over a voltage pattern to be applied to said armature coils, based on the position signal of said rotational-position sensor means;
   level decision means for, upon receiving the voltage difference signal detected by said rotational-position sensor means, deciding a relationship between a level of the voltage difference signal and a target value; and
   phase correction means for adjusting a time interval from the position signal to a switching of the voltage pattern so that the level of the voltage difference signal becomes the target value, based on a decision result of said level decision means.

29. The motor system according to claim 28, wherein the target value of said level decision means is set to a level of the voltage difference signal at which a peak efficiency is obtained.

30. A motor system comprising:
   a rotor having a magnet with a plurality of poles;
   a stator having armature coils connected in a three-phase star configuration;
   a resistor circuit connected in a three-phase star configuration in parallel to said armature coils;
   an inverter for outputting a voltage to be applied to said armature coils;
   level decision means for deciding a relationship between a level of a voltage difference signal representing a voltage difference between a neutral point of said armature coils and a neutral point of said resistor circuit and a target value; and voltage correction means for correcting an output voltage of said inverter so that the level of the voltage difference signal becomes the target value, based on a decision result of said level decision means.

31. The motor system according to claim 30, wherein the target value of said level decision means is set to a level of the voltage difference signal at which a peak efficiency is obtained.

32. A method for controlling a motor which includes a stator having armature coils connected in a three-phase star configuration, a resistor circuit connected in a three-phase star configuration in parallel with the armature coils, and an inverter for switching a voltage pattern applied to the armature coils, said method comprising the steps of:

calculating a voltage difference between a neutral point of the armature coils and a neutral point of the resistor circuit;

determining a relationship between a signal representing the voltage difference obtained in said calculating step and a target value; and controlling an output of the inverter so that a specified efficiency is obtained based on the relationship between the signal representing the voltage difference and the target value determined by said determining step.

33. The method according to claim 32, wherein the specified efficiency is a peak efficiency.

34. The method according to claim 32, further comprising the step of:

detecting a position of the rotor relative to the stator to obtain a position signal, wherein said controlling step adjusts a time interval from the position signal obtained by said detecting step to a voltage pattern switching signal so that the signal representing the voltage difference becomes the target value.

35. The method according to claim 32, wherein said step of determining a relationship determines a relationship between a level of an integral signal derived by integrating the voltage difference obtained by said calculating step and the target value.

36. The method according to claim 32, wherein said controlling step corrects the output voltage of the inverter so that the level of the signal representing the voltage difference becomes the target value, based on the result of said determining step.

* * * * *